United States Patent
Walker et al.

(10) Patent No.: US 9,690,986 B1
(45) Date of Patent: Jun. 27, 2017

(54) METHOD FOR PROCESSING PHYSICAL DOCUMENT IMAGES

(71) Applicant: ArcaSearch Corporation, Paynesville, MN (US)

(72) Inventors: James R. Walker, Elk River, MN (US); Calvin G. Sixta, Paynesville, MN (US)

(73) Assignee: ArcaSearch Corporation, Paynesville, MN (US)

( * ) Notice: Subject to any disclaimer, the term of this patent is extended or adjusted under 35 U.S.C. 154(b) by 0 days.

(21) Appl. No.: 14/216,489

(22) Filed: Mar. 17, 2014

Related U.S. Application Data

(60) Provisional application No. 61/786,886, filed on Mar. 15, 2013, provisional application No. 61/824,834, filed on May 17, 2013.

(51) Int. Cl.
*G06K 9/00* (2006.01)
*G06K 9/38* (2006.01)

(52) U.S. Cl.
CPC ............... *G06K 9/00442* (2013.01)

(58) Field of Classification Search
CPC .. G06K 9/00442; G06K 2209/01; G06K 9/38; G06K 9/6292; H04N 1/1013; H04N 2201/0081
See application file for complete search history.

(56) References Cited

U.S. PATENT DOCUMENTS

| | | | |
|---|---|---|---|
| 4,348,104 A | 9/1982 | Ovshinsky | |
| 4,355,890 A | 10/1982 | Klose et al. | |
| 4,487,488 A | 12/1984 | Burbank, III | |
| 4,830,484 A | 5/1989 | Yamamoto et al. | |
| 5,457,547 A | 10/1995 | Yamada | |
| 6,788,437 B1 | 9/2004 | Boyd | |
| 6,952,281 B1 * | 10/2005 | Irons | G06F 17/30011 358/1.15 |
| 8,111,927 B2 * | 2/2012 | Vincent | G06K 9/03 382/225 |
| 8,526,761 B2 * | 9/2013 | Kojima | G06K 9/00228 382/283 |
| 2005/0190412 A1 | 9/2005 | Noguchi et al. | |

(Continued)

*Primary Examiner* — Siamak Harandi
*Assistant Examiner* — Kate R Duffy
(74) *Attorney, Agent, or Firm* — Suiter Swantz pc llo

(57) ABSTRACT

A method for processing a physical document image. The method includes receiving a temporary quality control thumbnail file, a temporary metadata thumbnail file, and a high resolution archive file. Each of the temporary quality control thumbnail file, the temporary metadata thumbnail file, and the high resolution archive file is associated with a raw image captured by an imaging station. The method also includes performing a quality control process on the temporary quality control thumbnail file. The method further includes performing a metadata process on the temporary metadata thumbnail file. The method additionally includes performing an optical character recognition optimization process on the high resolution archive file. The method includes performing an image optimization process on the high resolution archive file. The method further includes performing a file reassembly process, wherein performance of the file reassembly process outputs a final optimized portable document format (PDF) file with metadata.

37 Claims, 62 Drawing Sheets

(56) References Cited

U.S. PATENT DOCUMENTS

2007/0011149 A1\* 1/2007 Walker .............. G06F 17/30265
2008/0118112 A1\* 5/2008 Gotoh ................ G06K 9/00442
382/112

\* cited by examiner

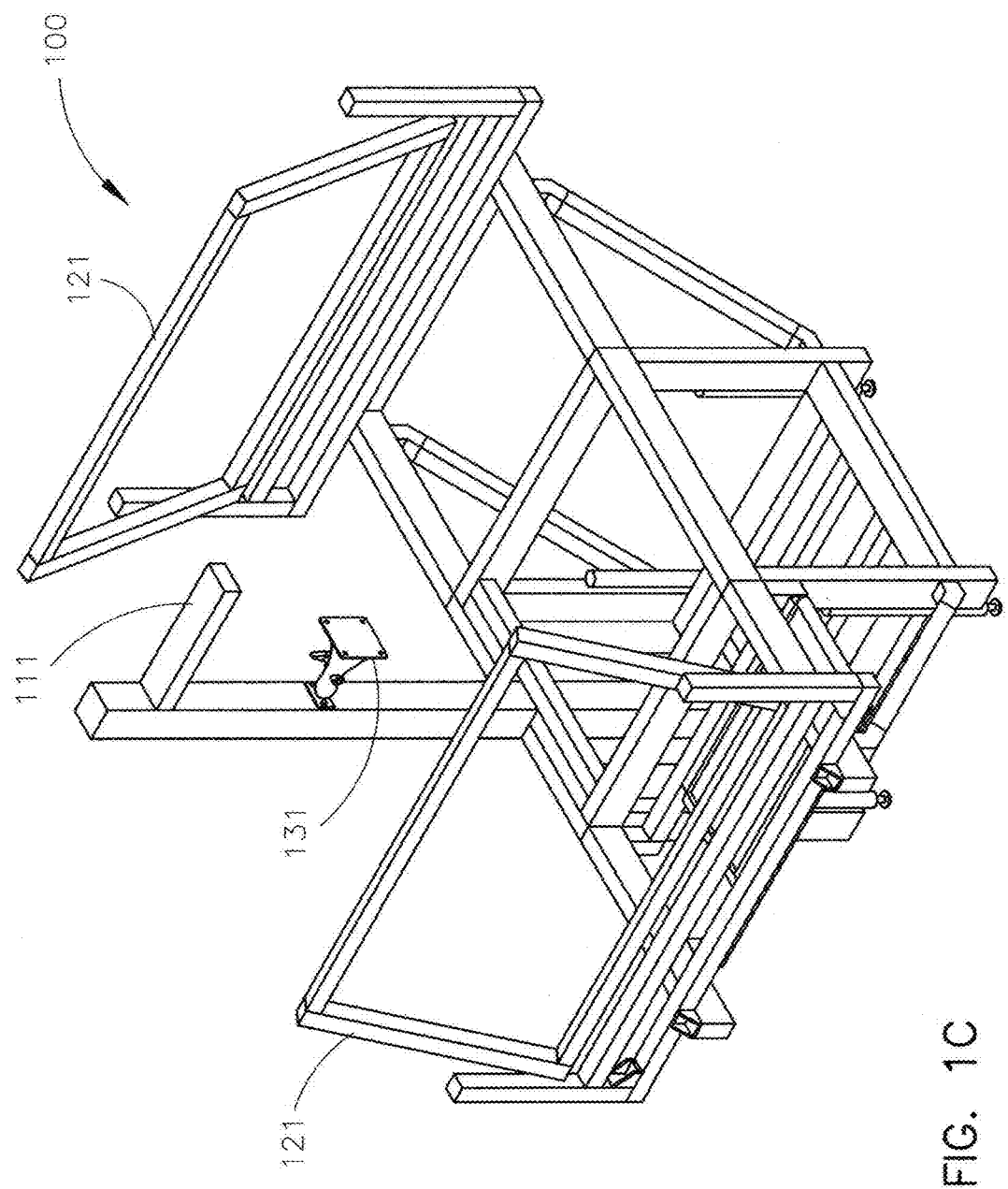

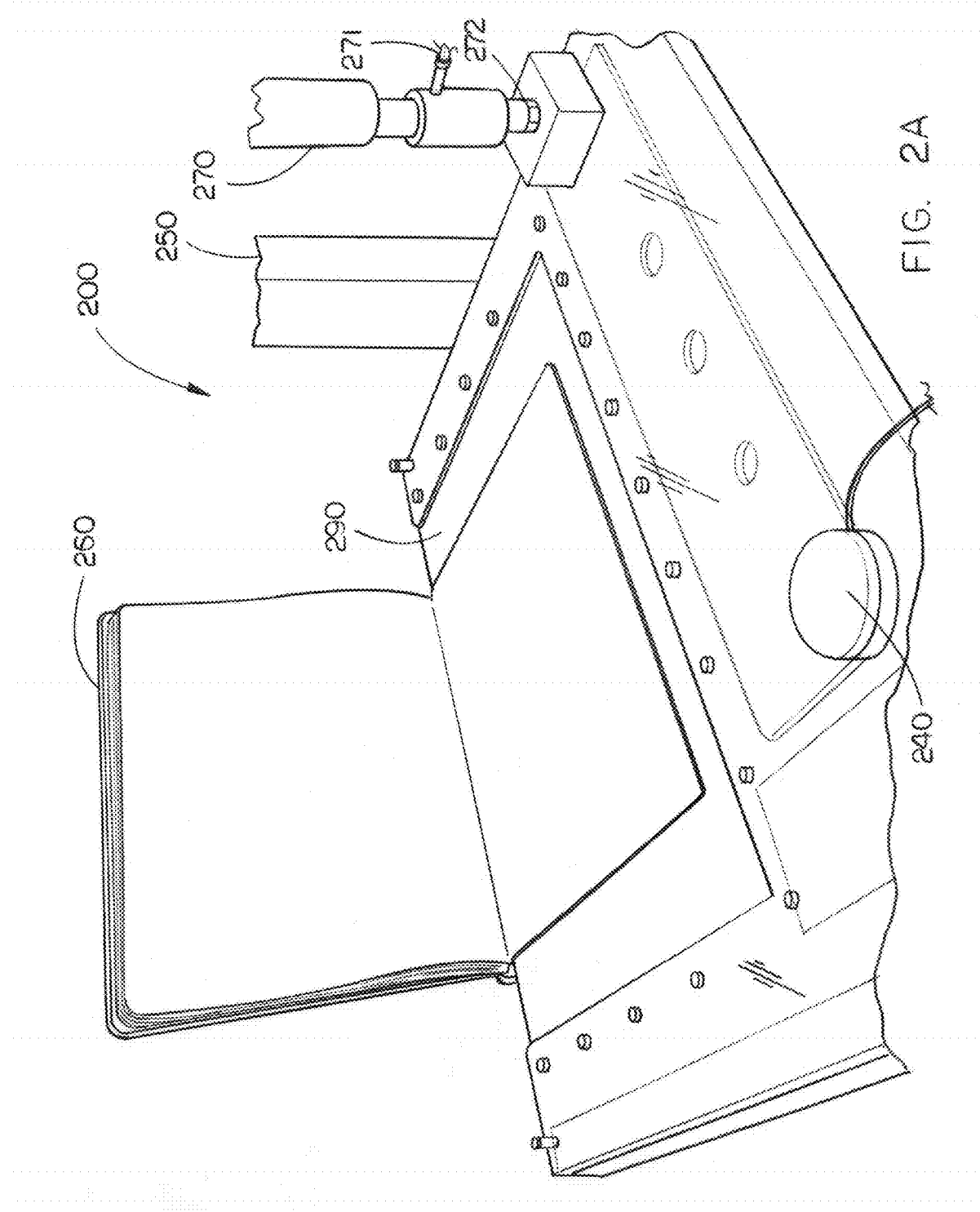

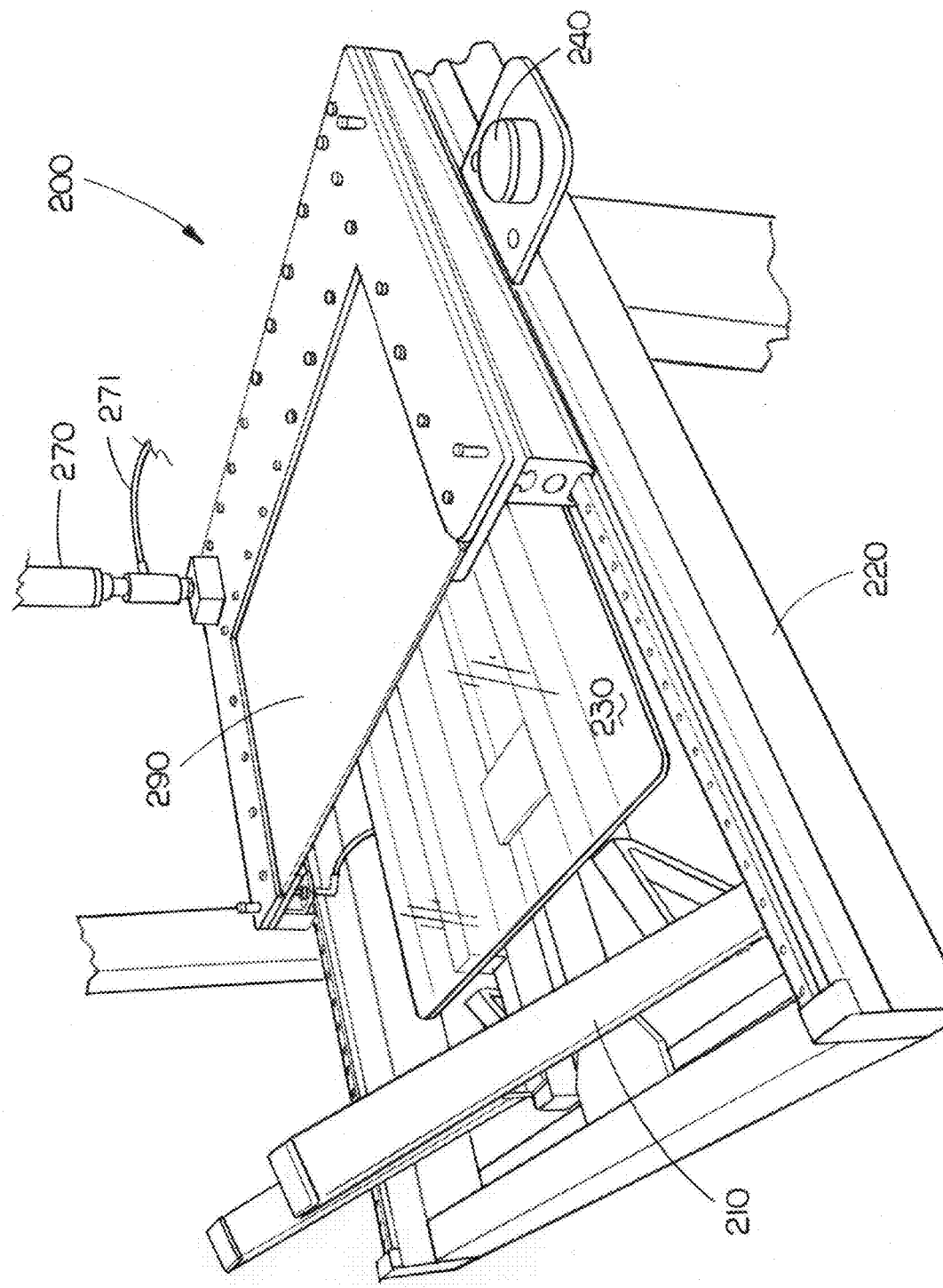

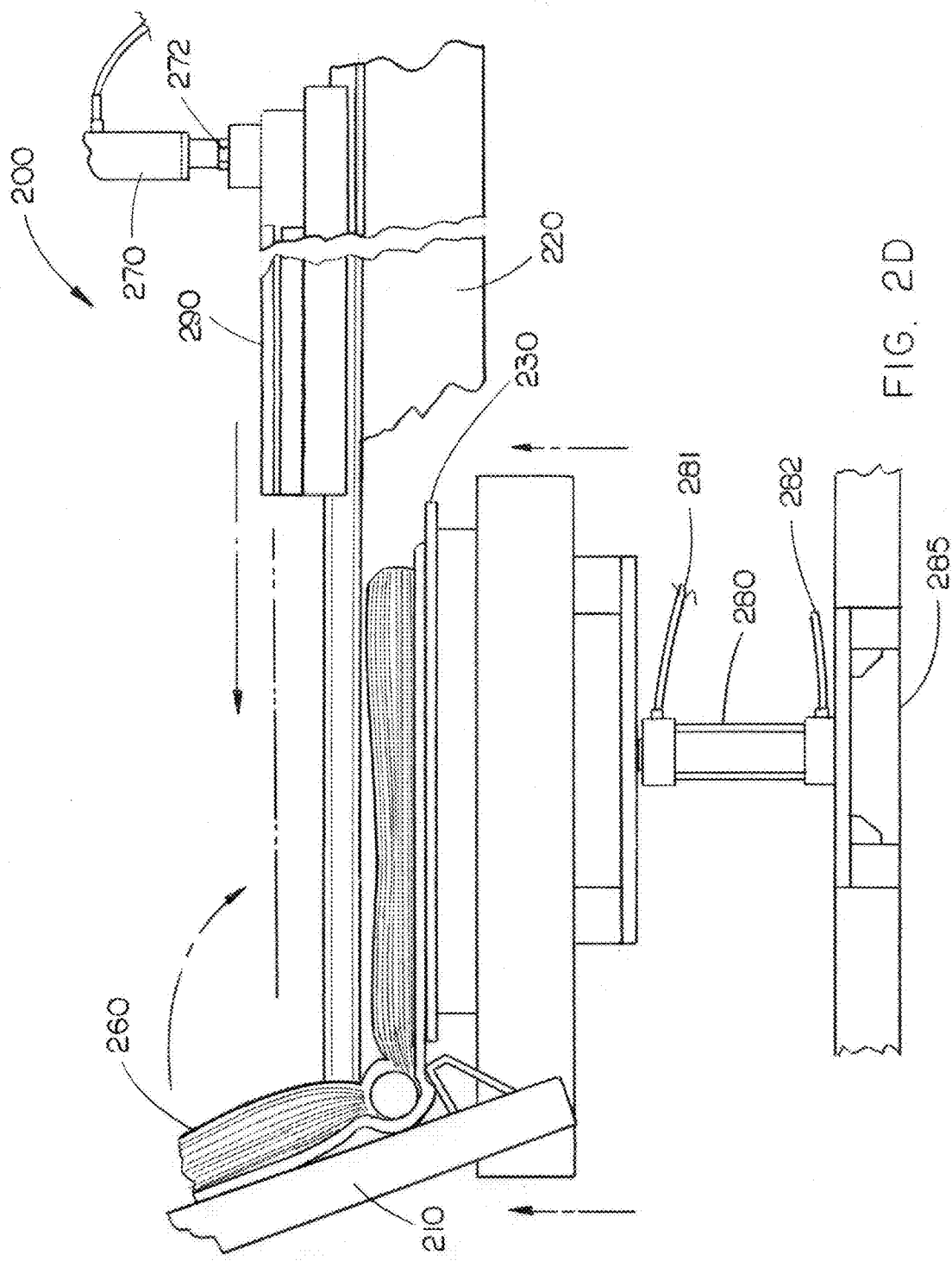

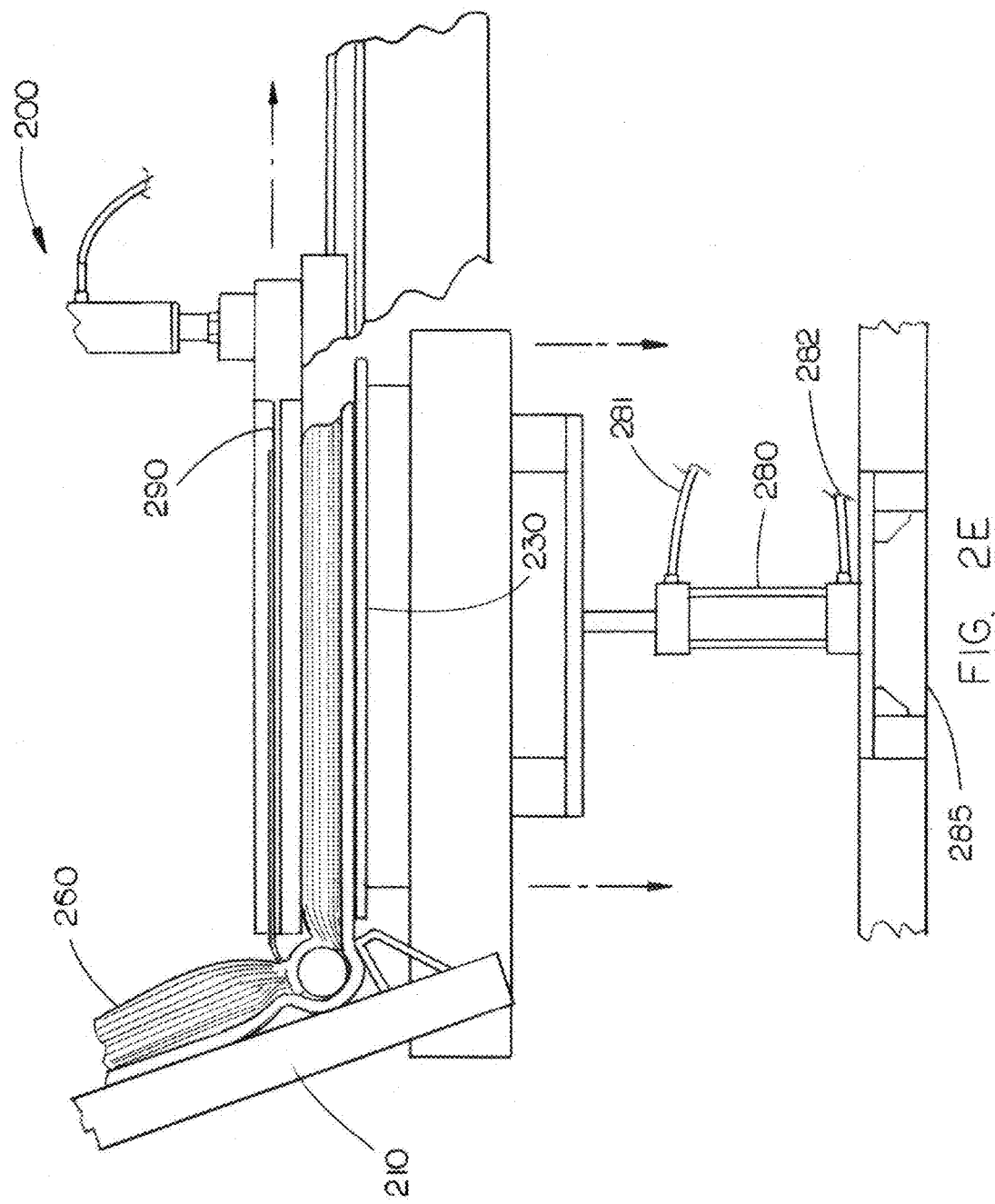

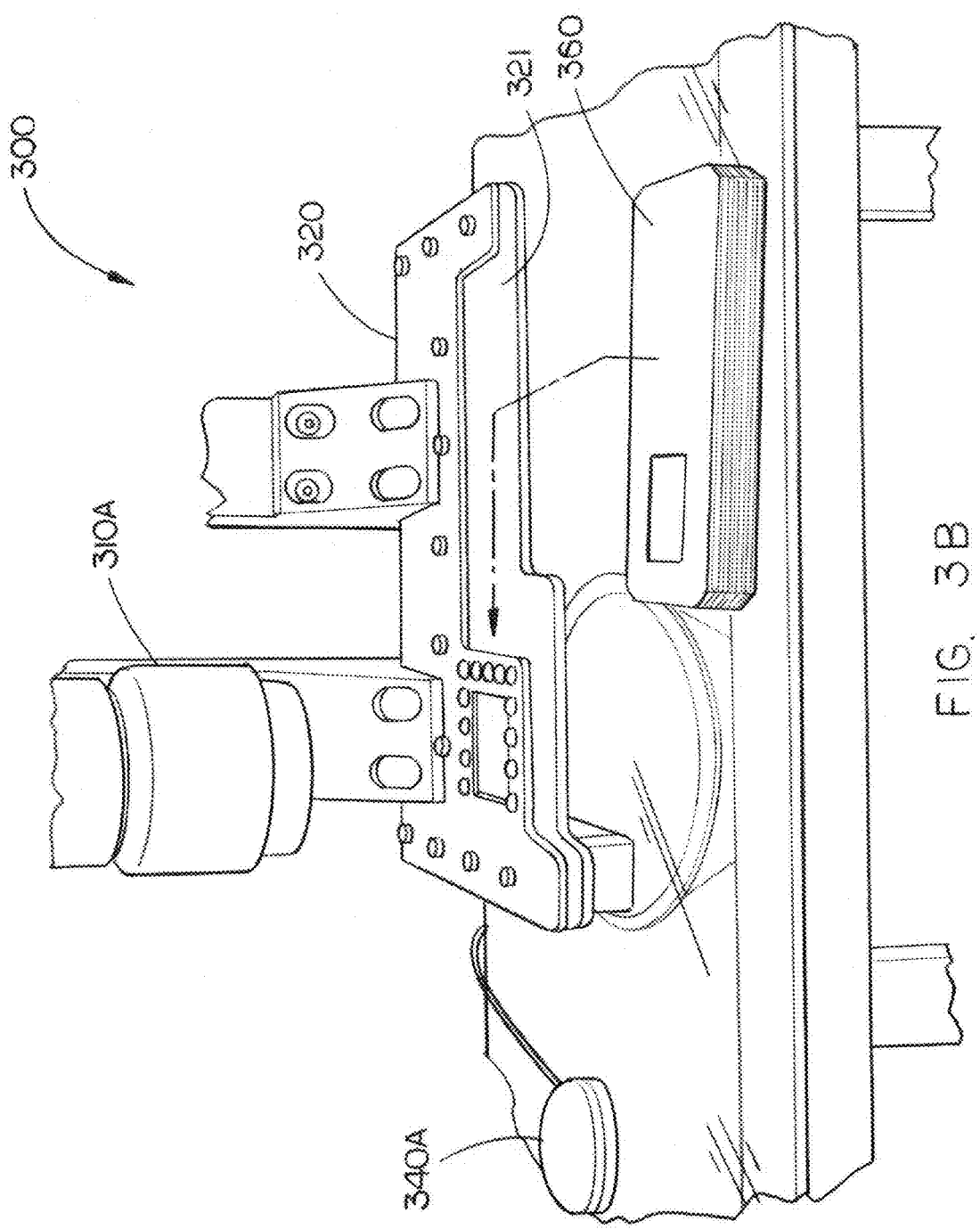

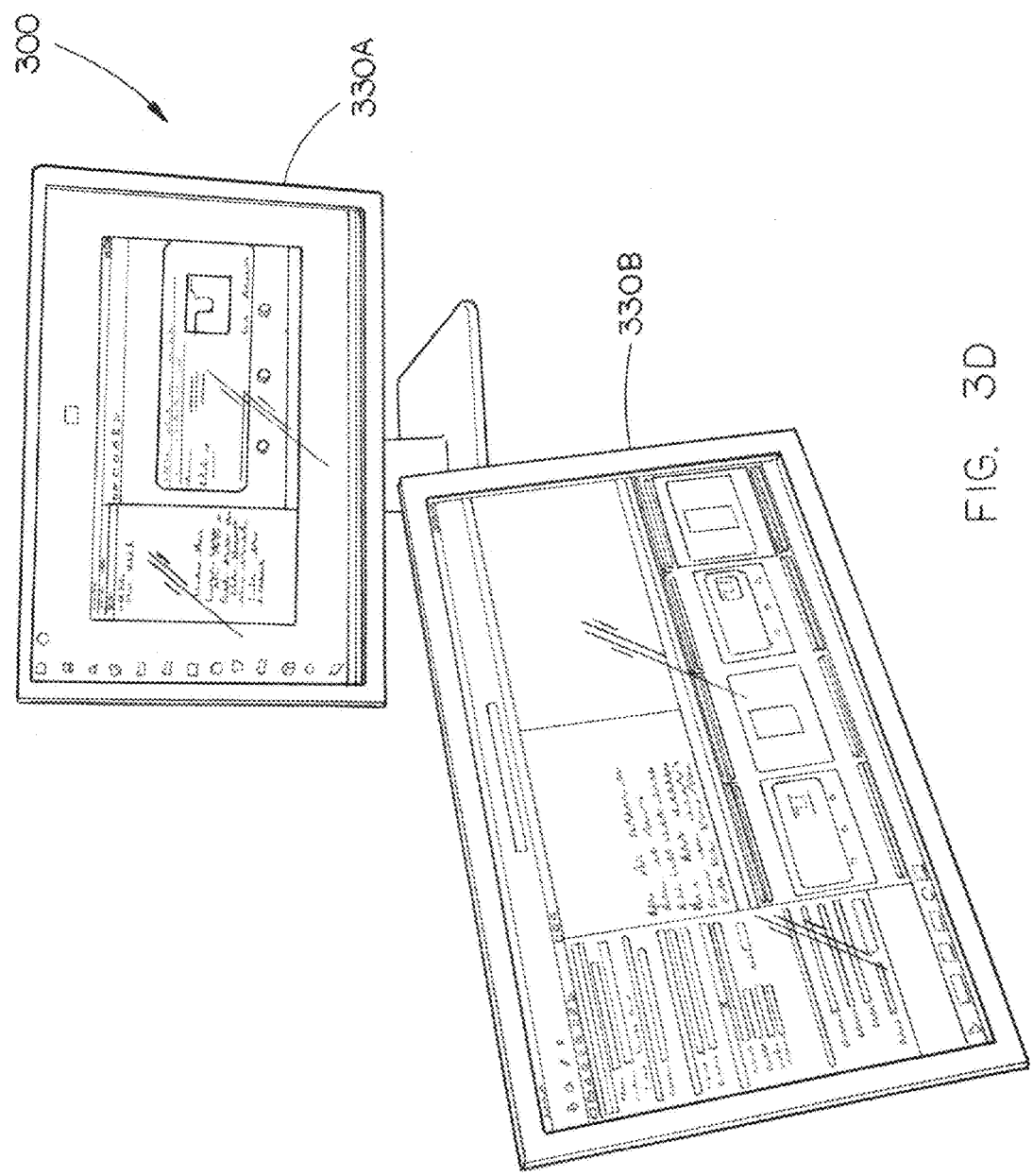

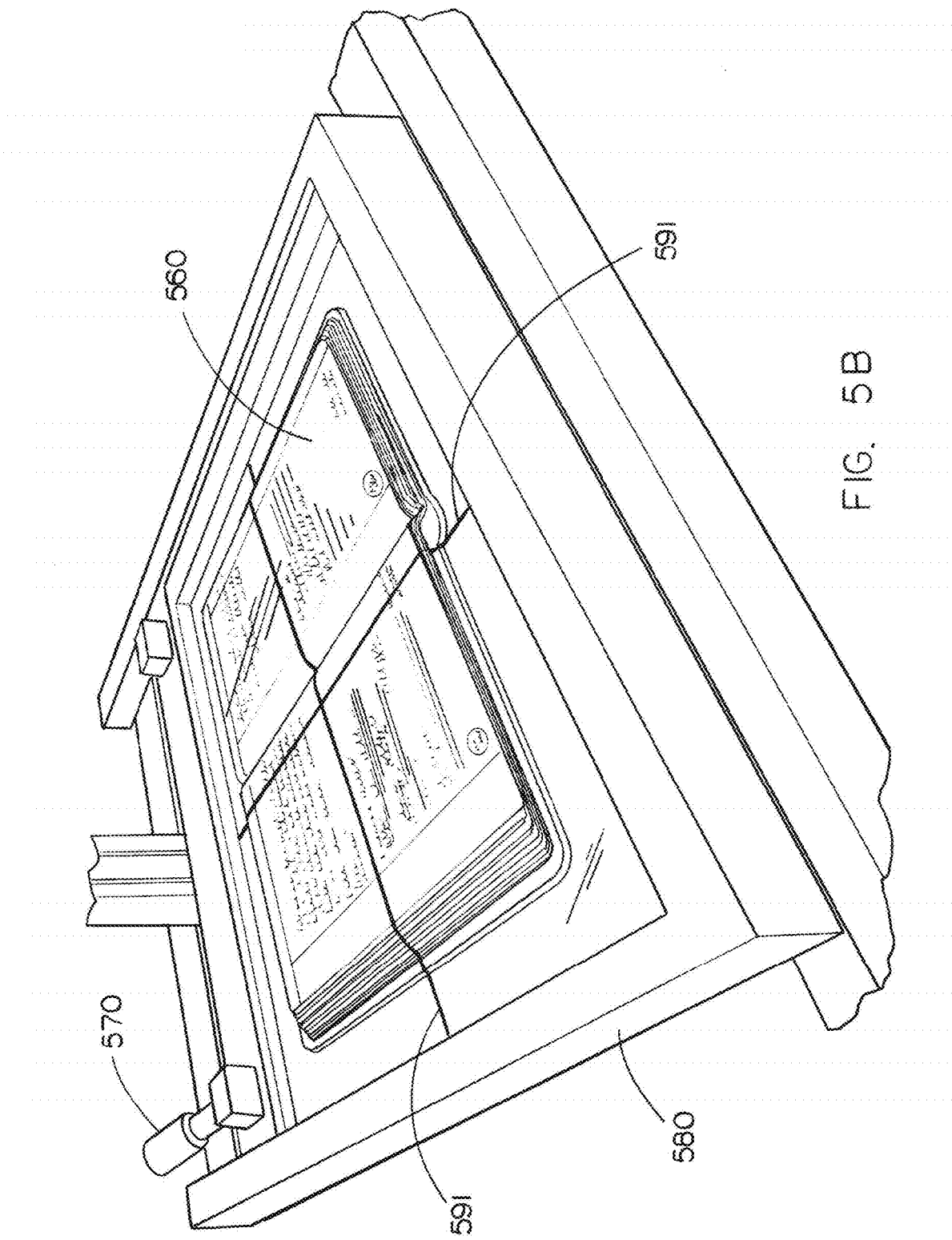

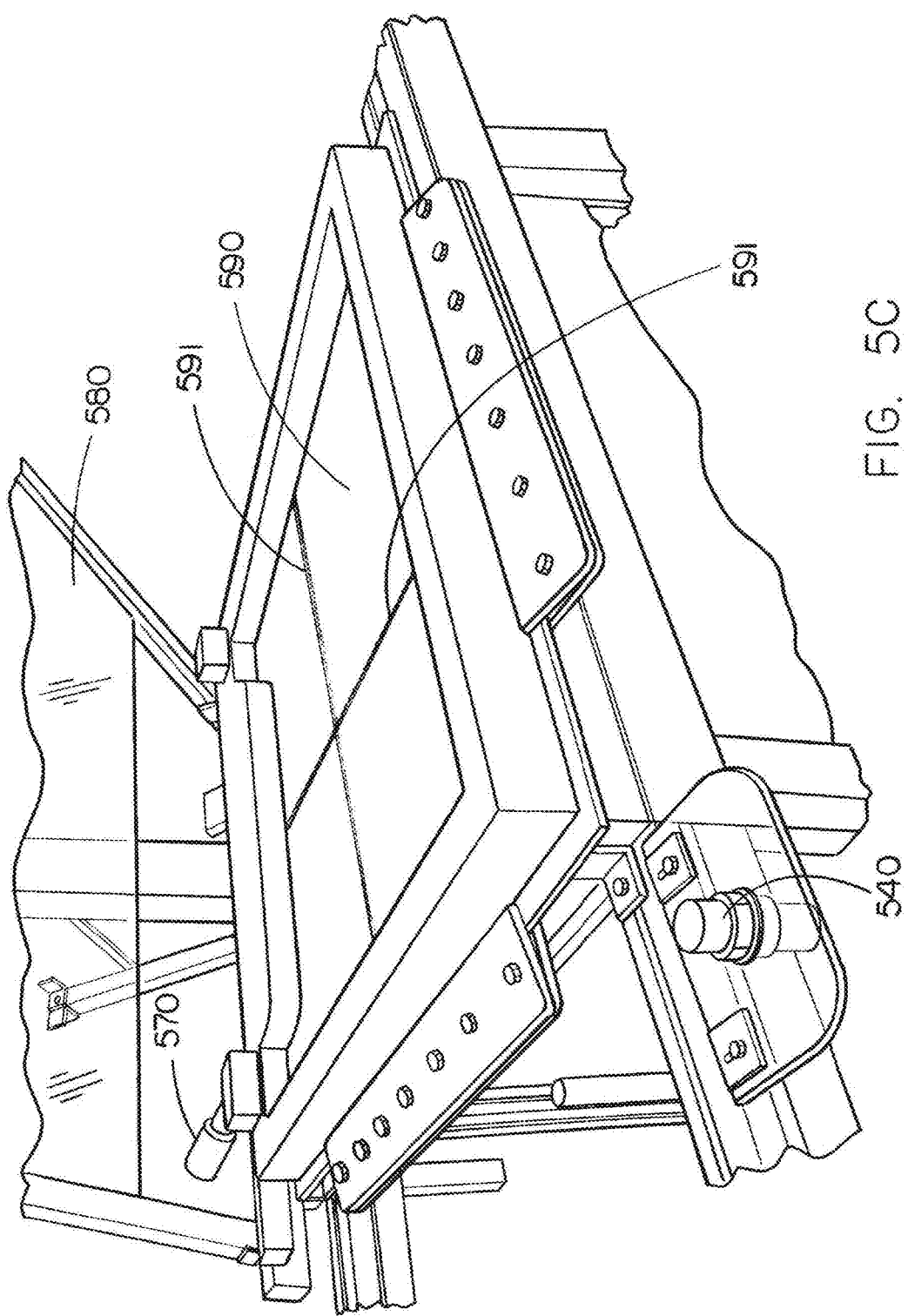

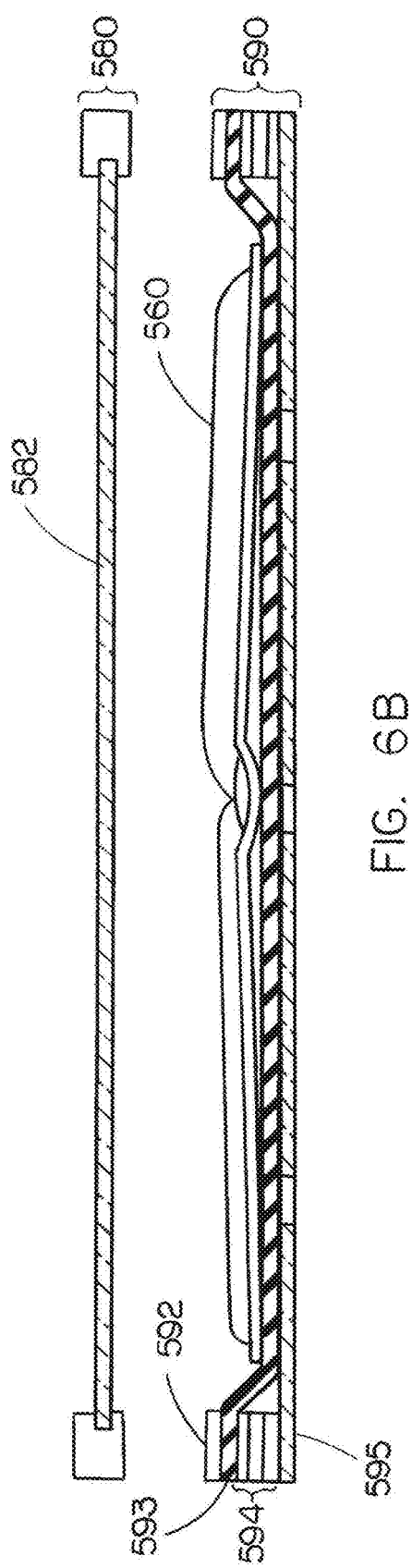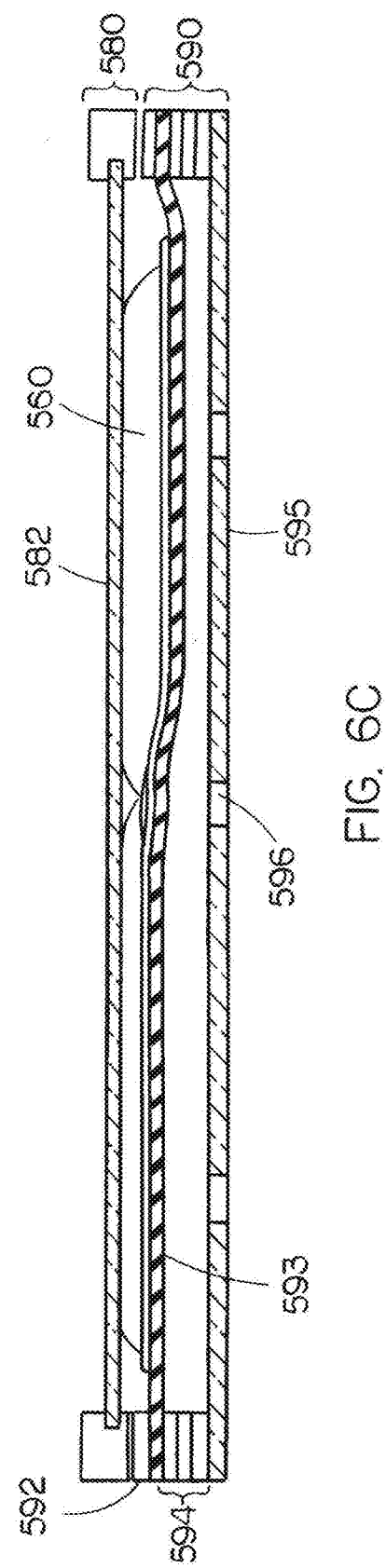
FIG. 6B
FIG. 6C

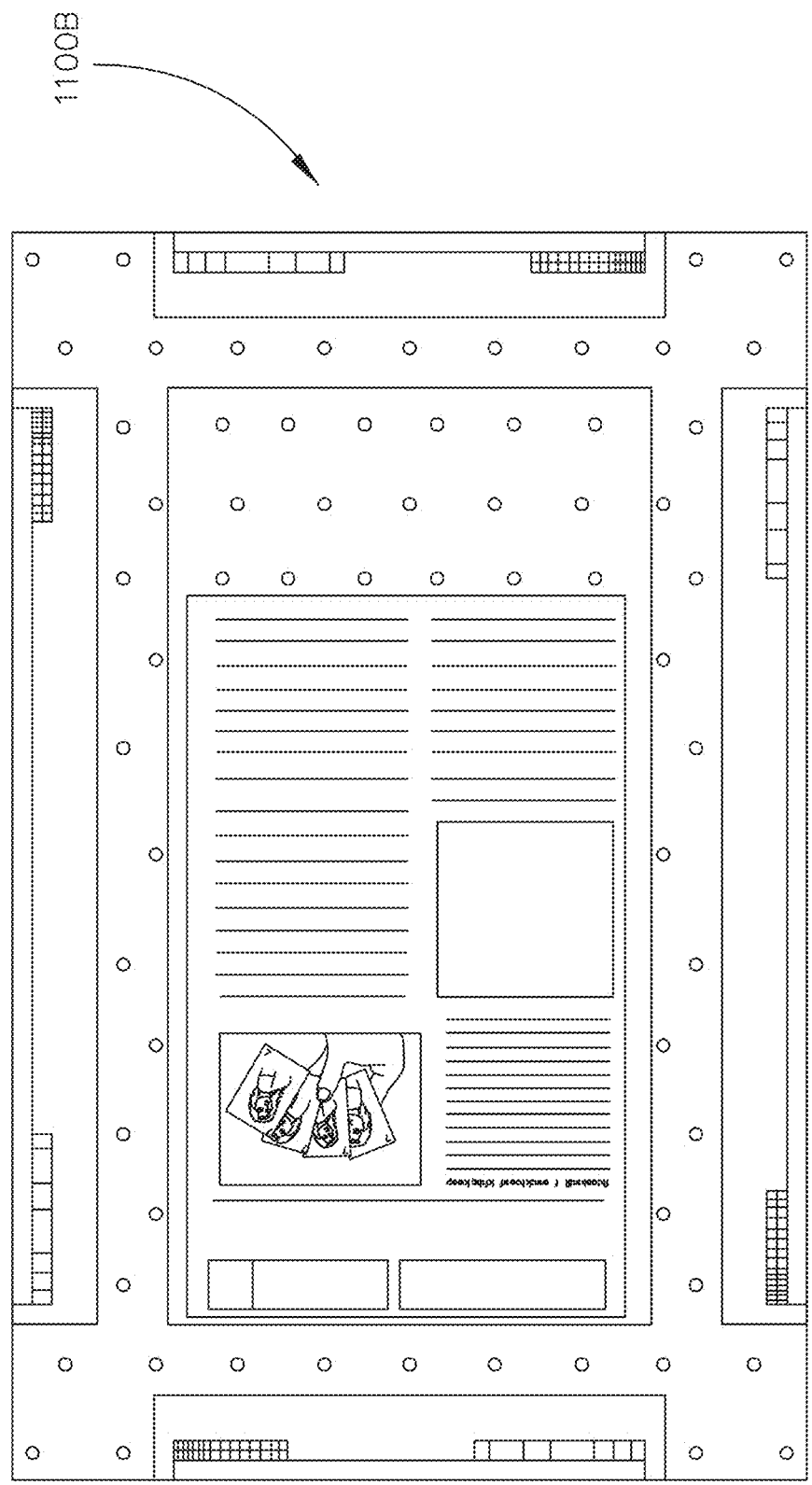

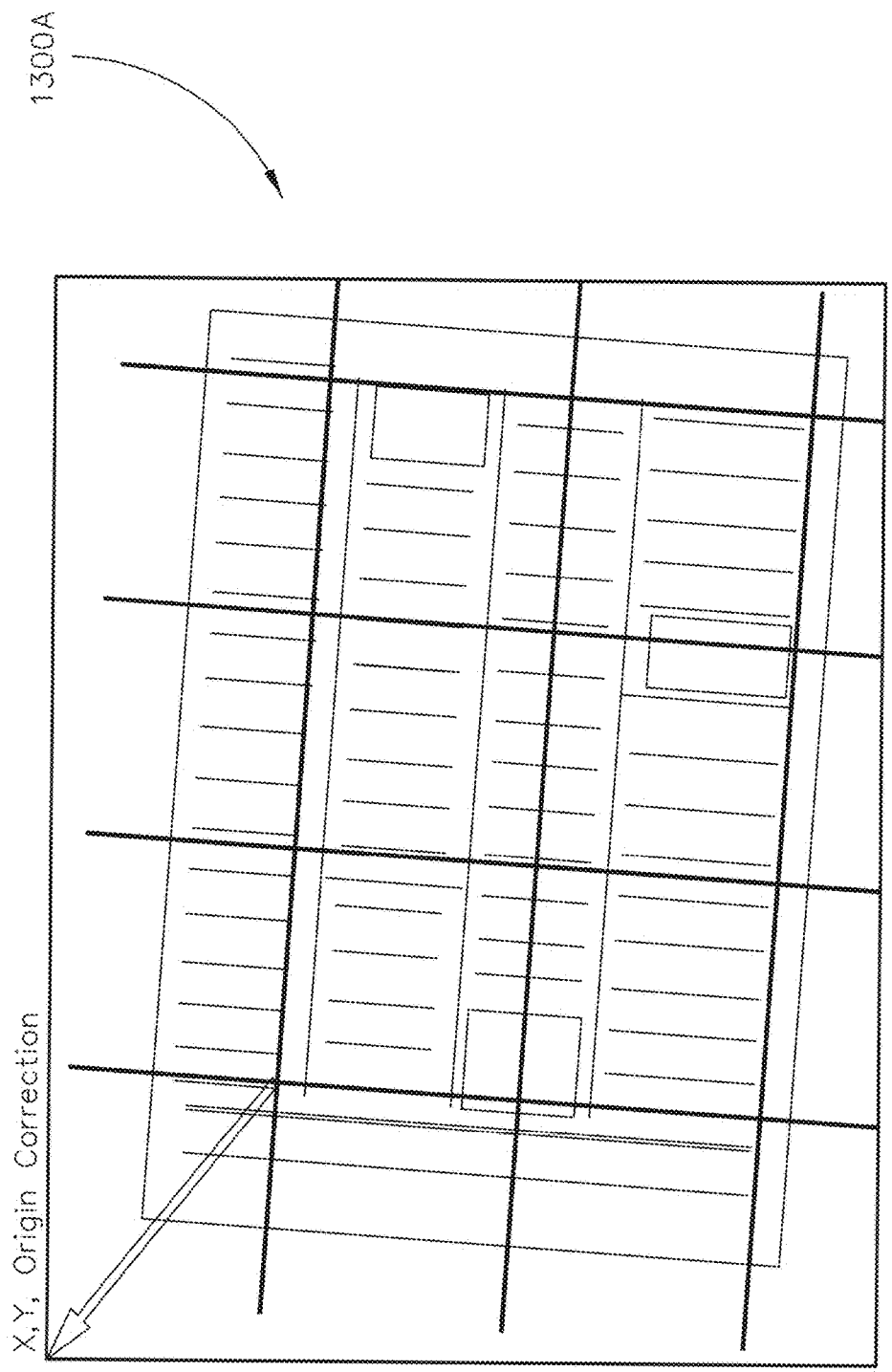

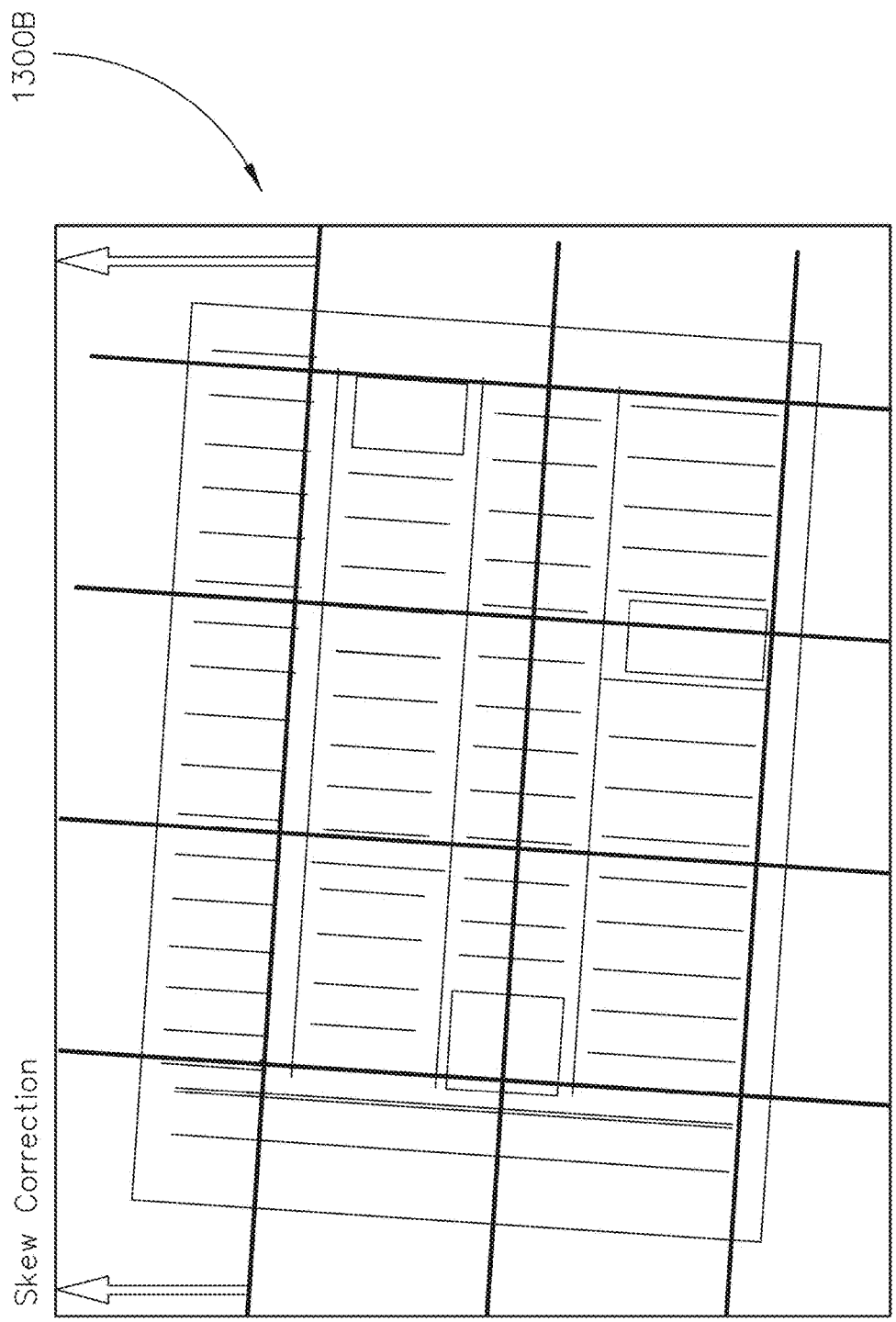

METHOD FOR PROCESSING PHYSICAL DOCUMENT IMAGES

CROSS-REFERENCE TO RELATED APPLICATIONS

This application claims the benefit under 35 U.S.C. §119 (e) of U.S. Provisional Application No. 61/786,886, filed on Mar. 15, 2013, and U.S. Provisional Application No. 61/824,834, filed May 17, 2013. U.S. Provisional Application Nos. 61/786,886 and 61/824,834 are herein incorporated by reference in their entirety.

The present application is related to U.S. patent application Ser. No. 14/216,407, filed on Mar. 17, 2014, which is herein incorporated by reference in its entirety.

FIELD

Embodiments of the invention are directed generally toward a method for processing physical document images captured by an apparatus.

SUMMARY

Accordingly, an embodiment includes a method. The method includes receiving a temporary quality control thumbnail file, a temporary metadata thumbnail file, and a high resolution archive file, wherein each of the temporary quality control thumbnail file, the temporary metadata thumbnail file, and the high resolution archive file is associated with a raw image captured by an imaging station. The method also includes performing a quality control process on the temporary quality control thumbnail file. The method further includes performing a metadata process on the temporary metadata thumbnail file. The method additionally includes performing an optical character recognition optimization process on the high resolution archive file. The method includes performing an image optimization process on the high resolution archive file. The method further includes performing a file reassembly process, wherein performance of the file reassembly process outputs a final optimized portable document format (PDF) file with metadata.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which:

FIG. 1C shows an isometric view of a frame of the exemplary imaging station depicted in FIG. 1A;

FIG. 2A shows a partial view of a further exemplary imaging station configured to image physical pages of a book;

FIG. 2C shows an additional partial view of the further exemplary imaging station depicted in FIG. 2A;

FIG. 2D shows an additional partial view of the further exemplary imaging station depicted in FIG. 2A;

FIG. 2E shows a partial view of the further exemplary imaging station depicted in FIG. 2A;

FIG. 3B shows a partial view of the additional exemplary imaging station depicted in FIG. 3A;

FIG. 3D shows an additional partial view of the additional exemplary imaging station depicted in FIG. 3A;

FIG. 5B shows a partial view of the further exemplary imaging station configured to image physical pages of a book depicted in FIG. 5A;

FIG. 5C shows a further partial view of the further exemplary imaging station configured to image physical pages of a book depicted in FIG. 5A;

FIG. 6B shows a cross-sectional view of a partially opened platen cover 580 and the book vacuum chamber 590 of the further exemplary imaging station, which is depicted in FIG. 5A;

FIG. 6C shows a cross-sectional view of a closed and sealed platen cover 580 and the book vacuum chamber 590 of the further exemplary imaging station, which is depicted in FIG. 5A;

FIGS. 11A-D shows exemplary depictions associated with performing coarse image measurements of some embodiments;

FIGS. 13A-F shows exemplary depictions associated with performing automated image corrections of some embodiments;

DETAILED DESCRIPTION

Figure 1A:
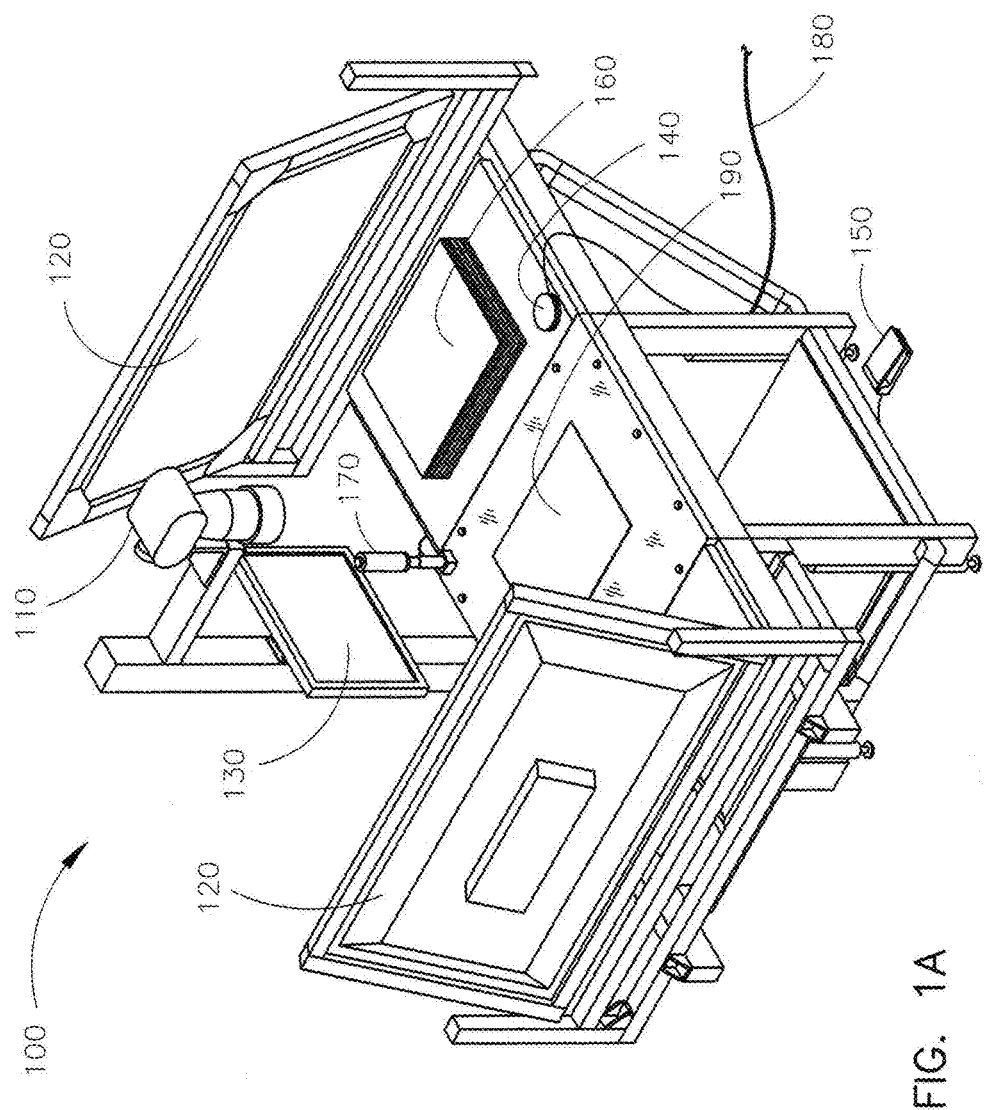
FIG. 1A shows a view of an exemplary imaging station configured to image physical documents.
Figure 1B:
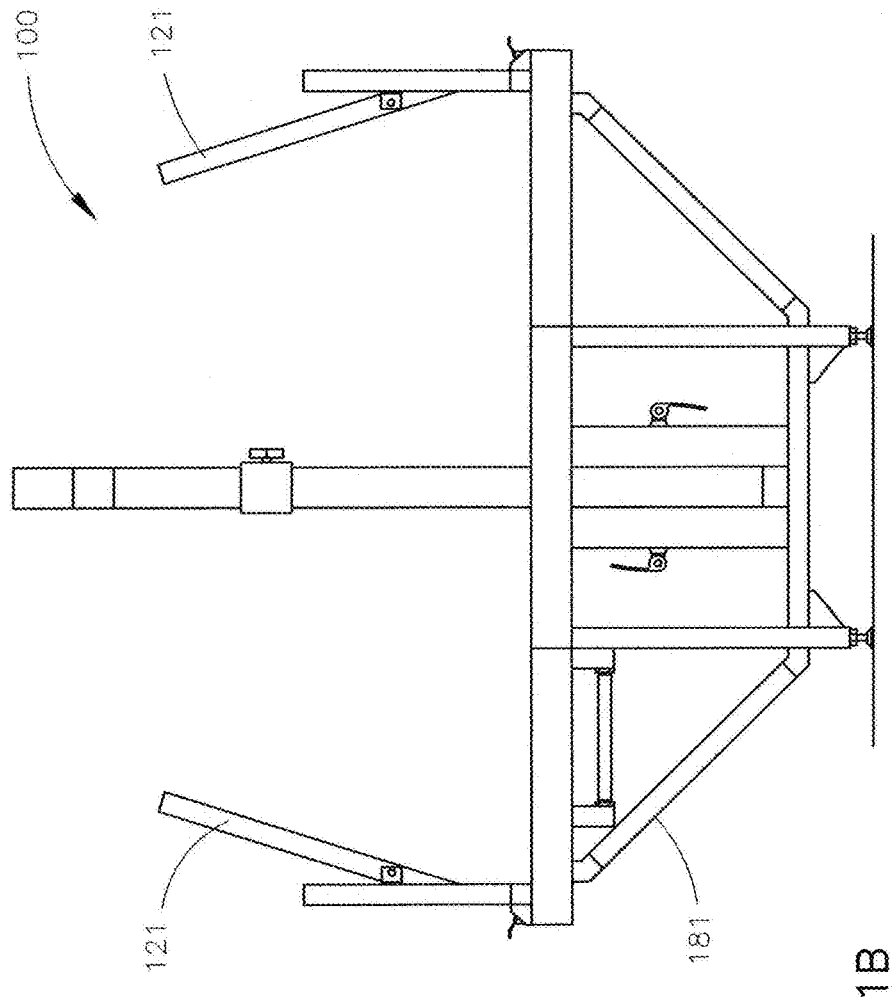
FIG. 1B shows a side view of a frame of the exemplary imaging station depicted in FIG. 1A.
Figure 1D:
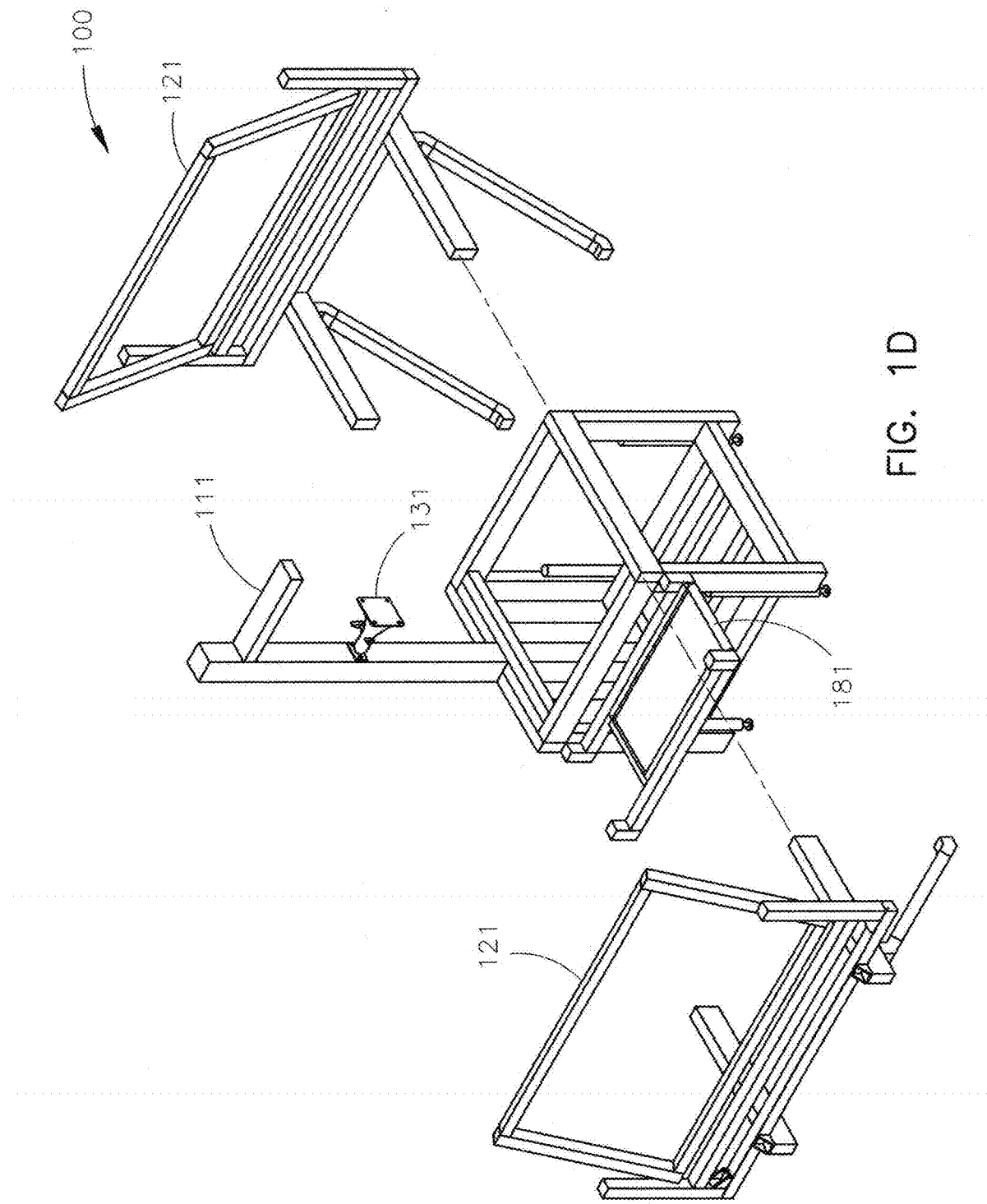
FIG. 1D shows an exploded view of a frame of the exemplary imaging station depicted in FIG. 1A.
Figure 2B:
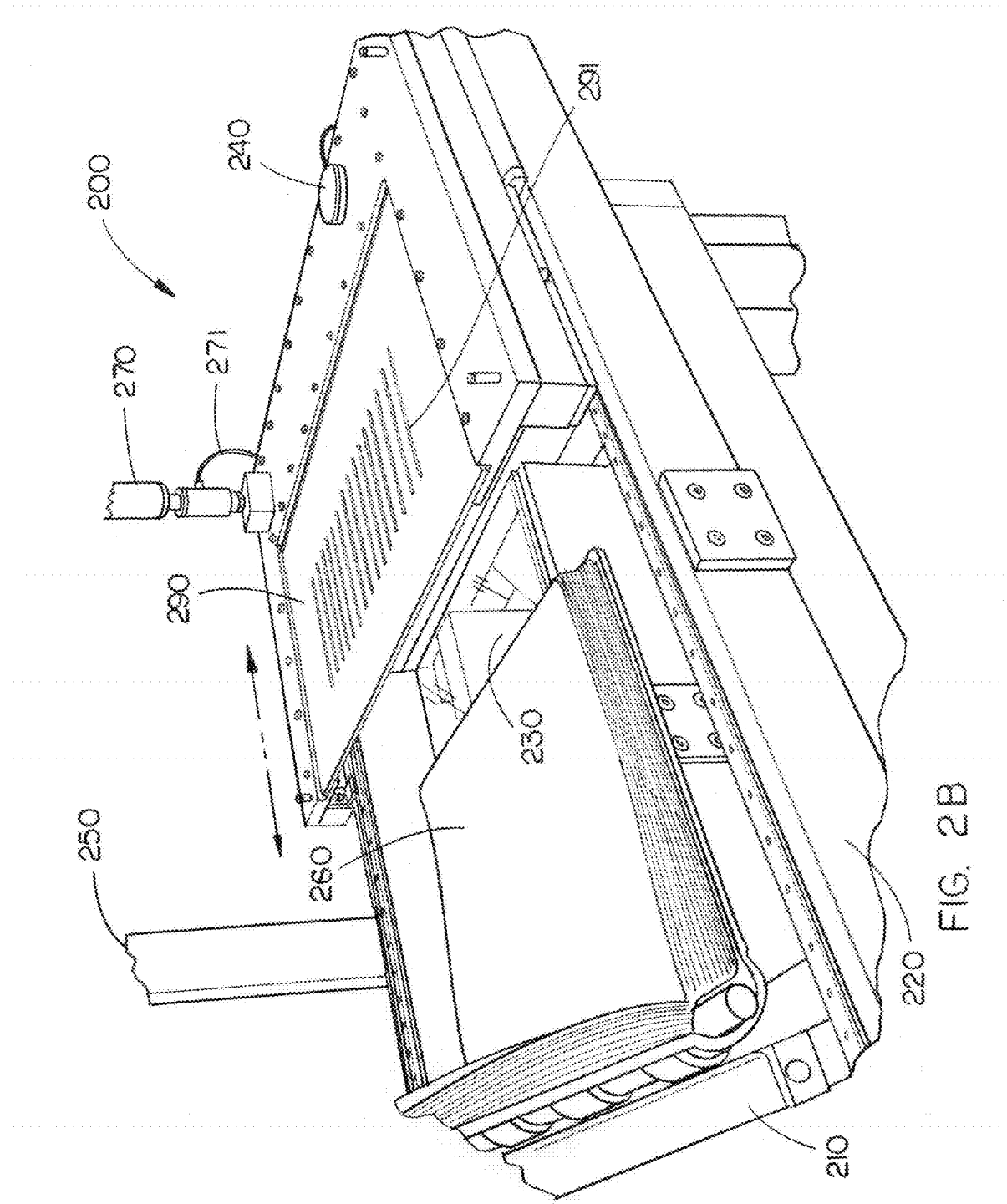
FIG. 2B shows a further partial view of the further exemplary imaging station depicted in FIG. 2A.
Figure 3A:
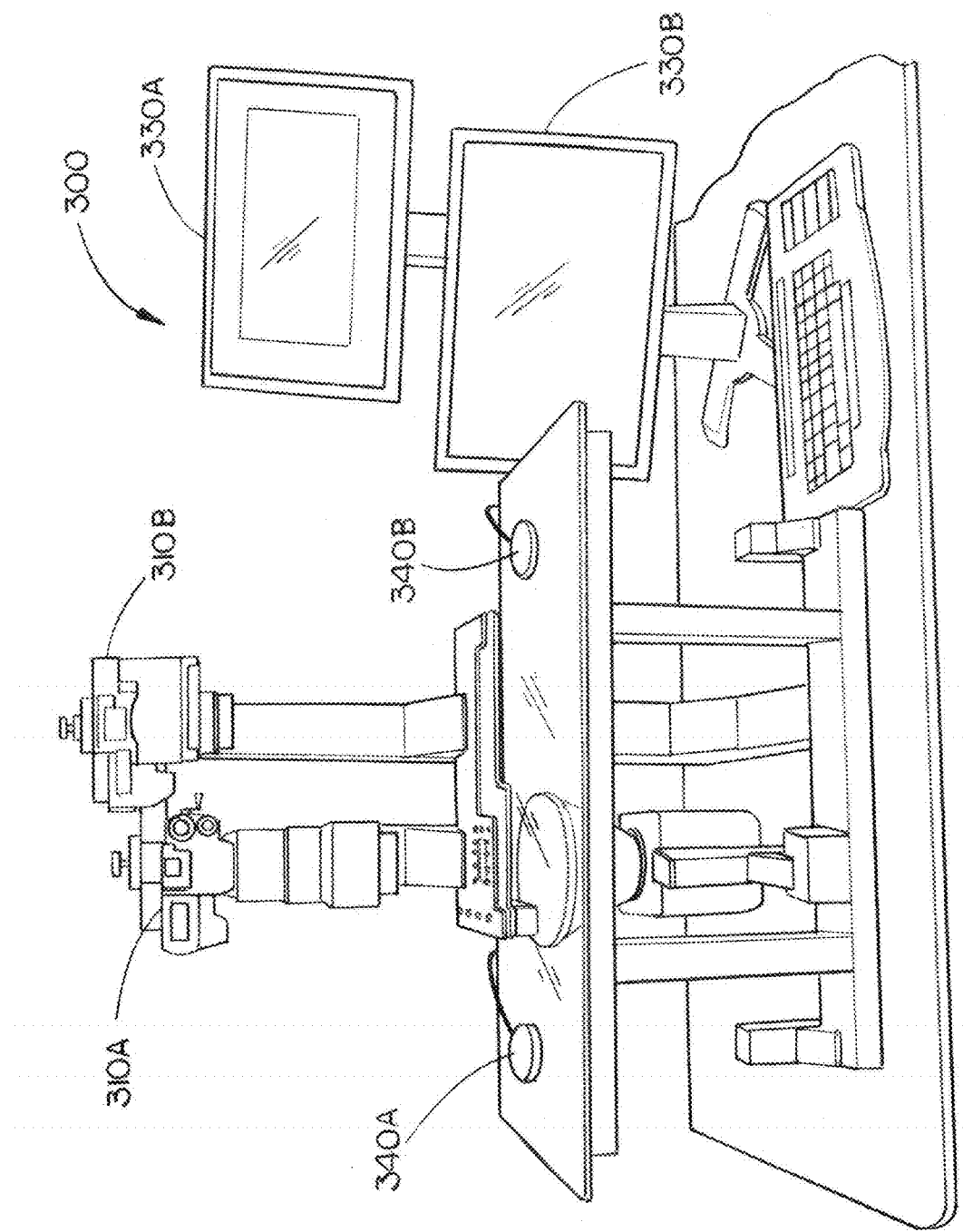
FIG. 3A shows a view of an additional exemplary imaging station configured to image microfiche cards.
Figure 3C:
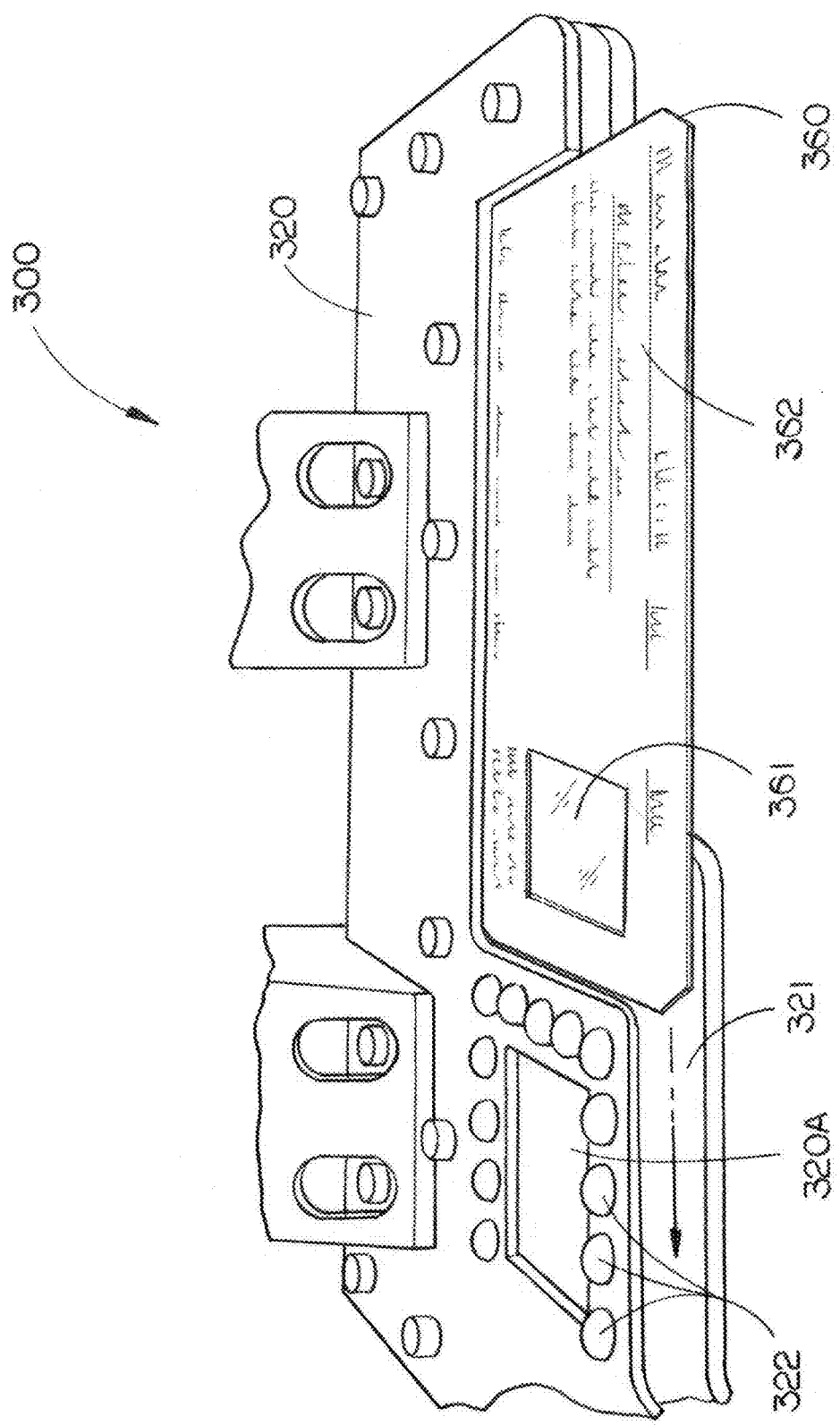
FIG. 3C shows a further partial view of the additional exemplary imaging station depicted in FIG. 3A.

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention include an apparatus, a system, and a method for digitally imaging physical media or physical documents (such as archival sheets, books, or microfiche cards), performing image processing, and/or creating a digital document. Some embodiments of the invention may include one or more portable imaging stations for imaging documents. Some embodiments also include instructions stored in a computer readable medium which are configured to perform a method of image processing of the images received from one or more imaging stations; the instructions stored in a computer readable medium may be implemented as a computer program product which may include a user friendly graphical user interface. Some embodiments of the invention are configured to digitally image physical documents (such as archival documents (e.g., sheets, books, or microfiche cards)), create one or more digital documents, perform one or more digital document manipulations, perform one or more image processing operations, perform one or more optical character recognition (OCR) operations, or perform separation, combination, association, or manipulation operations among two or more data sources associated with features of embodiments, or perform other operations. For example, embodiments are configured to image a physical document and create an associated searchable text data structure associated with the digital image of the physical document.

Embodiments are configured to prevent errors (e.g., two images of a same physical document sheet or skipped sheets of a physical document). Some embodiments are configured to reduce vibration of the physical media during the imaging process and to increase stability. Some embodiments are configured to preserve the integrity of the physical documents and to prevent damage. Embodiments allow for quick and simple imaging which create easily organized, high quality digital document archives with searchable text fields.

Some embodiments include one or more imaging stations, where the imaging station includes one or more digital cameras, a document supporting mechanism or surface, one or more displays, one or more lights, an image activation mechanism, one or more computing devices, or the like. Additionally, some embodiments include one or more transparent vacuum insert assemblies, one or more vacuum or compressed air systems, or the like. The transparent vacuum insert assembly can be configured to stabilize physical documents by providing a vacuum effect to pull or hold the physical document flat against a transparent image surface. In some implementations, elements of the embodiments of the invention are communicatively coupled to one another. For example, a computing device and camera of an imaging station are communicatively coupled, and the computing device of the imaging station is communicatively coupled to a network.

Figure 4A:
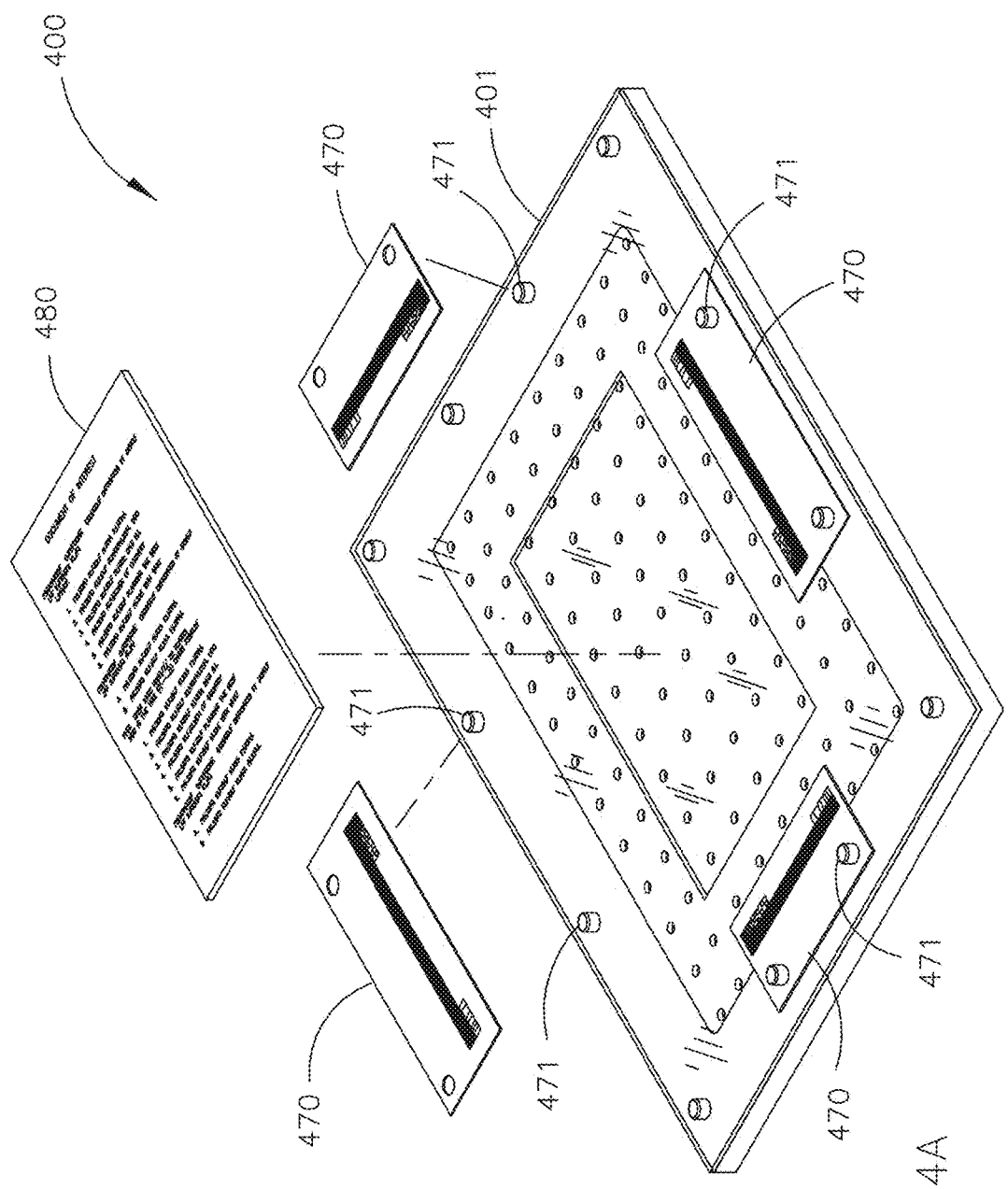
FIG. 4A shows an exemplary vacuum insert assembly of some embodiments.
Figure 4B:
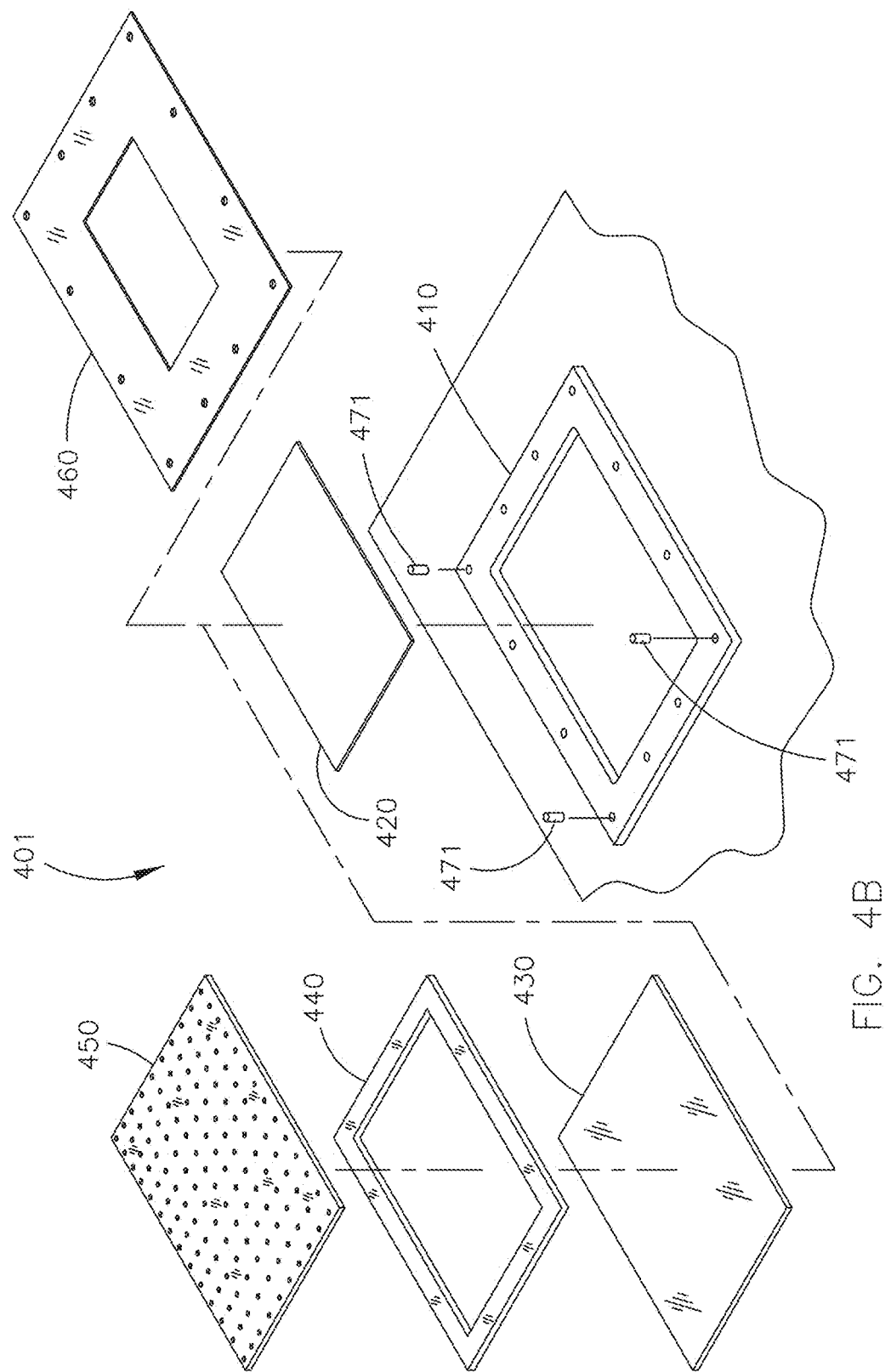
FIG. 4B shows components of the exemplary vacuum insert assembly depicted in FIG. 4A.
Figure 4C:
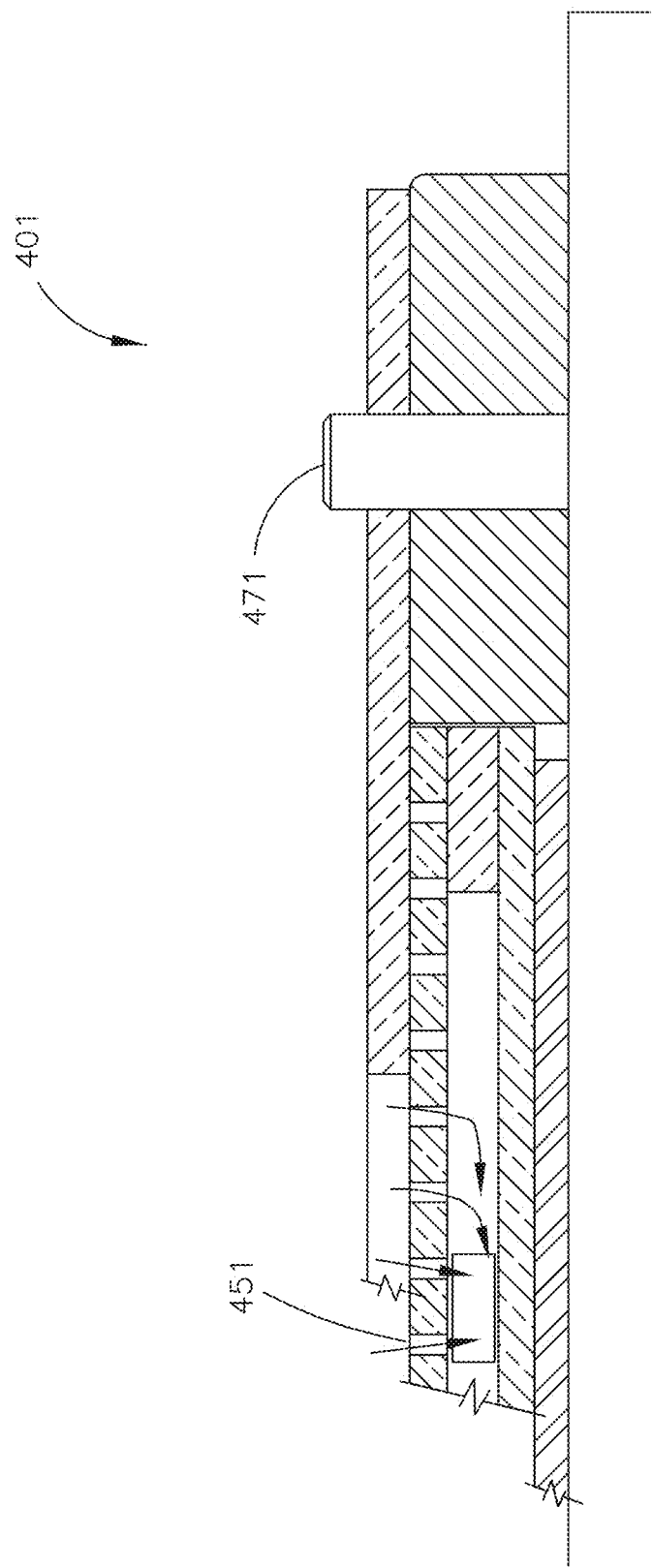
FIG. 4C shows a partial cross-sectional view of the exemplary vacuum insert assembly depicted in FIG. 4A.

Referring now to FIGS. 1A-1D, an exemplary imaging station 100 is depicted. Exemplary imaging station 100 is configured to image physical documents 160 (such as archival sheets). Some embodiments of the imaging station 100 include one or more digital cameras 110, one or more light panels 120, one or more displays 130, one or more activation buttons 140 configured to trigger the camera 110 to capture an image of a physical document, a document imaging area 190 (which may include a transparent vacuum insert assembly, such as depicted in FIGS. 4A-4C), an activation pedal 150, a compressed air connection 180, or the like. Some embodiments of the exemplary imaging station 100 include a modular frame structure with members configured to support elements of the imaging station. The frame can include light panel supports 121, display supports 131, camera supports 111, other support members 181, or the like.

Referring now to FIGS. 2A-2E, an exemplary imaging station 200 is depicted. Exemplary imaging station 200 is configured to image books 260. Some embodiments of the imaging station 200 include one or more digital cameras, one or more light panels, one or more displays, one or more activation buttons 240 configured to trigger the camera to capture an image of a physical document, a document imaging area 290 (which may include a transparent vacuum insert assembly, such as depicted in FIGS. 4A-4C), an activation pedal, or the like. Embodiments may additionally include a camera support 250. Embodiments may include a vacuum assembly 270 configured to create a lower differential pressure (e.g., a vacuum) within a transparent vacuum insert assembly to pull a page of a book 260 flat against the document imaging area 290. In some implementations, the vacuum assembly operates based upon the Venturi principle by flowing compressed air through a tee-apparatus, which includes an opening, a smaller opening 272, and side tee-branched tube 271; this effect creates a lower pressure (i.e., vacuum effect) in the tube 271; the tube 271 connects to the transparent vacuum insert assembly to create a vacuum effect which stabilizes a sheet of paper. In some embodiments, the document imaging area 290 includes one or more apertures 291 (such as elongated parallel apertures, round apertures, square apertures, or the like) as part of a transparent vacuum insert assembly. Additionally, the exemplary imaging station 200 includes a slide mechanism 220, whereby a portion of the apparatus can slide on a track to easily facilitate turning a page without removing the book from book support members (e.g., 210, 230) of the imaging station.

Referring to FIG. 2D-2E, some embodiments include a lift cylinder assembly 280 configured to raise or lower a book support 230. The lift cylinder assembly can be operated or powered through a compressed air (e.g., pneumatically driven) supply 281, 282. In some embodiments, the lift cylinder assembly 280 or the imaging station 200 includes a base 285.

Referring now to FIGS. 3A-3D, a further exemplary imaging station 300 is depicted. Exemplary imaging station 300 is configured to image microfiche cards 360 (which may include an image film portion 361 and a text portion 362). Some embodiments of the imaging station 300 include one or more digital cameras 310A, 310B, one or more light panels, one or more displays 330A, 330B, one or more activation buttons 340A, 340B each configured to trigger a particular camera to capture an image of a physical document, a document imaging area, or the like. In some embodiments, the exemplary imaging station 300 is configured to capture two images of a microfiche card 360, where a first image is captured of a portion of the microfiche card with the text portion 362, and wherein a second image is captured of a portion of the microfiche card 360 with the image film portion 361. For example, a user or an automated mechanism (such as a user-initiated automated mechanism, a process-initiated automatic mechanism (e.g., a computer-program-process-initiated automatic mechanism), a trigger-initiated automated mechanism, a semi-automated mechanism, or a fully automated mechanism) places the microfiche card 360 on a supporting surface 321; a first camera 310B images the text portion 362 of the microfiche card 360; the user or automated mechanism then slides the microfiche card 360 between a card supporting surface 321 and a second surface 320 (see, e.g., FIG. 3C); and the second surface 320 includes a window 320A, whereby the window 320A is configured to allow the second camera 310B to capture an image of the image film portion 361 of the microfiche card 360. Some embodiments include ball bearings 322 configure to reduce friction (and reduce or eliminate potential damage that could be caused to archival microfiche cards during imaging) of sliding a microfiche card 360 between the supporting surface 321 and the second surface 320.

Referring now to FIGS. 4A-4C, views of an exemplary transparent vacuum insert assembly 401 of an exemplary transparent vacuum insert system 400 of some embodiments are depicted. In some embodiments, the transparent vacuum insert assembly 401 includes a frame 410 (which may be comprised of metal, plastic, acrylic, wood, carbon-fiber, fiber glass, or the like), one or more control strips 470, pins 471, an "out of gamut" substrate 420 (e.g., which may comprise a blue, green, or a magenta screen or surface), as well as other layers 430, 440, 450, 460. In some embodiments, the vacuum insert assembly 401 is a transparent open-face vacuum insert assembly configured to support, stabilize, and exert suction on (e.g., when the vacuum is activated) a document 480.

Referring now to FIGS. 4B-4C, in some embodiments, the metal frame 410 includes holes (which exemplarily may be holes having a diameter of ¼ inch), wherein the holes are configured to receive a plurality of pins 471. In some embodiments, the pins 471 are configured to align the various layers (e.g., 410, 430, 440, 450, 460), and the pins 471 are configured to receive (e.g. register with or align with) the holes of the color strip 470.

Still referring to FIGS. 4B-4C, in some embodiments, the transparent vacuum insert assembly 401 comprises three or more layers 430, 440, 450 (e.g., sheets or partial sheets) of transparent acrylic. For example, a bottom layer 430 may comprise a solid sheet; a middle layer 440 may comprise an outside frame or border; and a top layer 450 may comprise a perforated sheet or sheet with a plurality of holes 451. For example, the three or more layers 430, 440, 450 may be stacked such that a hollow void exists is between the top layer 450 and the bottom layer 430, wherein air may be pulled or drawn through the holes of the top layer 450 when a vacuum is activated.

Additionally, in some embodiments, the transparent vacuum insert assembly 401 further comprises a transparent template layer 460. For example, the transparent template layer 460 may include a rectangular document window (which may be cut out of the template layer 460). The document window of the transparent template layer 460 may be of various sizes to accommodate documents 480 of any size. When the transparent template layer 460 is laid on top of the transparent vacuum insert assembly 401, the surface of the transparent template layer 460 which borders the document window is configured to block the perforations/holes of the top layer 450 which would otherwise be exposed to open air when a document is placed within the document window; this allows suction to pull the document flat against the top layer 450 of the transparent vacuum insert assembly 401 when the vacuum is activated.

Referring again to FIG. 4B, in some embodiments, the "out of gamut" substrate 420 comprises a brightly colored surface or screen, such as bright blue, bright green, or a magenta screen or surface. In some embodiments, the bright color of the "out of gamut" substrate 420 improves the ability of the imaging process to visually separate the live documents from the background of the apparatus. In some embodiments, the "out of gamut" substrate 420 is configured to reside within the boundaries of the frame 410 and rest upon an underlying surface which supports the frame; this allows a particular "out of gamut" substrate 420 to interchangeably be swapped for a differently colored "out of gamut" substrate without having to open the transparent vacuum insert assembly 401.

In some embodiments, the transparent vacuum insert assembly 401 is inserted within the frame 410 and on top of the "out of gamut" substrate 420. Additionally, the transparent template layer 460 may be placed on top of the transparent vacuum insert assembly such that the holes along the edges of the transparent template layer 460 register with pins 471.

Figure 4D:
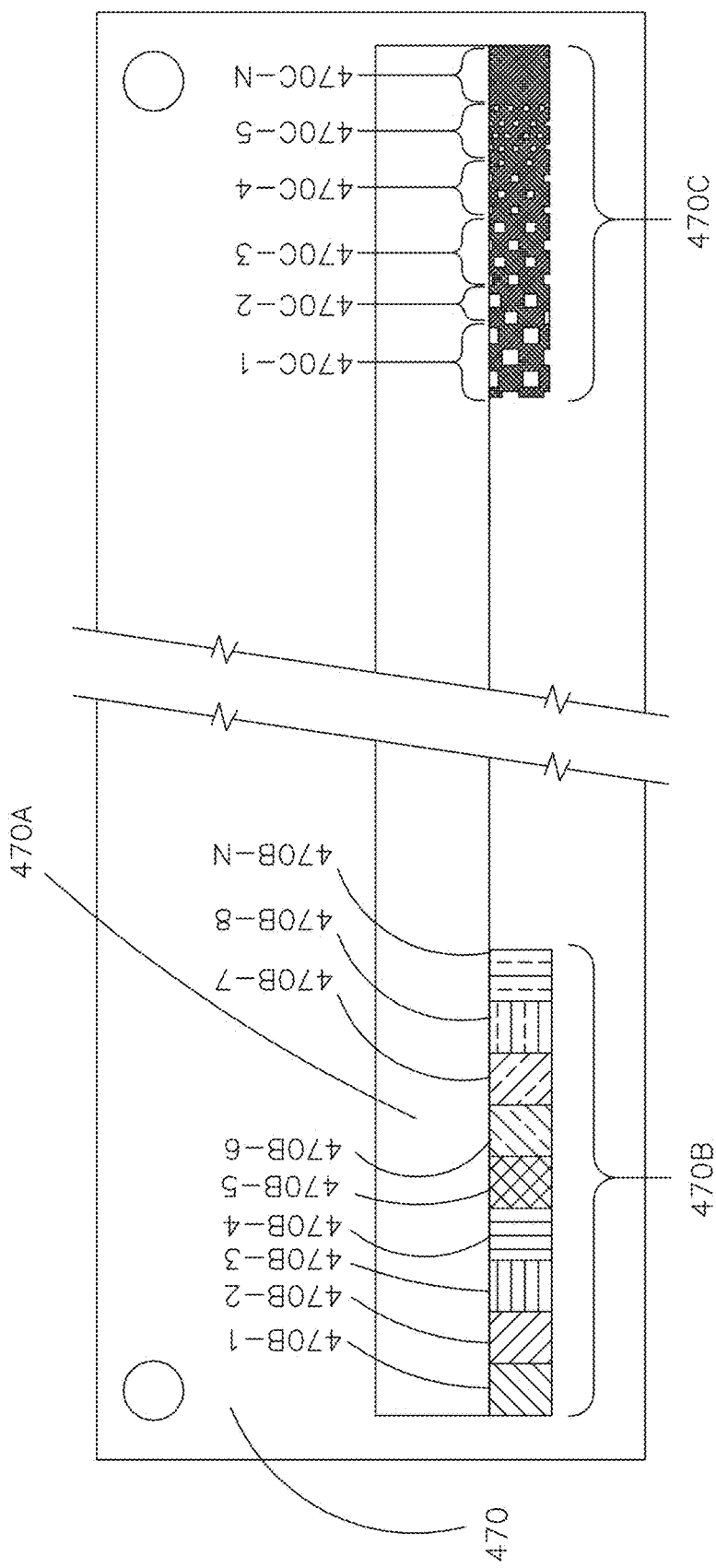
FIG. 4D shows a top view of an exemplary control strip 470 suitable for use with some embodiments.
Figure 5A:
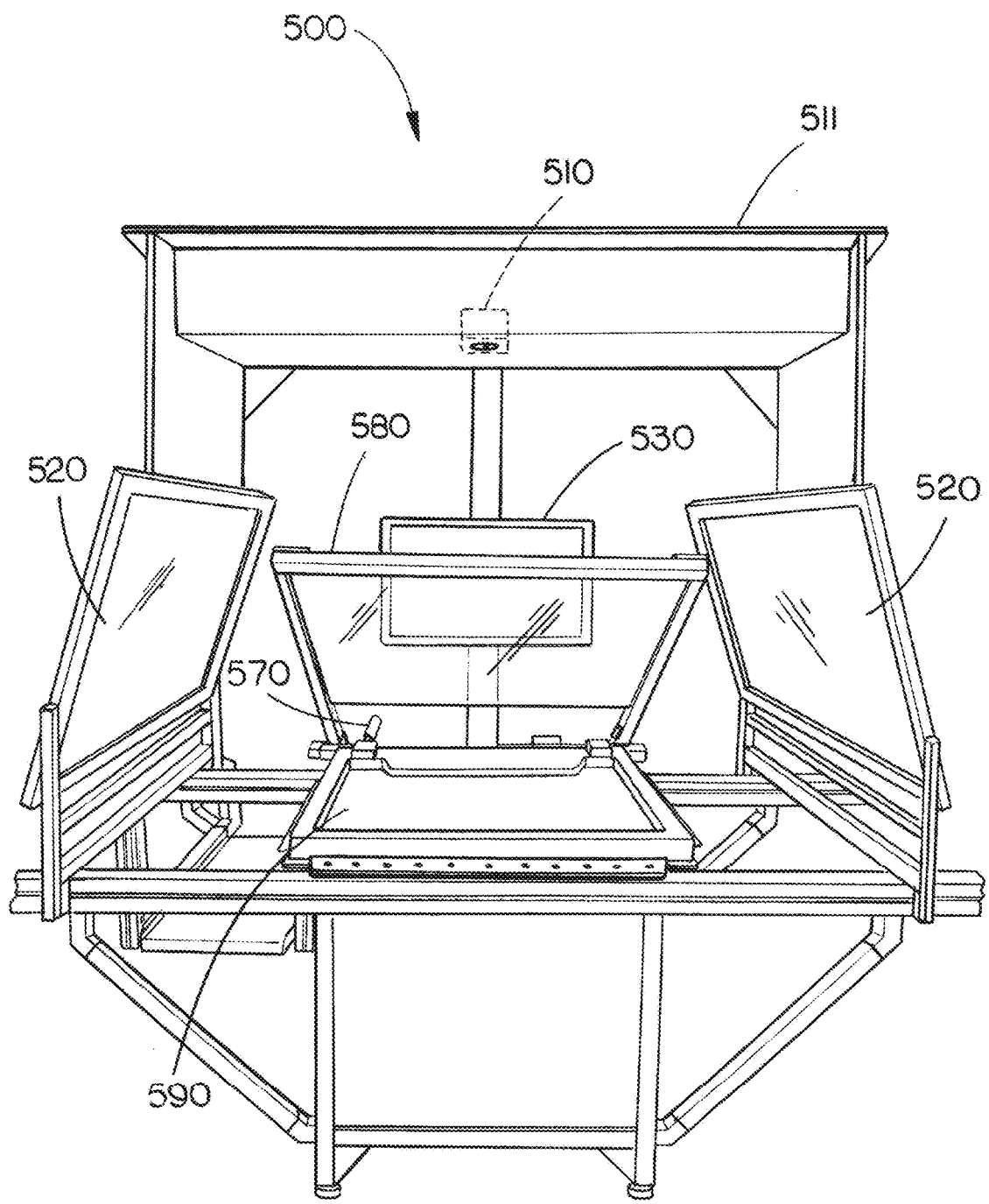
FIG. 5A shows a view of a further exemplary imaging station configured to image physical pages of a book.
Figure 5D:
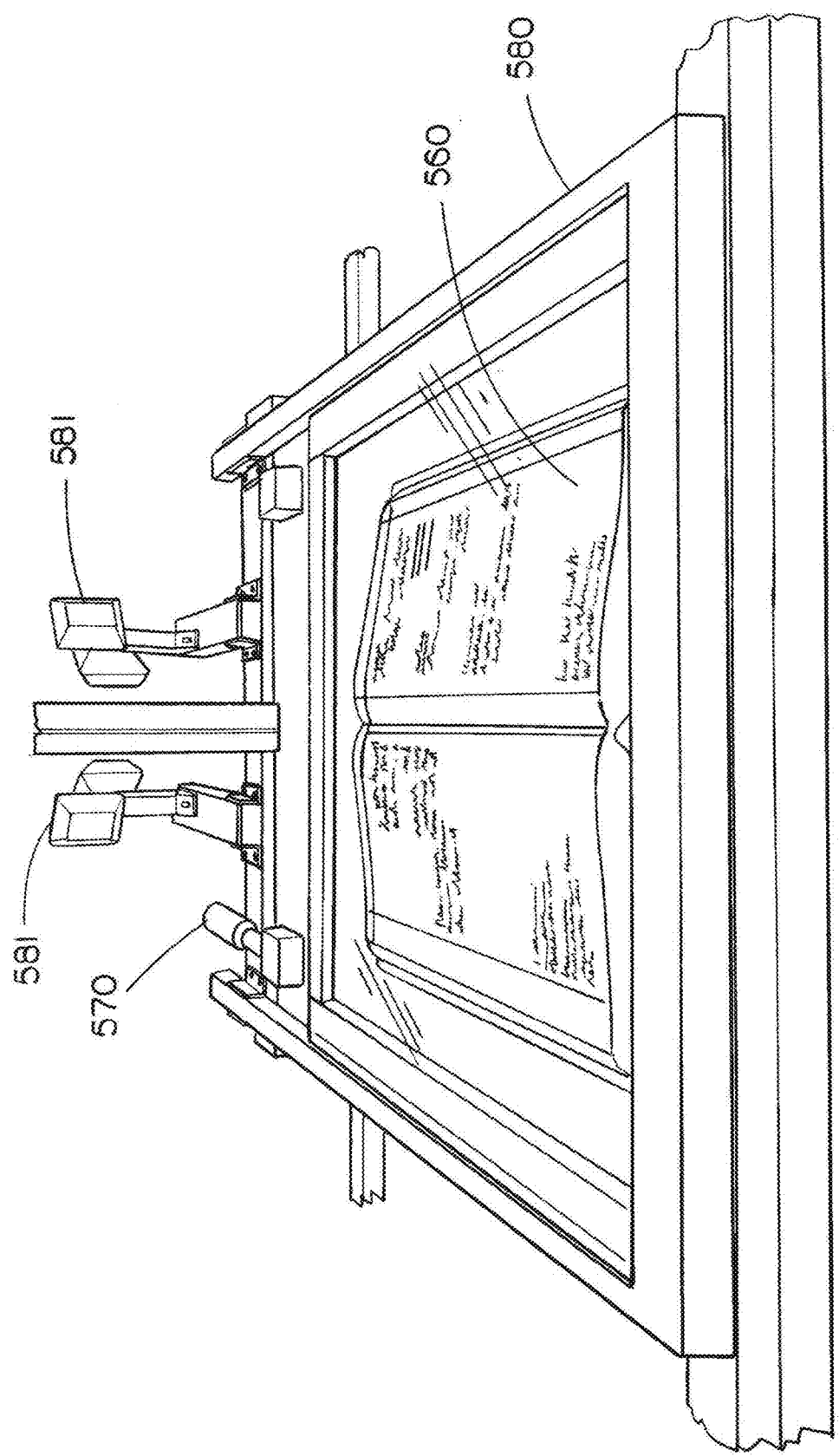
FIG. 5D shows an additional partial view of the further exemplary imaging station depicted in FIG. 5A.
Figure 5E:
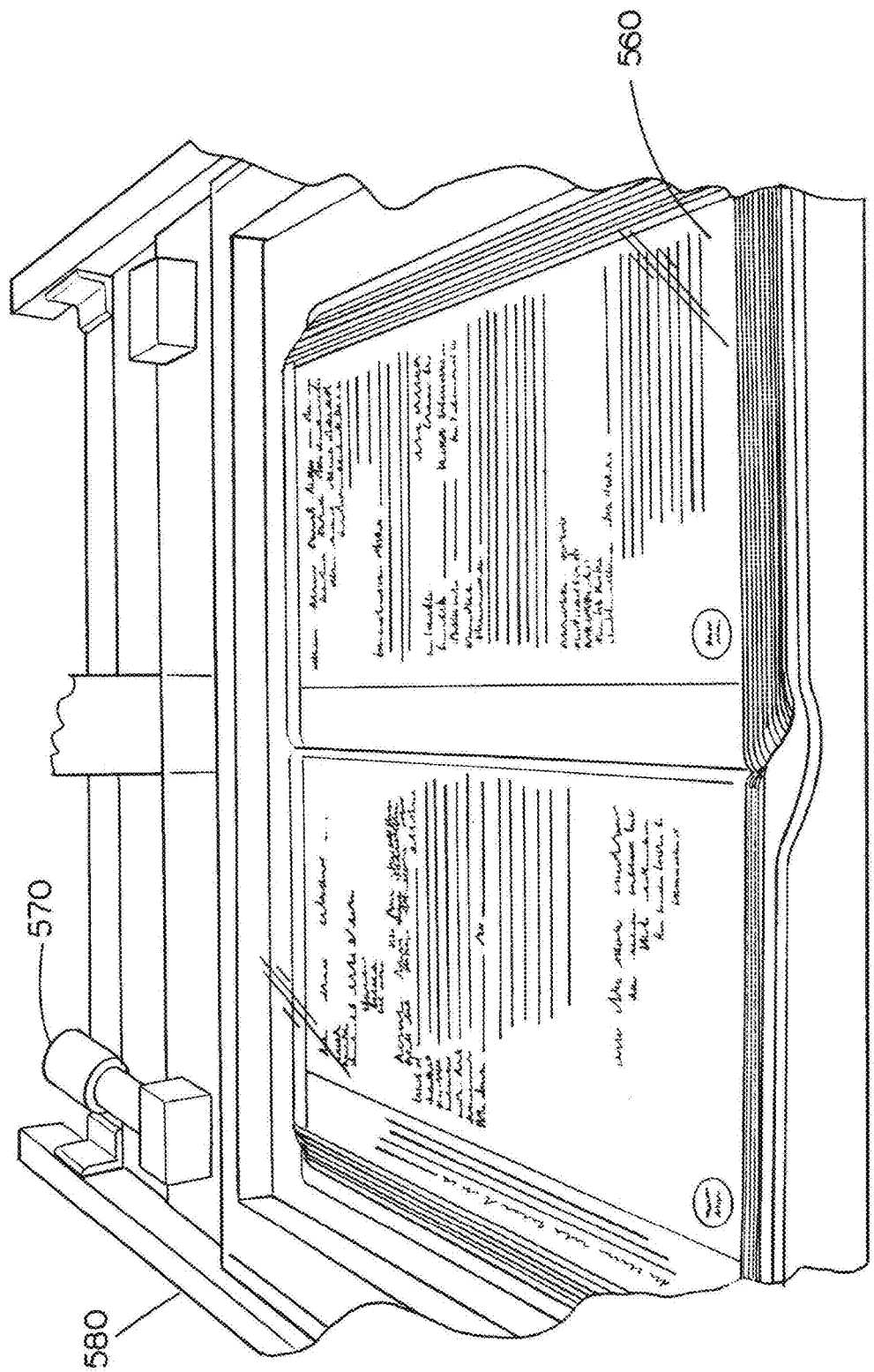
FIG. 5E shows a further partial view of the further exemplary imaging station configured to image physical pages of a book depicted in FIG. 5A.
Figure 5F:
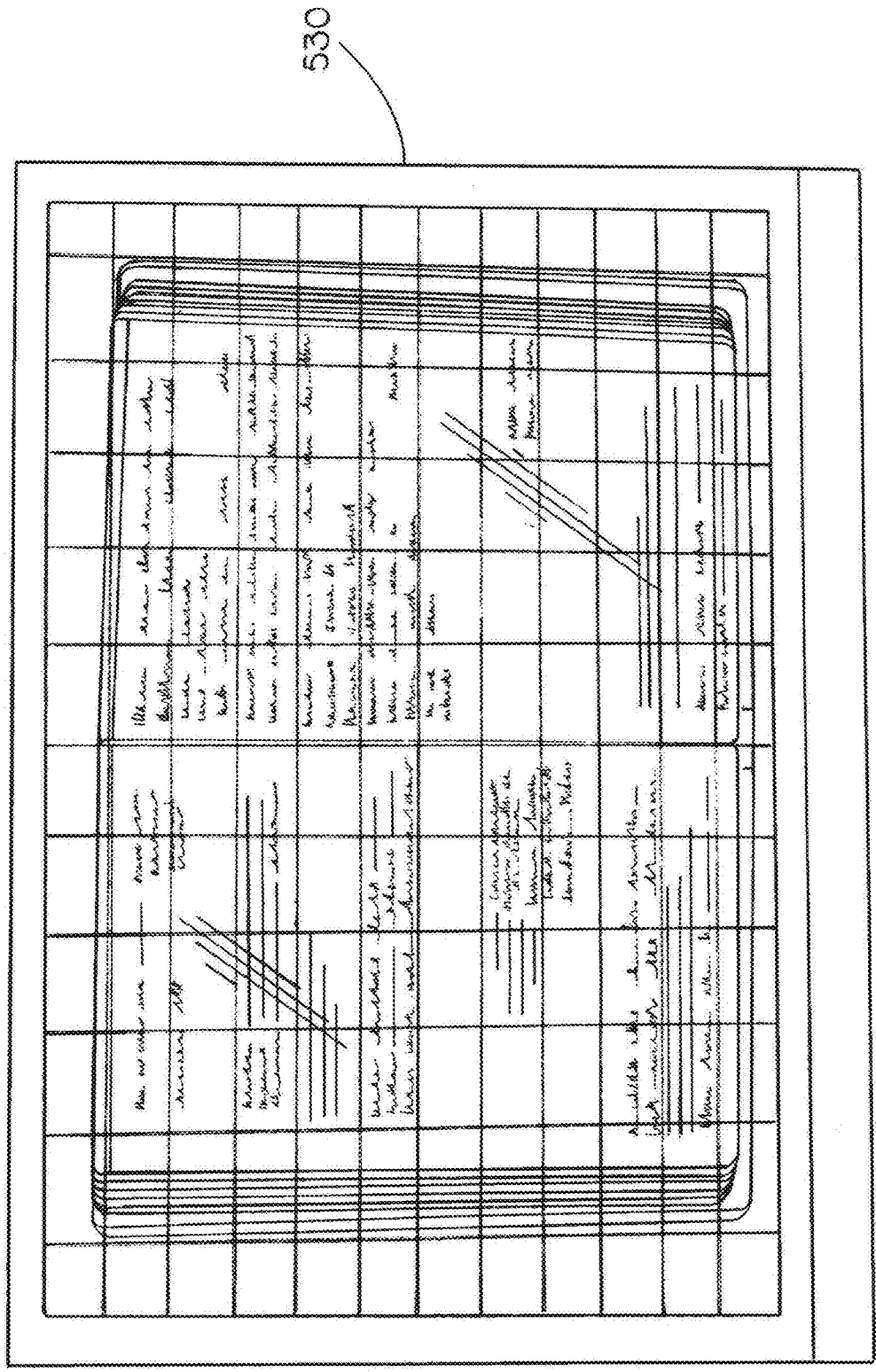
FIG. 5F shows another partial view of the further exemplary imaging station depicted in FIG. 5A.

Referring now to FIG. 4D, an exemplary control strip 470 of some embodiments is shown. Holes of control strips 470 are configured to register with pins 471 placed along the edges of the transparent vacuum insert assembly 401 of some embodiments or along a document imaging area of other imaging stations of some embodiments. In some embodiments (for example, as shown in FIG. 4A), four control strips 470 are placed along the sides of the transparent vacuum insert assembly 401. The control strips 470 may be placed in a precise location of the live imaging area and assists the image capture and image processing process in locating and measuring components of images. In some embodiments, each control strip includes a solid color bar 470A (e.g., a black bar), a color bar 470B, and a light-dark pattern bar 470C. The solid color bar 470A may have a known length and width, which allows an imaging process measure size and location. The color bar 470B may have a plurality of color areas (e.g., color blocks 470B-1, 470B-2, 470B-3, 470B-4, 470B-5, 470B-6, 470B-7, 470B-8, 470B-N) with each color block being a known different color at known location relative to the solid color bar 470A; for example, in a particular embodiment, the color bar 470B includes an arrangement of color blocks, which include dark gray, gray, light gray, red, magenta, yellow, green, indigo, and blue. The light-dark pattern bar 470C may include a pattern of progressively tighter (e.g., coarser to finer pattern tightness) light-dark patterns. The color bar 470B has a known location relative to the solid color bar 470A. In exemplary embodiments, the light-dark pattern bar 470C comprises a black-white pattern bar with a progressively tighter checker pattern (e.g., a series of checker block pattern sections, wherein each subsequent checker block pattern section in a particular direction along the light-dark pattern bar 470C has a smaller checker pattern). For example, the light-dark pattern area (e.g., the light-dark pattern bar 470C) includes a plurality of segments (e.g., 470C-1, 470C-2, 470C-3, 470C-4, 470C-5, 470C-N) arranged linearly from a first side of the light-dark pattern area to an opposite side of the light-dark pattern area, wherein each of the plurality of segments includes a geometrically similar repeating pattern of light pixel areas and dark pixel areas, wherein a size of each light pixel area and each dark pixel area of each particular segment progressively decreases from the first side of the light-dark pattern area to the opposite side of the light-dark pattern area. The light-dark pattern bar 470C has a known location relative to the solid color bar 470A. The control strips 470 may be used as known and static inputs (e.g., predetermined and known size, position, color, color arrangement, and known color patterns, the like) by the imaging process to locate and measure components of the image as well as for measuring the integrity and quality of each image captured by the camera. In some embodiments, each side of the transparent vacuum insert assembly 401 is configured to receive and is associated with a unique control strip 470 which can be identified and utilized throughout the imaging process.

Referring now to FIGS. 5A-5F, a further exemplary imaging station 500 configured to simultaneously image two pages of a book 560 is depicted. Some embodiments of the imaging station 500 include one or more digital cameras 510, a camera hood assembly 511, one or more light panels 520, one or more displays 530, one or more activation buttons 540 configured to trigger the camera to capture an image of two pages of a book 560, an activation pedal, a vacuum assembly 570, a transparent platen cover assembly 580, a book vacuum chamber assembly 590, one or more positioning lasers configured to emit a laser pattern 591 (such as a cross-hair pattern; a grid pattern; a pattern comprised of points, curves, and/or lines; or the like) onto a document imaging area of the book vacuum chamber assembly 590, or the like.

In some embodiments, the vacuum assembly 570 is configured to create a lower differential pressure (e.g., a vacuum) between the transparent platen cover assembly 580 and the book vacuum chamber assembly 590 to lift a flexible sheet 593, which supports a book 560, such that two pages of the book 560 are pulled flat against the bottom surface of a transparent portion 582 (e.g., a tempered glass portion) of the transparent platen cover assembly 580. In some implementations, the vacuum assembly 570 may operate based upon the Venturi principle by flowing compressed air through a tee-apparatus, which includes an opening, a smaller opening, and side tee-branched tube; this effect creates a lower pressure (i.e., vacuum effect) in the tube; the tube connects to the book vacuum chamber assembly 590 to create a vacuum effect. When the vacuum assembly 570 is activated, the vacuum effect draws the flexible sheet 593 (e.g., such as a gum rubber sheet, a neoprene sheet, a nylon sheet, a Kevlar sheet, a polyester sheet, or the like) and the book 560 resting upon the flexible sheet 582 toward and against the bottom surface of the transparent portion 582 of the transparent platen cover assembly 580.

In some embodiments, the transparent platen cover assembly 580 is attached (e.g., via hinges) to one or more portions of the imaging station 500 along a pivot axis such that the transparent platen cover assembly 580 can swing to an open position or swing to a closed or sealed position with respect to the book vacuum chamber assembly 590. When the transparent platen cover assembly 580 is in a closed or sealed position with respect to the book vacuum chamber assembly 590, surfaces along a frame of the transparent platen cover assembly 580 may abut a top layer 592 of the book vacuum chamber assembly 590 to create an air seal (e.g., a semi-permeable or impermeable air seal) configured to maintain a pressure differential, when the vacuum assembly 570 is activated, between (a) a space between the transparent platen cover assembly 580 and the book vacuum chamber assembly 590, and (b) outside of the space between the transparent platen cover assembly 580 and the book vacuum chamber assembly 590. In some embodiments, the transparent platen cover assembly 580 includes a transparent portion 582 (e.g., glass, such as tempered glass) configured to allow high-quality images of one or more pages (e.g., one page or two pages simultaneously) of a book 560 to be imaged by a camera. In some embodiments, the transparent platen cover assembly 580 includes one or more counterweights 581 configured to balance (or reduce the imbalance) the weight or torque of the transparent platen cover assembly 580 on each side of the pivot axis so as to reduce the amount of force required to move the transparent platen cover assembly 580 between open and closed positions.

Figure 6A:
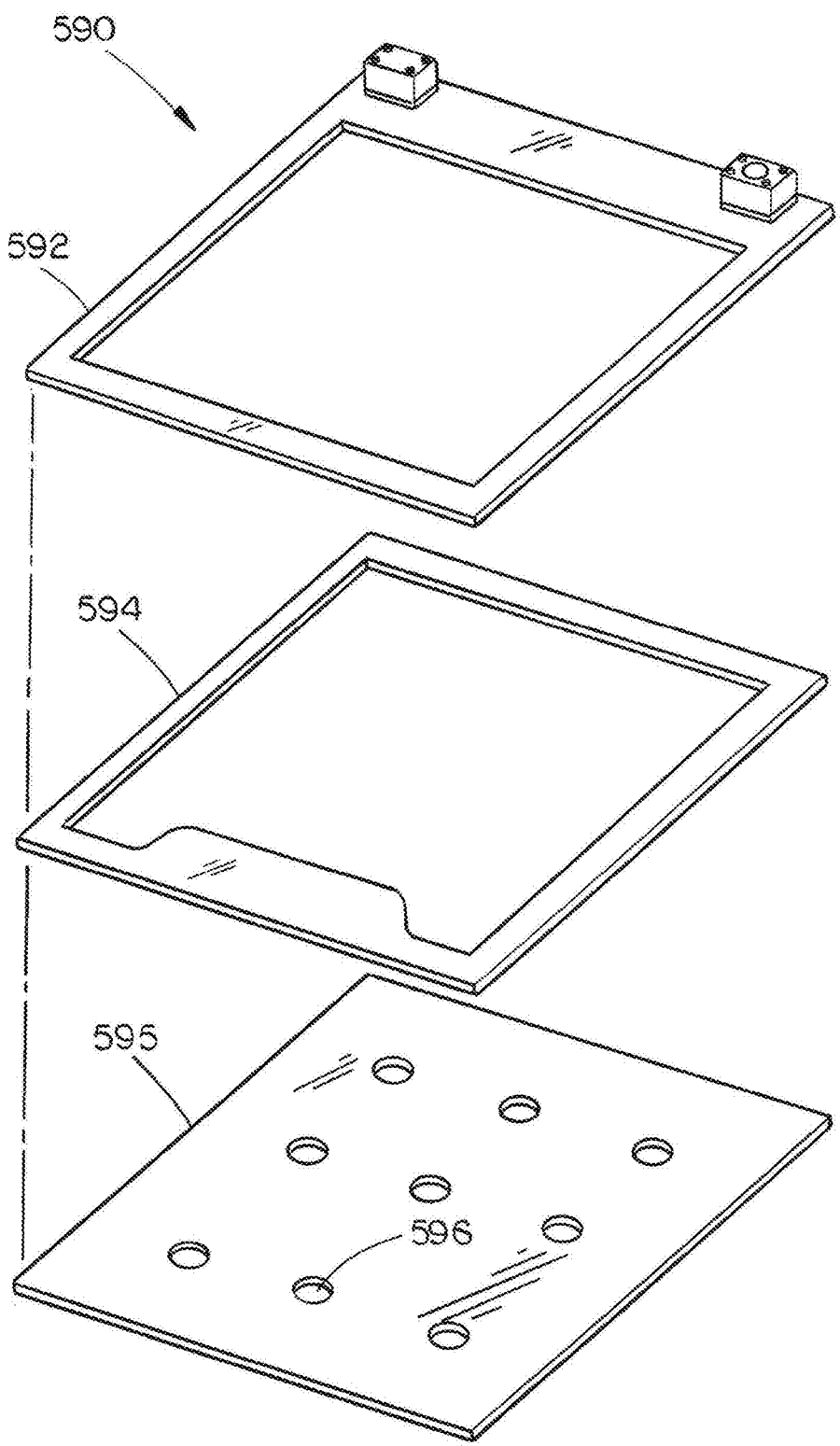
FIG. 6A shows a partial exploded view of a book vacuum chamber 590 of the further exemplary imaging station, which is depicted in FIG. 5A.

Referring now to FIG. 6A, an exploded view of some exemplary portions of the book vacuum chamber assembly 590 of the imaging station 500 of some embodiments is depicted. For example, the book vacuum chamber assembly 590 may include a top layer 592, a flexible sheet 593 (as shown in FIGS. 6B-C), one or more spacers 594, and a bottom layer 595. In a particular embodiment, the top layer 592, one or more spacers 594, and the bottom layer 595 may be comprised of acrylic; however, in other exemplary embodiments, the top layer 592, one or more spacers 594, and the bottom layer 595 may be comprised of any suitable material or materials. Additional spacers 594 can be added or removed to accommodate different thicknesses of books; for example, an exemplary implementation, which includes four spacers 594, may accommodate books over four inches thick; as such, the exemplary embodiment allows for easily imaging of even the first few pages when the left side of the book may be ⅛" thick and the right side may be 4" thick. In some embodiments, the bottom layer 595 includes one or more apertures 596 configured to allow air to flow freely through the one or more apertures 596 of the bottom layer 595 such that an atmospheric pressure acts on the bottom side of the flexible sheet 593.

Referring now to FIGS. 6B-6C, exemplary cross-section views of the platen cover assembly 580 and the book vacuum chamber 590 of some embodiments of the imaging station 500 are depicted.

FIG. 6B shows an exemplary cross-sectional view of a partially opened platen cover assembly 580 and the book vacuum chamber 590 of the imaging station 500 of some embodiments. As shown in FIG. 6B, the platen cover assembly 580 is in a partially open position with a gap between the platen cover assembly 580 and the book vacuum chamber 590. In some embodiments, when the vacuum assembly 570 is deactivated the flexible sheet 593 is stretched downward against the bottom layer 595 (as shown) due to the weight of the book 560; while in other embodiments, the flexible sheet may be configured to support sufficient tensile forces such that the flexible sheet 593 remains suspended above the bottom layer 595 even when supporting the book 560. In exemplary embodiments, the vacuum assembly 570 is deactivated when the platen cover assembly 580 is in an open position/raised position.

In some implementations, the flexible sheet 593 is porous, perforated, or includes apertures configured to let some air through the flexible sheet 593; in implementations which the flexible sheet 593 is porous, perforated, or includes apertures, the flexible sheet 593 is configured to allow some air to pass through the flexible sheet 593 but still maintain a pressure differential (between the sealed/closed book vacuum chamber assembly and outside the flexible sheet 593) sufficient to lift the book 560 toward the bottom surface of the transparent portion 582 of the transparent platen cover assembly 580 when the vacuum assembly 570 is activated. In other implementations, the flexible sheet 593 is substantially air tight such that only a negligible amount of air permeates the flexible sheet 593.

Referring now to FIG. 6C, an exemplary cross-sectional view of a closed and/or sealed platen cover assembly 580 and the book vacuum chamber 590 of the imaging station 500 of some embodiments is shown. Once the platen cover assembly 580 is in a closed and sealed position, a user or automated process (e.g., upon detection of the platen cover assembly 580 being in a closed position) can trigger the activation of the vacuum assembly 570 to vacuum air from a space between the platen cover assembly 580 and the book vacuum chamber 590. As the air is vacuumed out of the space, the flexible sheet 593 raises up and conforms to the shape of the book 560 and the pages of the book 560 are flattened and pressed against the bottom of the transparent portion 582 of the platen cover assembly 580. As the book 560 is pressed against the bottom surface of the transparent portion 582 of the transparent platen cover assembly 580, the pages of the book 560 are substantially flattened into a single focal plane along the surface of the transparent portion 582 of the transparent platen cover assembly 580. Pressing the pages of the book 560 into the single focal plane improves the quality of images to be captured by the camera 510 and reduces sources of image distortion along the center spine of the book where the pages of an opened book meet.

Once the pages of the book 560 are imaged by the camera 510, a vacuum cycle progresses towards completion, and the vacuum assembly 570 is deactivated causing the book 560 and the flexible sheet 593 to drop down and away from the transparent platen cover assembly 580 (to a state as similarly shown in FIG. 6B). Once vacuum assembly 570 is deactivated, the transparent platen cover assembly 580 may be raised (e.g., by a user, an automated process, or a mechanized process). Once the transparent platen cover assembly 580 is raised, the position laser may emit a laser pattern 591 onto the book 560 and/or flexible sheet 593 (e.g., as shown in FIG. 5C) for setting up another image capture of the book 560, and a new imaging cycle/vacuum cycle can begin.

Exemplary embodiments of the imaging station 500 are configured to accommodate and operate with books weighing as much as 20 pounds or more. Additionally, exemplary imaging stations 500 is configured to perform an imaging cycle of positioning and imaging two pages of a book 560 every 12 seconds or less (which results in at least 300 images per hour or at least 600 pages per hour).

Figure 7A:
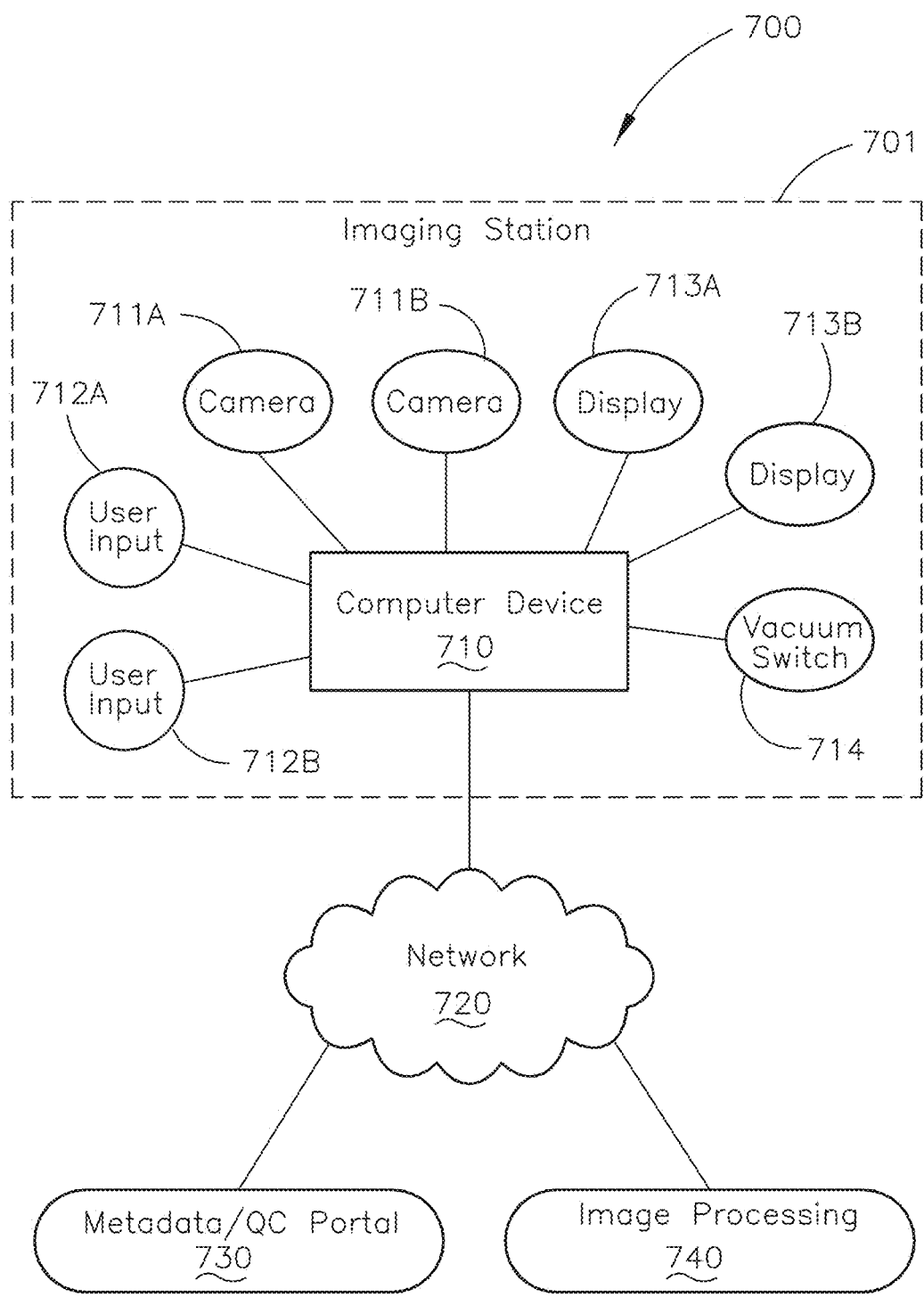
FIG. 7A shows an exemplary system topology diagram of an exemplary embodiment of the invention.
Figure 7B:
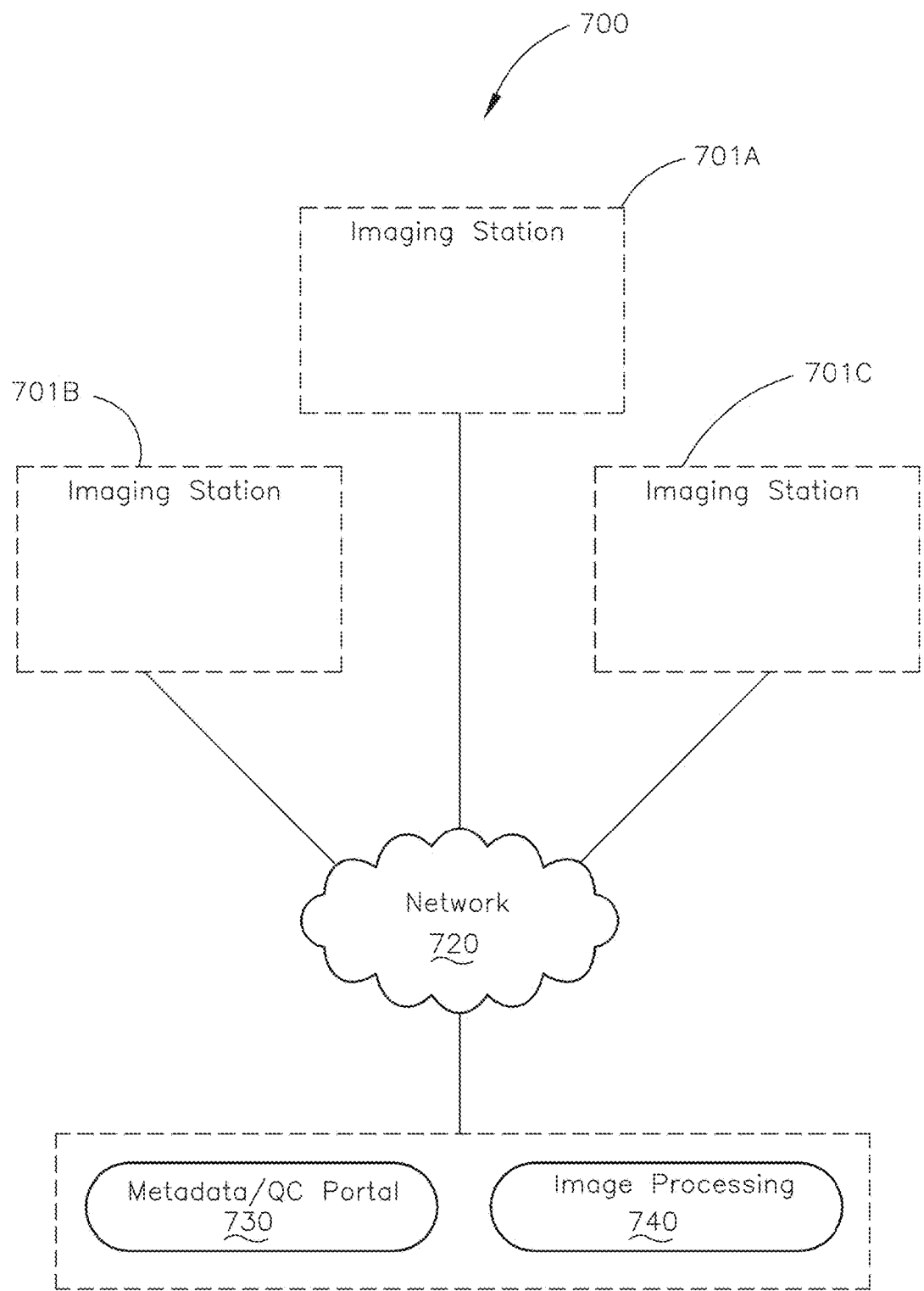
FIG. 7B shows a further exemplary system topology diagram of an exemplary embodiment of the invention.

Referring now to FIGS. 7A-7B, a diagram of an exemplary system 700 of an exemplary embodiment of the invention is depicted. For example, in some embodiments, the system 700 includes one or more imaging stations 701, 701A, 701B, 701C (which, for example, may be implemented as any of imaging stations 100, 200, 300, 500); a network 720; a metadata/quality control portal 730; an imaging processing device or module 740; or the like, wherein the elements of the system are communicatively coupled via the network 720. In some embodiments, the imaging station 701 includes one or more user input devices 712A, 712B; one or more sensor devices, such as cameras 711A, 711B; one or more output devices, such as displays 713A, 713B; a vacuum switch 714; at least one computing device 710; or the like, wherein one or more of the elements of the imaging system 701 are communicatively coupled.

Figure 8:
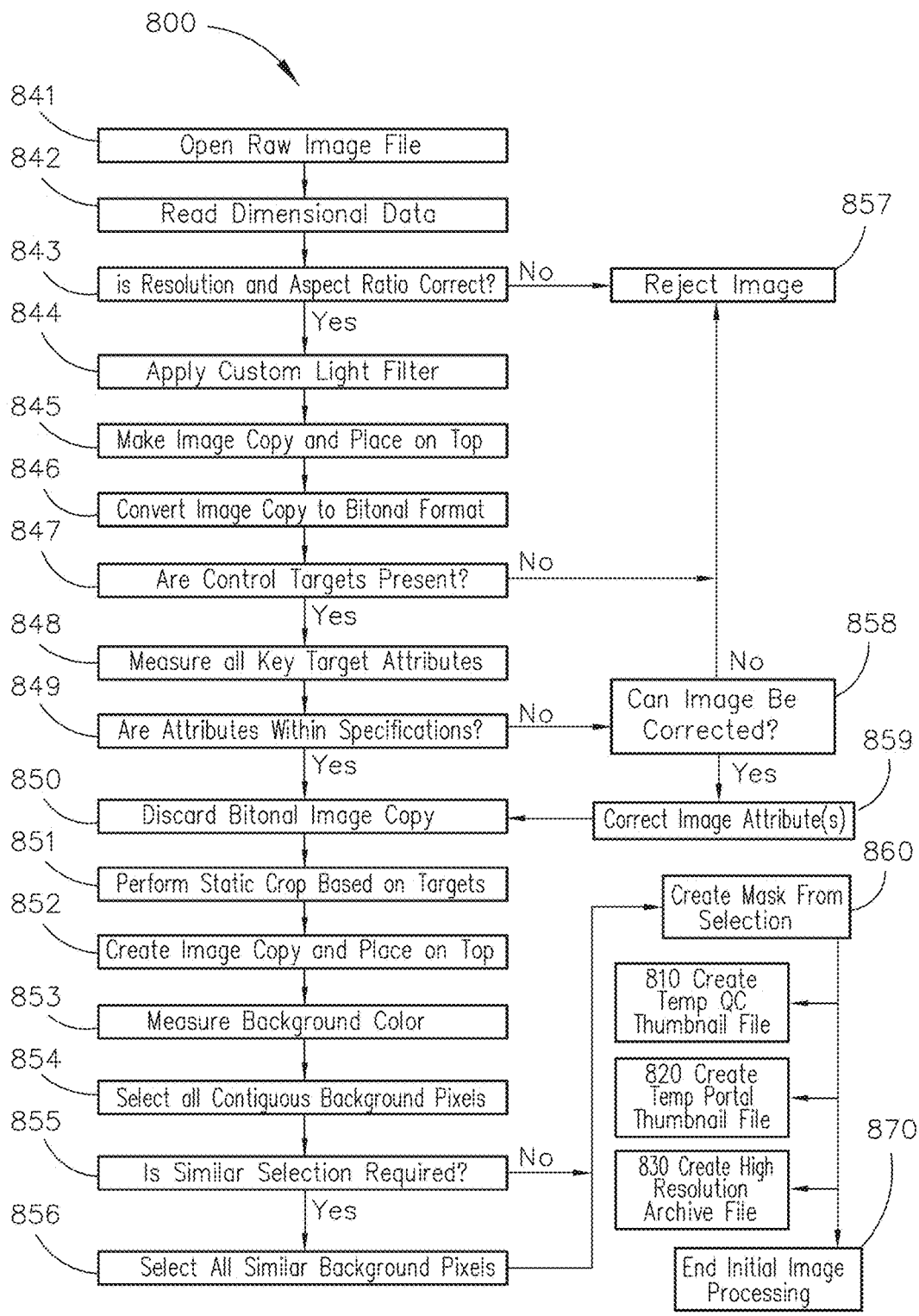
FIG. 8 shows a flow diagram of an exemplary initial imaging process.
Figure 9:
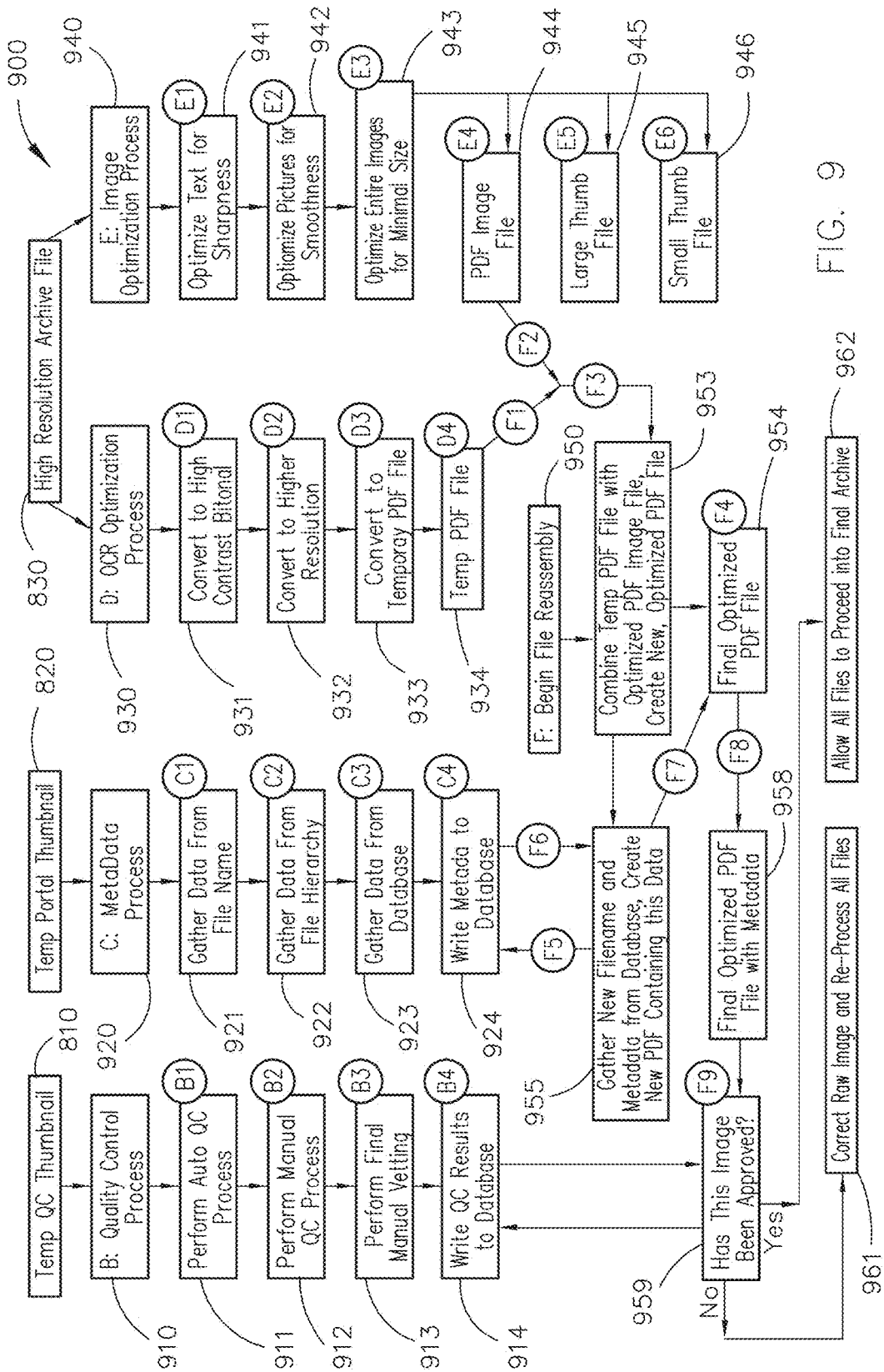
FIG. 9 shows a flow diagram of a further exemplary imaging process.

Referring now to FIGS. 8-9, exemplary methods 800, 900 for image processing of some embodiments are depicted.

Referring now to FIG. 8, an exemplary method 800 for performing initial image processing of some embodiments is depicted. It is contemplated that embodiments of the method 800 can be performed by one or more of the following: an apparatus, a system, an apparati of a system, a sub-system of a system, an imaging station 701, one or more elements of an imaging station 701, a computing device (such as computing device 710 of the imaging station 701 or another computing device connected to the network 720); at least one component, integrated circuit, controller, processor, or module of a computing device (such as computing device 710 of the imaging station 701 or another computing device connected to the network 720); software or firmware executed on a computing device (such as computing device 710 of the imaging station 701 or another computing device connected to the network 720); other computing devices (such as a computing device of a metadata/quality control portal 730, an image processing portal 740, a mobile computing device, or the like); other computer components; or on other software, firmware, or middleware of a system topology. The method 800 can include any or all of steps 841, 842, 843, 844, 845, 846, 847, 848, 849, 850, 851, 852, 853, 854, 855, 856, 857, 858, 859, 860, 810, 820, 830, and/or 870, and it is contemplated that the method 800 includes additional steps as disclosed throughout, but not explicitly set forth in this paragraph. Further, it is fully contemplated that the steps of the method 800 can be performed concurrently, sequentially, or in a non-sequential order. Likewise, it is fully contemplated that the method 800 can be performed prior to, concurrently, subsequent to, or in combination with the performance of one or more steps of one or more other methods disclosed throughout.

Some embodiments of the method 800 include a step 841, wherein the step 8841 comprises opening a raw image file. Additionally, some embodiments of the method 800 include a step 842, wherein the step 842 comprises reading dimensional data of the raw image file. Some embodiments of the method 800 also include the step 843, which comprises determining whether a resolution and aspect ratio of the raw image file is acceptable (e.g., correct or accurate). If the resolution and the aspect ratio of the image are not acceptable, then the image file is rejected (step 857). Additionally, some embodiments of the method 800 include the step 844, which comprises applying a light filter (such as a custom light filter) upon determining that the resolution and the aspect ratio of the image are acceptable. Some embodiments of the method 800 include the step 845, which comprises creating a copy of the raw image and placing the image copy on top of the raw image. Some embodiments of the method 800 further include the step 846, which comprises converting the image copy to a bitonal format. Some embodiments of the method 800 include the step 847, which comprises determining whether control targets (e.g., control strips 470) are present in the image file and/or image copy. If the control targets are determined to be absent, then the image file is rejected (step 857). Some embodiments of the method 800 additionally include the step 848, which comprises measuring control target attributes (e.g., location, orientation, sharpness, focus, or the like). Some embodiments of the method 800 further include the step 849, which comprises determining whether the control target attributes are within predetermined allowable specifications. If the control targets attributes are determined to be outside of the predetermined allowable specifications, the method further includes a step 858 of determining whether the image file can be corrected. If it is determined that the image file cannot be corrected, then the image file is rejected (step 857); however, if the image file is determined to be correctable, then the method includes a step 859 of correcting one or more image attributes to at least within the predetermined allowable specifications. Some embodiments of the method 800 include the step 850, which comprises discarding the image copy (e.g., the bitonal format image copy) upon (a) a determination that the control target attributes are within the predetermined allowable specifications or upon (b) correcting one or more image attributes to at least within the predetermined allowable specifications. Some embodiments of the method 800 include the step 851, which comprises performing a static crop of the raw image based on the control target attributes (e.g., attributes of the control strips 470). Some embodiments of the method 800 also include the step 852, which comprises creating a copy of the cropped image and placing the image copy on top of the cropped image. Some embodiments of the method 800 further include the step 853, which comprises measuring a background color of the image file and/or image copy, wherein the background color of the image file corresponds to the color of the "out of gamut" substrate 420. Some embodiments of the method 800 include the step 854, which comprises detecting and selecting all contiguous background color pixels based upon the measured background color of the image file and/or image copy. Some embodiments of the method 800 further include the step 855, which comprises determining whether similar background pixels are required to be selected, wherein similar background pixels are background pixels with a same pixel color or approximately the same pixel color as the selected contiguous background color pixels but may be non-contiguous to the selected contiguous background pixel colors. If a selection of similar background pixels is not required, then method 800 for the initial imaging process will continue on with the performance of step 860. On the other hand, in some embodiments, the method 800 includes the step 856, which comprises selecting some or all of the similar background pixels upon a determination that a selection of similar background pixels is required. Some embodiments of the method 800 include the step 860, which comprises creating a mask (sometimes referred to as an alpha channel; described in more detail with reference to FIGS. 15D-G) from the selected background pixels (e.g., from the selected contiguous background pixels or from the selected contiguous background pixels and the similar background pixels). Some embodiments of the method 800 include the step 810, which comprises creating a temporary quality control (QC) thumbnail file upon creation of the mask. The temporary quality control thumbnail file may be used by a quality control process 910 in method 900, as described below. Some embodiments of the method 800 include the step 820, which comprises creating a temporary metadata thumbnail file (e.g., a temporary metadata portal thumbnail file) upon creation of the mask. The temporary metadata thumbnail file may be used by a metadata process 920 in the method 900, as described below. Some embodiments of the method 800 include the step 830, which comprises creating a high resolution archive file upon creation of the mask. The high resolution archive file may be used by an optical character recognition (OCR) optimization process 930 and an image optimization process 940 in the method 900, as described below. Some embodiments of the method 800 include the step 870, which comprises completing the initial image processing.

Referring now to FIG. 9, an exemplary method 900 for image processing of some embodiments is depicted. It is contemplated that embodiments of the method 900 can be performed by one or more of the following: an apparatus, a system, an apparati of a system, a sub-system of a system, an imaging station 701, one or more elements of an imaging station 701, a computing device (such as computing device 710 of the imaging station 701 or another computing device connected to the network 720); at least one component, integrated circuit, controller, processor, or module of a computing device (such as computing device 710 of the imaging station 701 or another computing device connected to the network 720); software or firmware executed on a computing device (such as computing device 710 of the imaging station 701 or another computing device connected to the network 720); other computing devices (such as a computing device of a metadata/quality control portal 730, an image processing portal 740, a mobile computing device, or the like); other computer components; or on other software, firmware, or middleware of a system topology. The method 900 can include any or all of steps 910, 911, 912, 913, 914, 920, 921, 922, 923, 924, 930, 931, 932, 933, 934, 940, 941, 942, 943, 944, 945, 946, 950, 953, 954, 955, 958, 959, 961, and/or 962, and it is contemplated that the method 900 includes additional steps as disclosed throughout, but not explicitly set forth in this paragraph. Further, it is fully contemplated that the steps of the method 900 can be performed concurrently, sequentially, or in a non-sequential order. Likewise, it is fully contemplated that the method 900 can be performed prior to, concurrently, subsequent to, or in combination with the performance of one or more steps of one or more other methods disclosed throughout.

As shown in FIG. 9, some embodiments of the method 900 may include performance of a plurality of processes and/or sub-processes; for example, the method 900 may include performance of a quality control process 910, a metadata process 920, an OCR optimization process 930, an image optimization process 940, and a file reassembly process 950. In exemplary embodiments, the method 900 may be performed as a plurality of iterations on a plurality of document images, wherein each iteration of the method 900 processes one or more images and/or one or more files associated with a particular imaged document.

In some embodiments, the quality control process 910 includes performance of a plurality of sub-processes. In exemplary embodiments, the quality control process 910 performs quality control operations on the temporary quality control thumbnail file 810. The quality control process 910 may include a step 911 of performing an automated quality control process on the temporary quality control thumbnail file 810. The quality control process 910 may also include a step 912 of performing a manual quality control process; for example, the step 912 may include presenting (e.g., displaying) an image or file (e.g., the temporary quality control thumbnail file 810) to a user (e.g., a quality control user) on a computing device (e.g. metadata/quality control portal 730) to inspect the temporary quality control thumbnail file 810 and receiving one or more inputs (e.g., selections, approval, rejections, flagging an image, notations, or the like) from the user upon presenting the image or file to the user. The quality control process 910 may also include a step 913 of performing a final manual vetting (e.g. visual examination) of the temporary quality control thumbnail file 810 to approve the image. The quality control process 910 may additionally include a step 914 of writing the quality control results to a database.

In some embodiments, the metadata process 920 includes performance of a plurality of sub-processes. In exemplary embodiments, the metadata process 920 performs metadata processing operations on the temporary metadata thumbnail file 820. The metadata process 920 may include a step 921 of gathering data from the file name (e.g., the temporary metadata thumbnail file 820). The metadata process 920 may also include a step 922 of gathering data from a file hierarchy. The metadata process 920 may further include a step 923 of gathering data from a database. The metadata process 920 may additionally include a step 924 of writing metadata (e.g., gathered data) to the database.

In some embodiments, the optical character recognition (OCR) optimization process 930 includes performance of a plurality of sub-processes. In exemplary embodiments, the optical character recognition (OCR) optimization process 930 performs OCR optimization processing operations on the high resolution archive file 830 or a copy of the high resolution archive file 830. The optical character recognition (OCR) optimization process 930 may include a step 931 of converting the high resolution archive file 830 or a copy of the high resolution archive file 830 to a high contrast bitonal image file. The optical character recognition (OCR) optimization process 930 may also include a step 932 of converting the high contrast bitonal image file to a higher resolution. The optical character recognition (OCR) optimization process 930 may further include a step 933 of converting the higher resolution high contrast bitonal image file to a temporary PDF (portable document format) file. The optical character recognition (OCR) optimization process 930 may additionally include a step 934 of storing the temporary PDF file.

In some embodiments, the image optimization process 940 includes performance of a plurality of sub-processes. In exemplary embodiments, the image optimization process 940 performs image optimization processing operations on the high resolution archive file 830 or a copy of the high resolution archive file 830. The image optimization process 940 may include a step 941 of improving sharpness of text (e.g., optimizing text for sharpness). The image optimization process 940 may also include a step 942 of improving image smoothness (e.g., optimizing pictures for smoothness). The image optimization process 940 may further include a step 943 of reducing a size of the high resolution archive file 830 or a copy of the high resolution archive file 830 (e.g. optimizing an entire image for minimal size). The image optimization process 940 may additionally include a step 944 of creating and/or storing an optimized PDF image file upon performance of one or more (e.g., one, two, or three) of steps 941, 942, 943. The image optimization process 940 may further include a step 945 of creating and storing a large thumbnail file upon performance of one or more (e.g., one, two, or three) of steps 941, 942, 943. Additionally, the image optimization process 940 may include a step 946 of creating and storing a small thumbnail file upon performance of one or more (e.g., one, two, or three) of steps 941, 942, 943.

In some embodiments, the file reassembly process 950 includes performance of a plurality of sub-processes. In exemplary embodiments, the file reassembly process 950 performs file reassembly operations on one or more files loaded, used, written, created, and/or stored during performance of either or both the method 800 or the method 900. The file reassembly process 950 may include a step 953 of combining the temporary PDF file (e.g., which was created, stored, and/or modified in step 934) with the optimized PDF image file (e.g. which was created, stored, and/or modified in step 944) to create a new optimized PDF image file. The file reassembly process 950 may also include step 955 of gathering (e.g., reading) metadata and/or filename data from the database and creating a new PDF file which contains the gathered data (e.g., the gathered metadata). The file reassembly process 950 may also include steps 954 and 958 of creating a final optimized PDF file which includes metadata based on the new optimized PDF image file and the gathered data (from step 955). In some embodiments, the steps 954, 955, 958 may be combined into a single step, which may, for example, comprise creating a final optimized PDF file based at least upon (a) the new optimized PDF image file and (b) metadata gathered from the database; similarly, for example, the steps 954, 955, 958 may be combined into a single step of creating a final optimized PDF file by incorporating the gathered metadata into the new optimized PDF image file. The file reassembly process 950 may additionally include a step 959 of verifying (e.g., checking) whether a particular image associated with the final optimized PDF file has been approved during the quality control process 910 by accessing the quality control results for the particular image which were written to the database (in step 914). The file reassembly process 950 may include a step 961: upon a verification that the particular image associated with the final optimized PDF file has been approved, all associated files (e.g., the final optimized PDF file, any thumbnails, or the like) associated with the particular approved image proceed to a final archive. The file reassembly process 950 may include a step 962: if the particular image associated with the final optimized PDF file has not been approved, the raw image is corrected and all associated files are reprocessed.

Figure 10:
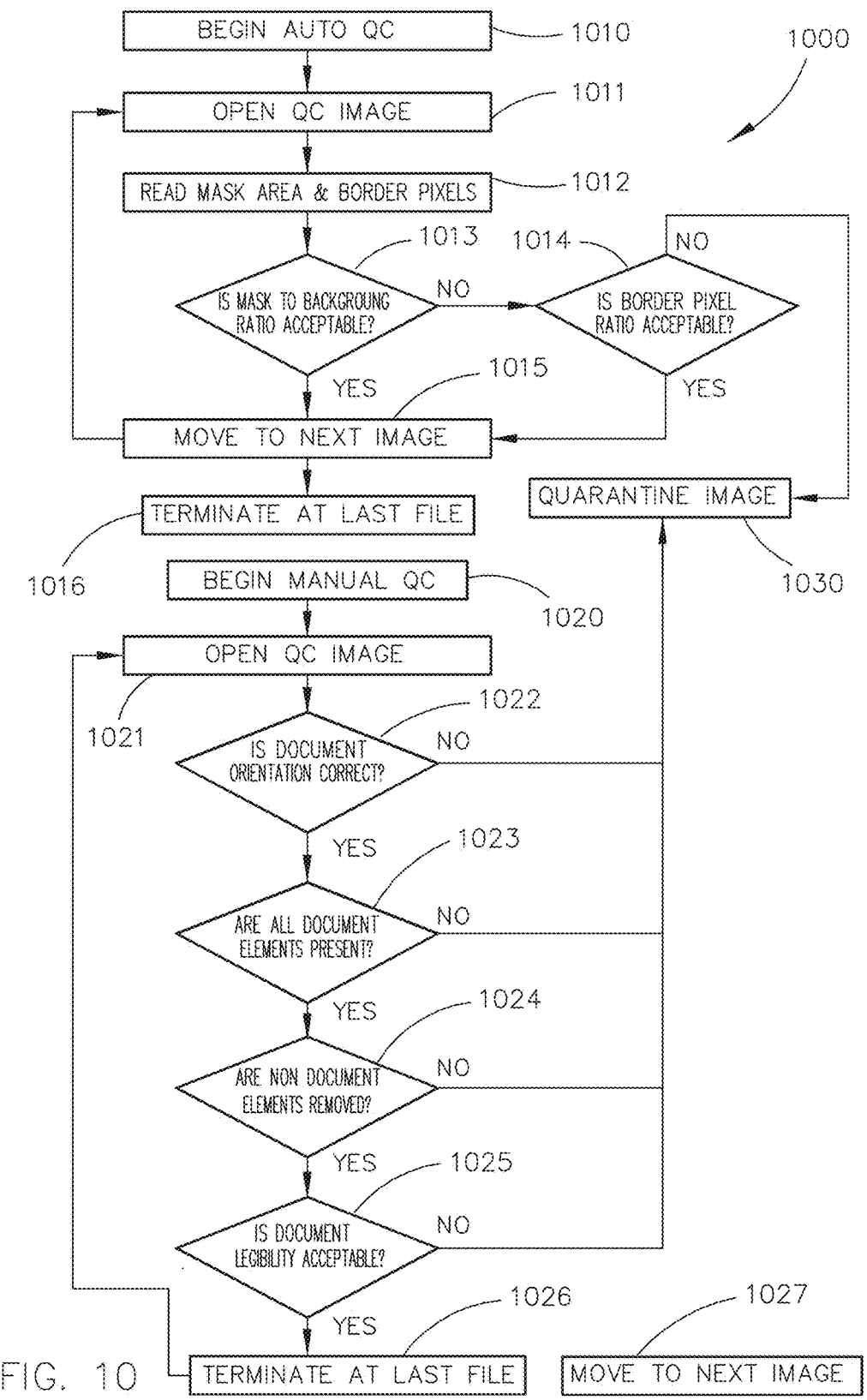
FIG. 10 shows a flow diagram of an exemplary automated quality control process and a manual quality control process.

Referring now to FIG. 10, an exemplary method 1000 for performing quality control processes of some embodiments is depicted. It is contemplated that embodiments of the method 1000 can be performed by one or more of the following: an apparatus, a system, an apparati of a system, a sub-system of a system, an imaging station 701, one or more elements of an imaging station 701, a computing device (such as computing device 710 of the imaging station 701 or another computing device connected to the network 720); at least one component, integrated circuit, controller, processor, or module of a computing device (such as computing device 710 of the imaging station 701 or another computing device connected to the network 720); software or firmware executed on a computing device (such as computing device 710 of the imaging station 701 or another computing device connected to the network 720); other computing devices (such as a computing device of a metadata/quality control portal 730, an image processing portal 740, a mobile computing device, or the like); other computer components; or on other software, firmware, or middleware of a system topology. The method 1000 can include any or all of steps 1010, 1011, 1012, 1013, 1014, 1015, 1016, 1020, 1021, 1022, 1023, 1024, 1025, 1026, 1027, and/or 1030, and it is contemplated that the method 1000 includes additional steps as disclosed throughout, but not explicitly set forth in this paragraph. Further, it is fully contemplated that the steps of the method 1000 can be performed concurrently, sequentially, or in a non-sequential order. Likewise, it is fully contemplated that the method 1000 can be performed prior to, concurrently, subsequent to, or in combination with the performance of one or more steps of one or more other methods disclosed throughout.

As shown in FIG. 10, some embodiments of the method 1000 may include performance of a plurality of processes and/or sub-processes; for example, the method 900 may include performance of an automated quality control process 1010 and a manual quality control process 1020. In exemplary embodiments, the method 1000 may be performed as a plurality of iterations on a plurality of document images, wherein each iteration of the method 1000 is associated with one or more images and/or one or more files associated with a particular imaged document.

In some embodiments, the automated quality control process 1010 includes performance of a plurality of sub-processes. In some exemplary embodiments, the automated quality control process 1010 comprises the step 911 of the method 900 of performing an automated quality control process on the temporary quality control thumbnail file 810. Referring to FIG. 10, in exemplary embodiments, the automated quality control process 1010 performs quality control operations on a quality control image. The automated quality control process 1010 may include a step 1011 of receiving, opening, or loading a quality control image (e.g., a temporary quality control thumbnail file 810). The automated quality control process 1010 may also include a step 1012 of reading a mask area and border pixels. The automated quality control process 1010 may further include a step 1013 of determining whether a mask to background ratio is acceptable (e.g., a ratio of a number of mask pixels to a number of background pixels is above or below a predetermined threshold value). If the mask to background ratio is acceptable, the automated quality control process 1010 includes a step 1015 of processing a next image or a step 1016 of terminating the automated quality control process 1010 if there are no more image files to process. However, if the mask to background ratio is determined to be unacceptable, the automated quality control process 1010 includes a step 1014 of determining whether a border pixel ratio is acceptable (e.g., a ratio of a number of background pixels to a number of non-background pixels is above or below a predetermined threshold value). If the border pixel ratio is acceptable, the automated quality control process 1010 includes a step 1015 of processing a next image or a step 1016 of terminating the automated quality control process 1010 if there are no more image files to process. However, if the background pixel ratio is determined to be unacceptable, the automated quality control process 1010 includes a step 1030 of quarantining the quality control image.

In some embodiments, the manual quality control process 1020 includes performance of a plurality of sub-processes. In some exemplary embodiments, the manual quality control process 1020 comprises the step 912 of the method 900 of performing a manual quality control process on the temporary quality control thumbnail file 810. Referring to FIG. 10, in exemplary embodiments, the manual quality control process 1020 performs quality control operations on a quality control image. The manual quality control process 1020 may include a step 1021 of receiving, opening, or loading a particular quality control image (e.g., a temporary quality control thumbnail file 810). The manual quality control process 1020 may include a step 1022 of determining whether the document orientation is correct (or substantially correct such that an automated process can rotate the image by less than 45 degrees to correct the document orientation); the step 1022 may include receiving a user input from a user with a selection which indicates whether the orientation is correct. The manual quality control process 1020 may include a step 1023 of determining whether all of the document elements are present; the step 1023 may include receiving a user input from a user with a selection which indicates whether all of the document elements are present. The manual quality control process 1020 may include a step 1024 of determining whether the non-document elements have been removed; the step 1024 may include receiving a user input from a user with a selection which indicates whether the non-document elements have been removed. The manual quality control process 1020 may also include a step 1025 of determining whether document legibility is acceptable; the step 1025 may include receiving a user input from a user with a selection which indicates whether document legibility is acceptable. Additionally, the manual quality control process 1020 may include a step 1030 of quarantining a particular image if any of the steps 1022, 1023, 1024, or 1025 result in negative or unacceptable responses. However, if all of the steps 1022, 1023, 1024, or 1025 result in positive or acceptable responses, the manual quality control process 1020 includes a step 1027 of processing a next image or a step 1026 of terminating the manual quality control process 1020 if there are no more image files to process.

Referring now to FIGS. 11A-D, exemplary depictions associated with performing coarse image measurement processes of some embodiments are shown. Performance of coarse image measurement processes prepares the image for subsequent software measurement processes.

Figure 11A:
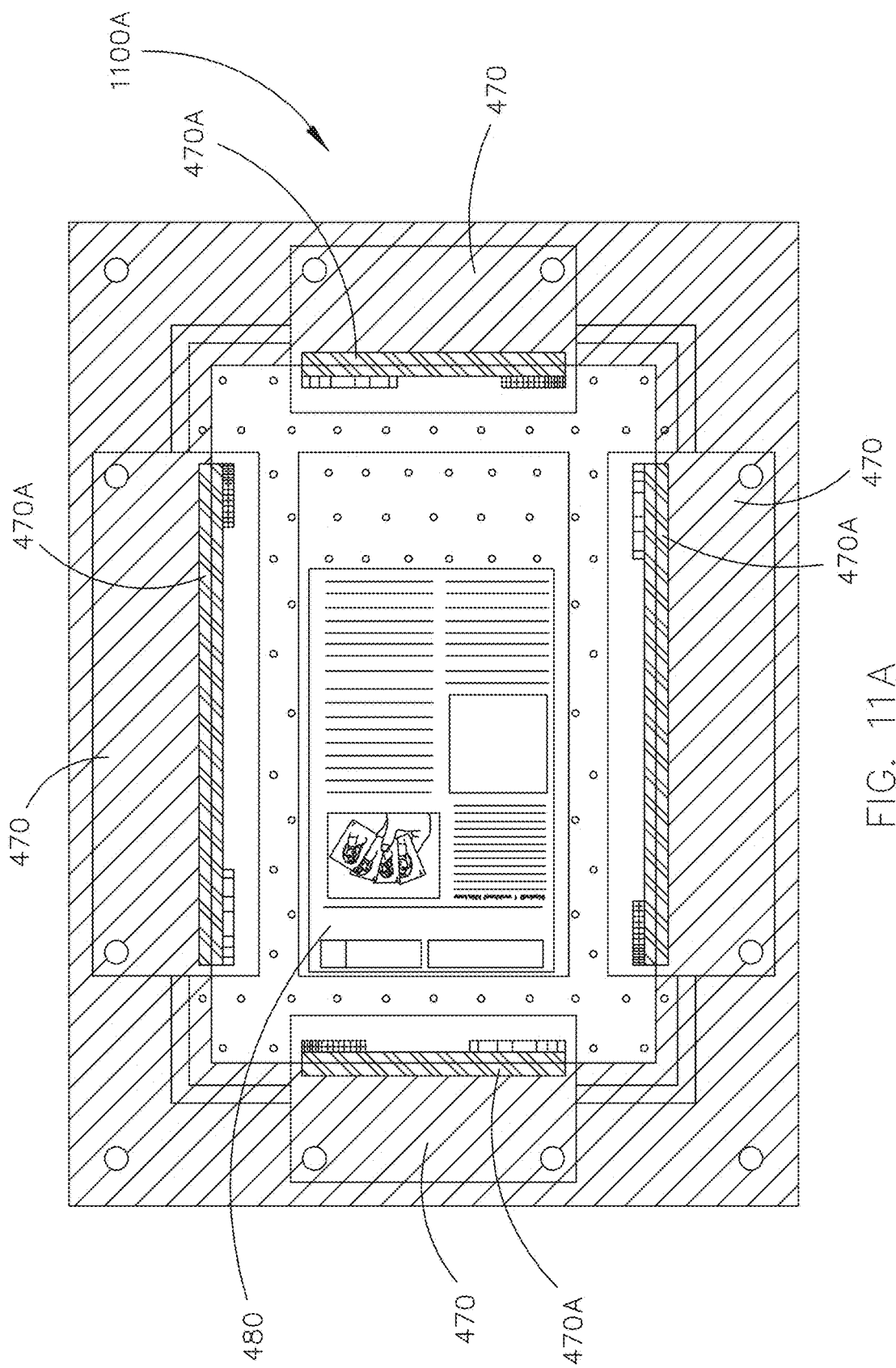

Referring now to FIGS. 11A and 11B, an exemplary extended document imaging area 1100A is shown. The extended document imaging area 1100A (e.g., an area corresponding to the top side of the transparent vacuum insert assembly 401 with a document 480 placed on top of a portion of the transparent vacuum insert assembly 401) may include areas outside of where a camera (e.g., 110, 310A, 310B, 510) will capture an image. In exemplary embodiments, in order to effectively "isolate" a document, it can be determined approximately where the document is within the image area 1100B (see FIG. 11B). The image area 1100B refers to the full digital image as captured and delivered from the camera; this full digital image is also referred to as the raw image. FIG. 11A depicts the image area 1100B as it relates to the surrounding extended document imaging area 1100A. The shaded portion of the extended document imaging area 1100A around the image area 1100B represents the physical area which is outside a view of the camera. In some embodiments, the camera may be calibrated or configured to have an image area 1100B which captures only a portion (e.g., approximately half) of each solid color bar 470A of the control strips 470.

In order to establish a coarse location of the document 480, some embodiments include creating an image copy which can be manipulated for measurement purposes; for example, this determination may include performance of step 842 of reading dimensional data and performance of step 843 of determining whether the resolution and aspect ratio is correct of the method 800. The image copy may be placed directly on top of the raw image and is typically discarded later. The image copy may then be converted to a grayscale image. The grayscale image may contain pixels that vary from light to dark but do not contain a color value. In exemplary grayscale images, any given pixel can have an integral value of between 0 and 255 (i.e., 8-bit); however, embodiments of the invention are not limited to 8-bit grayscale pixel values and may be implemented with any other suitable number of grayscale pixel values. Additionally, grayscale image can be further manipulated to result in a black and white image 1100D, where all of the pixel values are either 0 (e.g., black) and 1 (e.g., white).

Figure 11C:
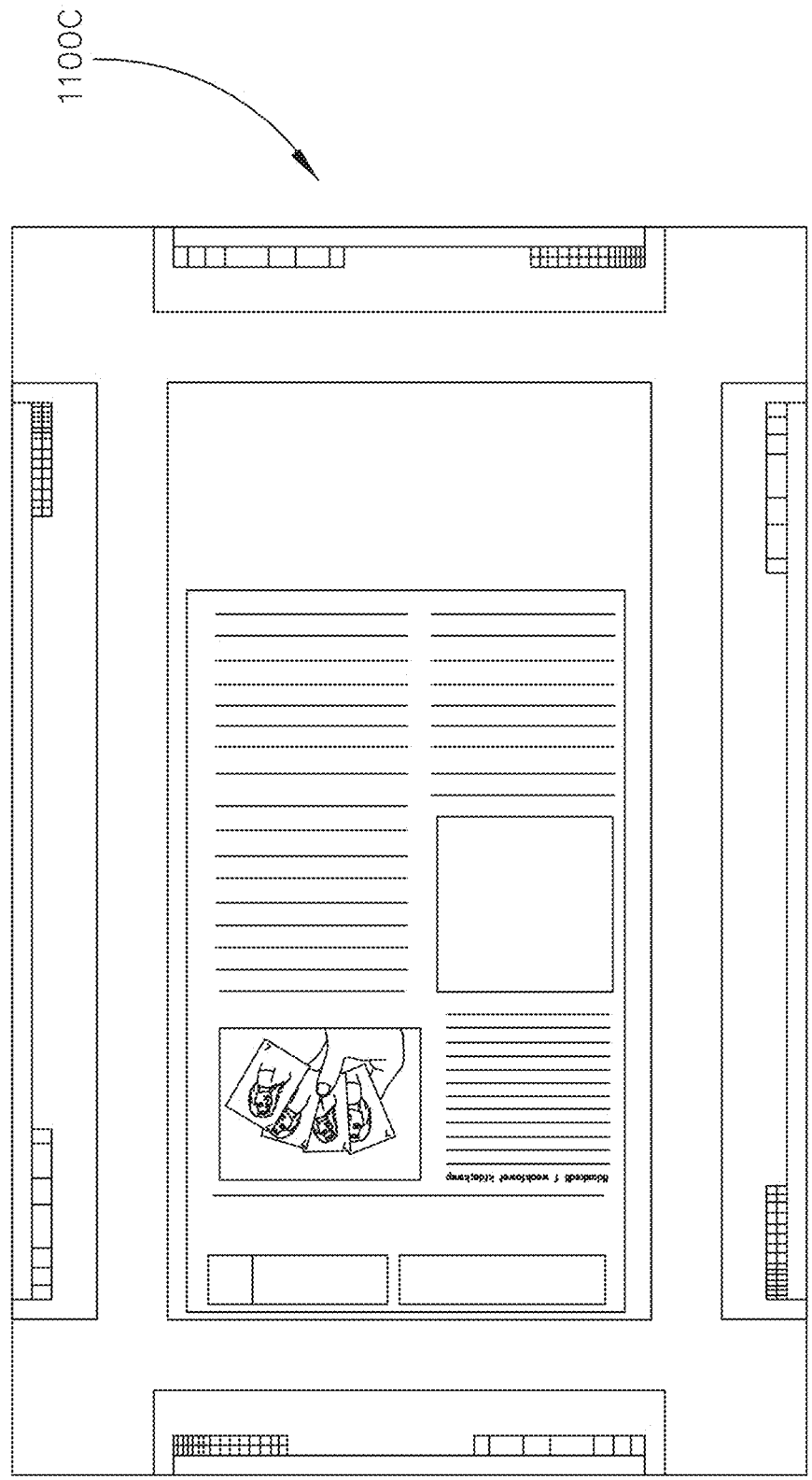

Referring now to FIG. 11C, in some embodiments which are implemented with a document imaging area that includes vacuum holes, the grayscale image may be manipulated to remove the vacuum holes 451 from the grayscale image to result in a de-holed grayscale image 1100C. While the vacuum holes 451 force the document 480 flat and secure the document 480 during image capture, the vacuum holes 451 can be detrimental to image processing. A series of image contractions and expansions may be performed to remove the vacuum holes 451 from the grayscale image.

Figure 11D:
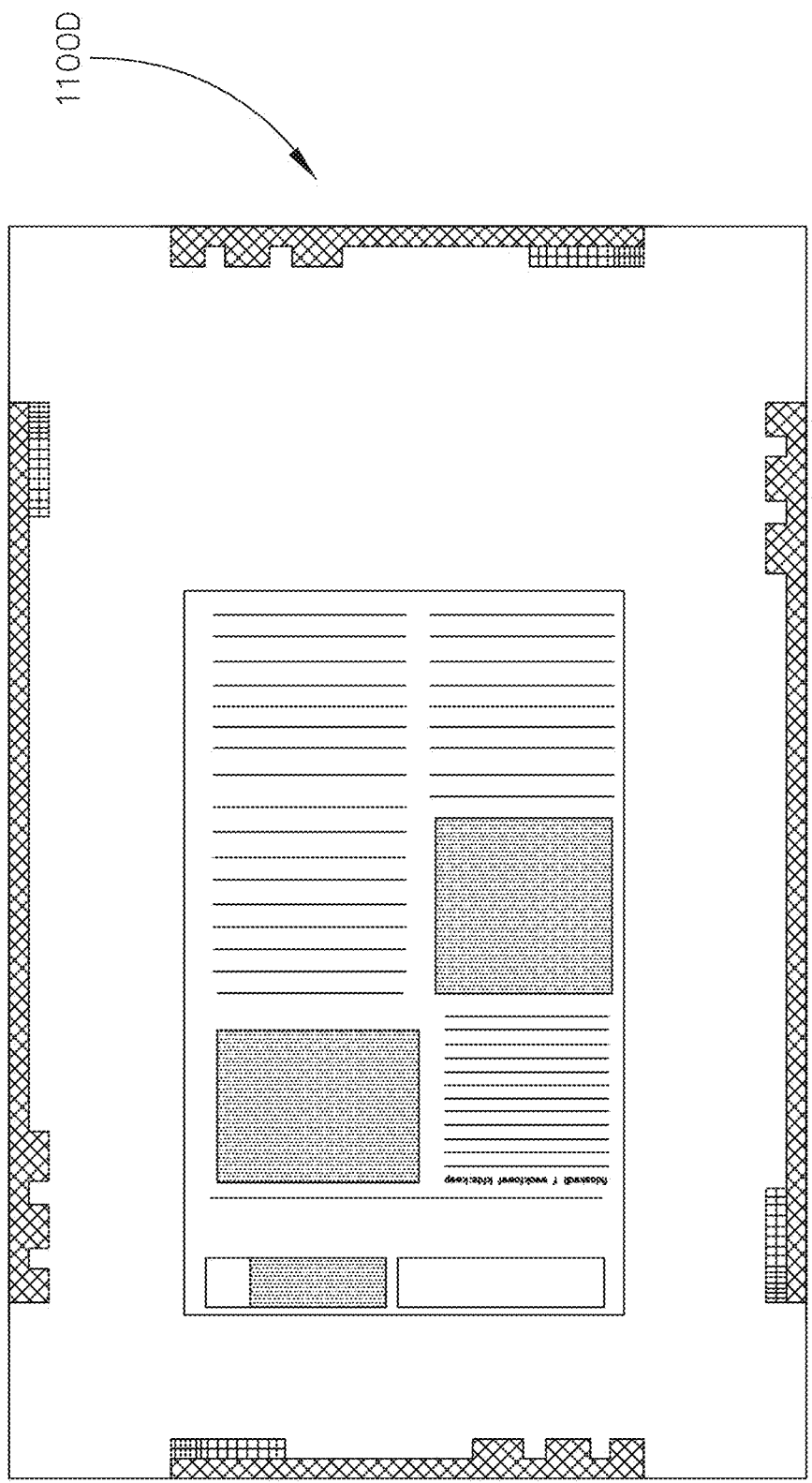

Referring now to FIG. 11D, an illustration of a bitonal image 1100D (e.g., a black and white image, as described above with reference to FIGS. 11A-B), which is converted from the grayscale image, is depicted (see also step 846 of converting the image copy to bitonal format of the method 800). The bitonal image has pixel values which are one of only two values (e.g., 0 or 1).

Referring now to FIGS. 12A-J, exemplary depictions associated with performing fine image measurement processes of some embodiments are shown.

Figure 12A:
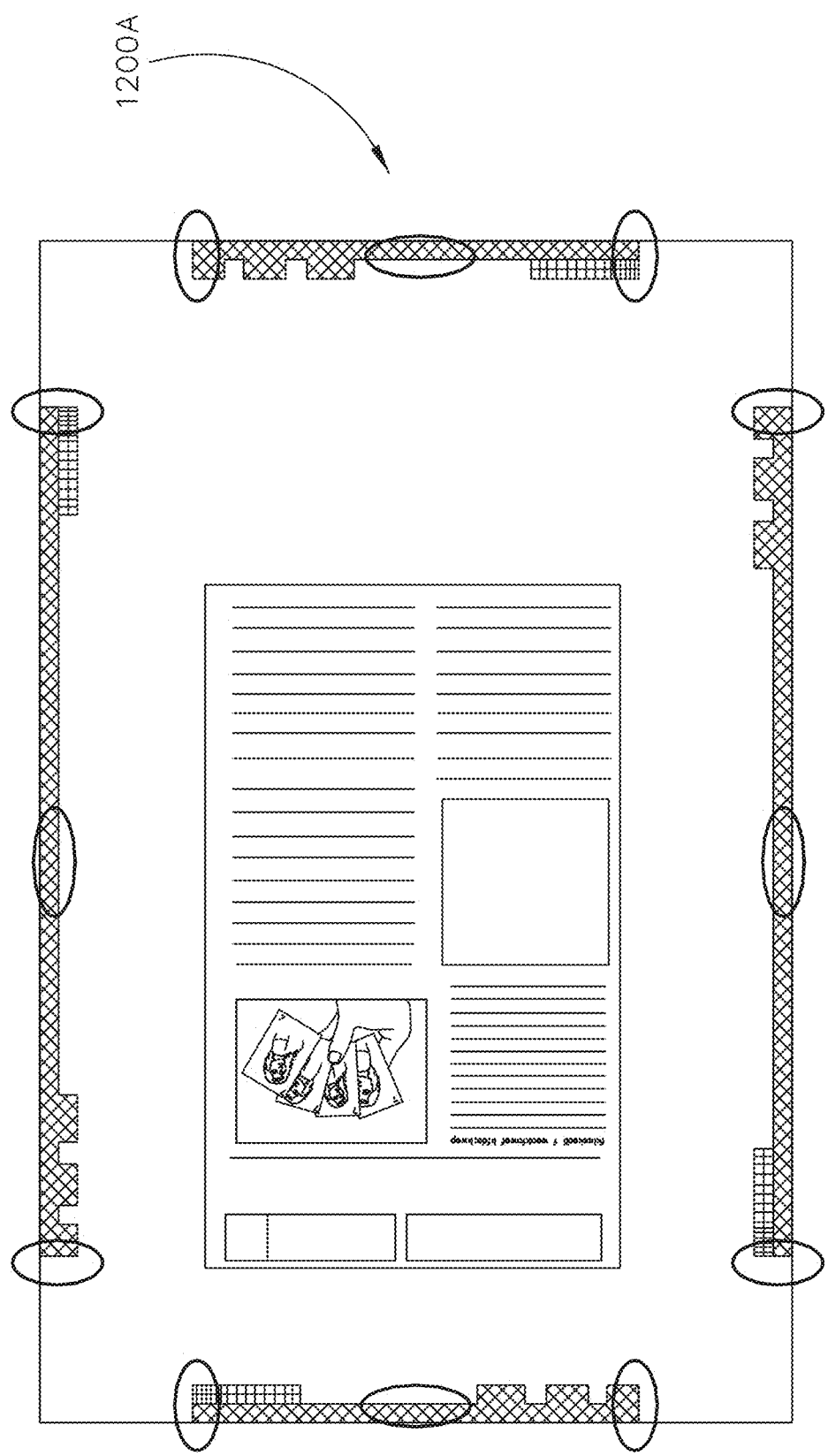
FIGS. 12A-J shows exemplary depictions associated with performing fine image measurements of some embodiments.

Referring now to FIG. 12A, illustration 1200A shows the key areas within the image which are to be measured for determining positioning values or coordinates. The circled areas of illustration 1200A denote edges between black portions of each control strip 470 and lighter (e.g., white) portions of the image which may be used to determine document location. The precise location of a document 480 within the image may be determined by calculating a value of black pixels versus white pixels in a given area. These calculated values may also be used to measure image integrity and quality.

Figure 12B:
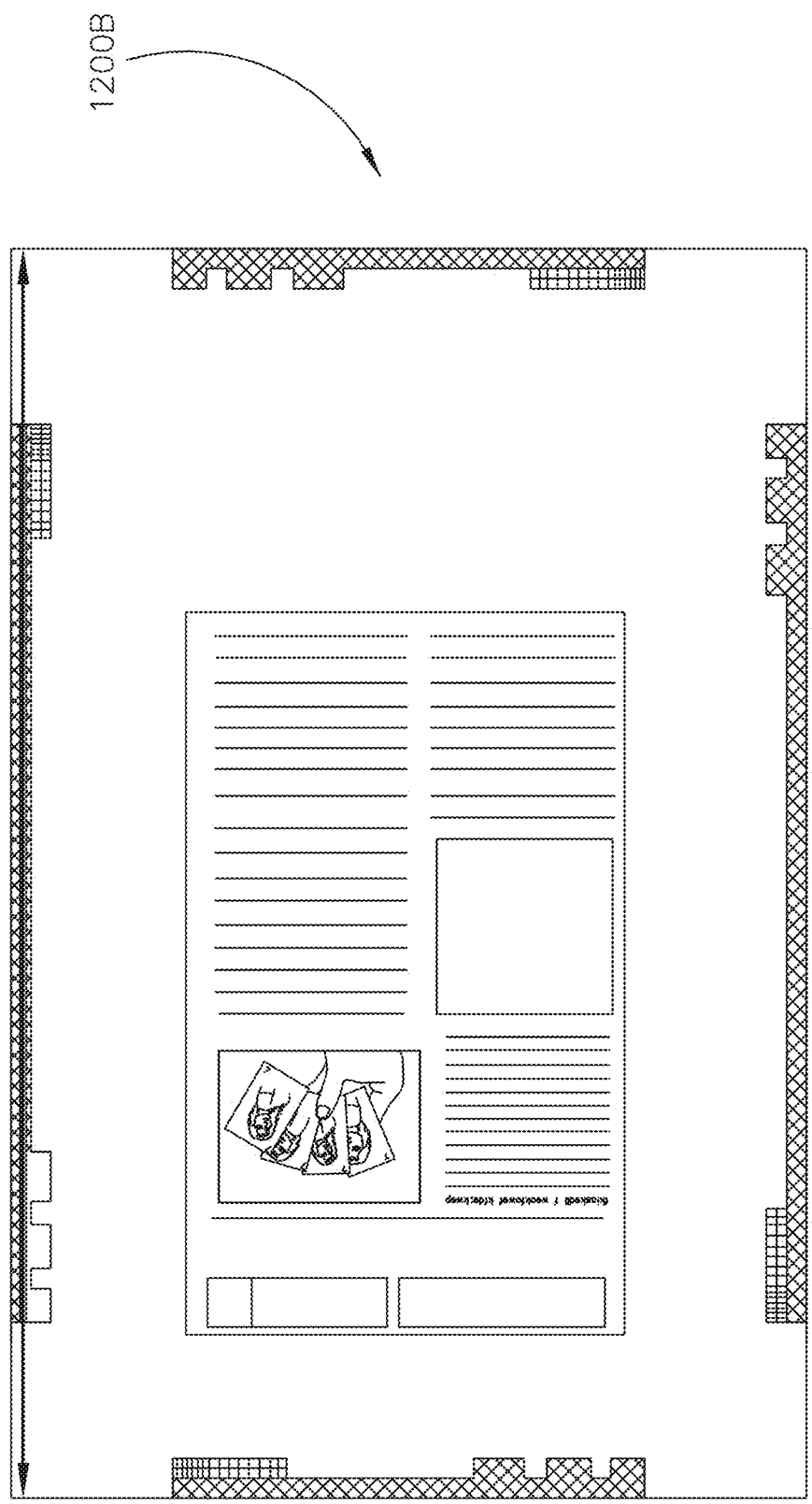

Referring now to FIG. 12B, illustration 1200B demonstrates how document size is determined. The value to be measured is the relative size of the image. All of the raw images of a particular camera have a fixed amount of pixels in height and width. While the number of pixels in width and height is known, the actual size of the document or object which is captured by the camera may be unknown. Because an image is projected onto a camera's sensor by a lens, it may be unknown to what extent the lens was zoomed-in when it captured the raw image. While the actual size of the document or object may be unknown, the actual size of the document or object may be determined based on known information with respect to the control strips 470. For example, the actual width of the solid color bars of each control strip 470 is predetermined and known based on a known location of each color strip 470 and known location of the components (e.g., 470A, 470B, 470C) on each control strip 470. Therefore, the size of the imaged area and the document image may be determined by measuring the solid color bar 470A of a particular control strip 470. Likewise, a dots per inch (dpi) value or pixels per inch (ppi) value may be computed in a similar manner, and these values may be used to determine a scale of the image for measuring distances, subsequent image correction processes, and final document preparation processes.

In some embodiments, the scale of the image may be used for mapping the entire image. This "map" allows processes to perform quality corrections and may provide the location of key static targets (e.g., control strips 470, and components 470A, 470B, 470C of the control strips).

Figure 12C:
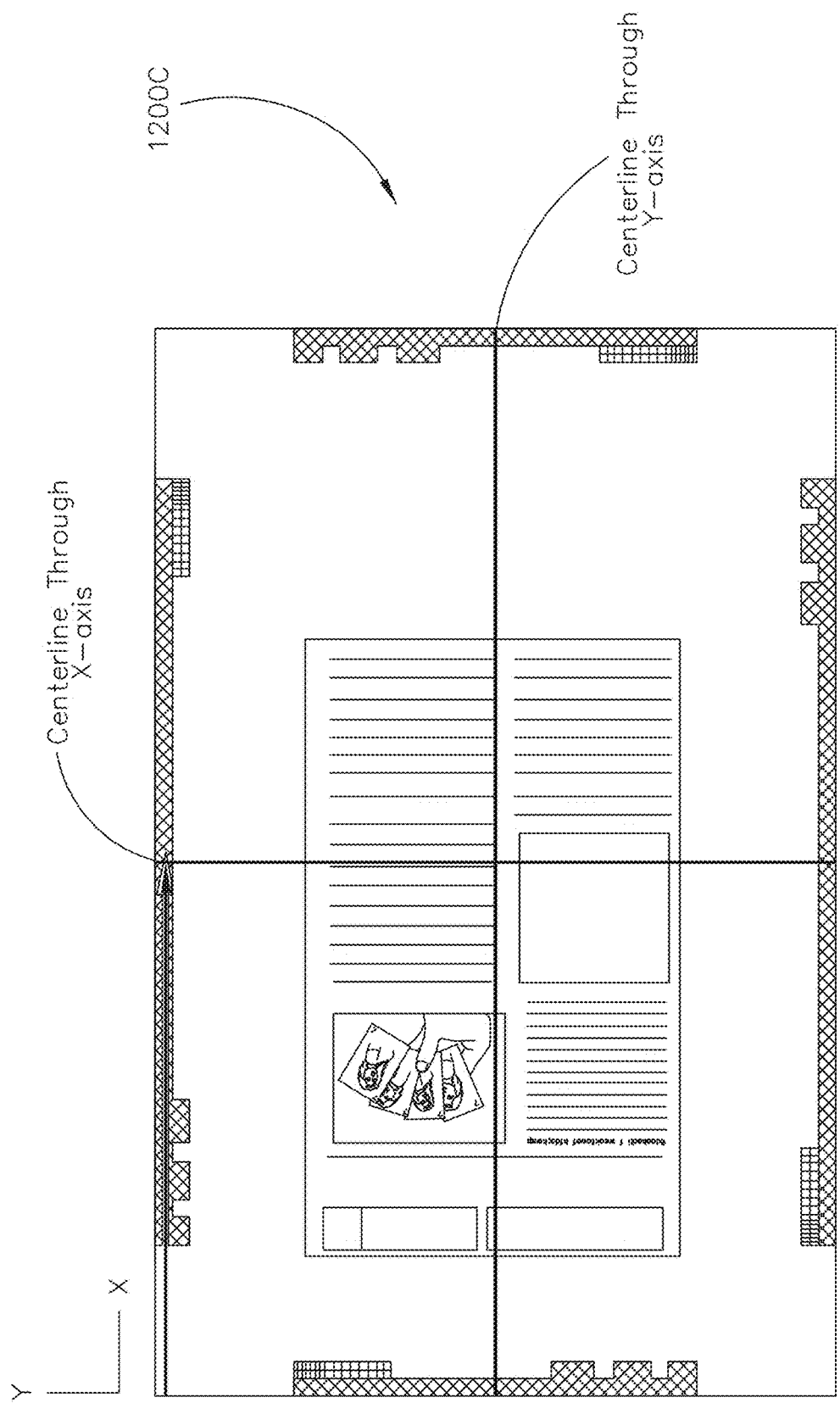

Referring now to FIG. 12C, an illustration 1200C demonstrates that the origin (i.e., a point of intersection of the coordinate axes) of the x-axis is determined by measuring from a corner pixel of the image to a horizontal (x-axis) centerline, which is calculated by dividing pixel dimensions by two.

Figure 12D:
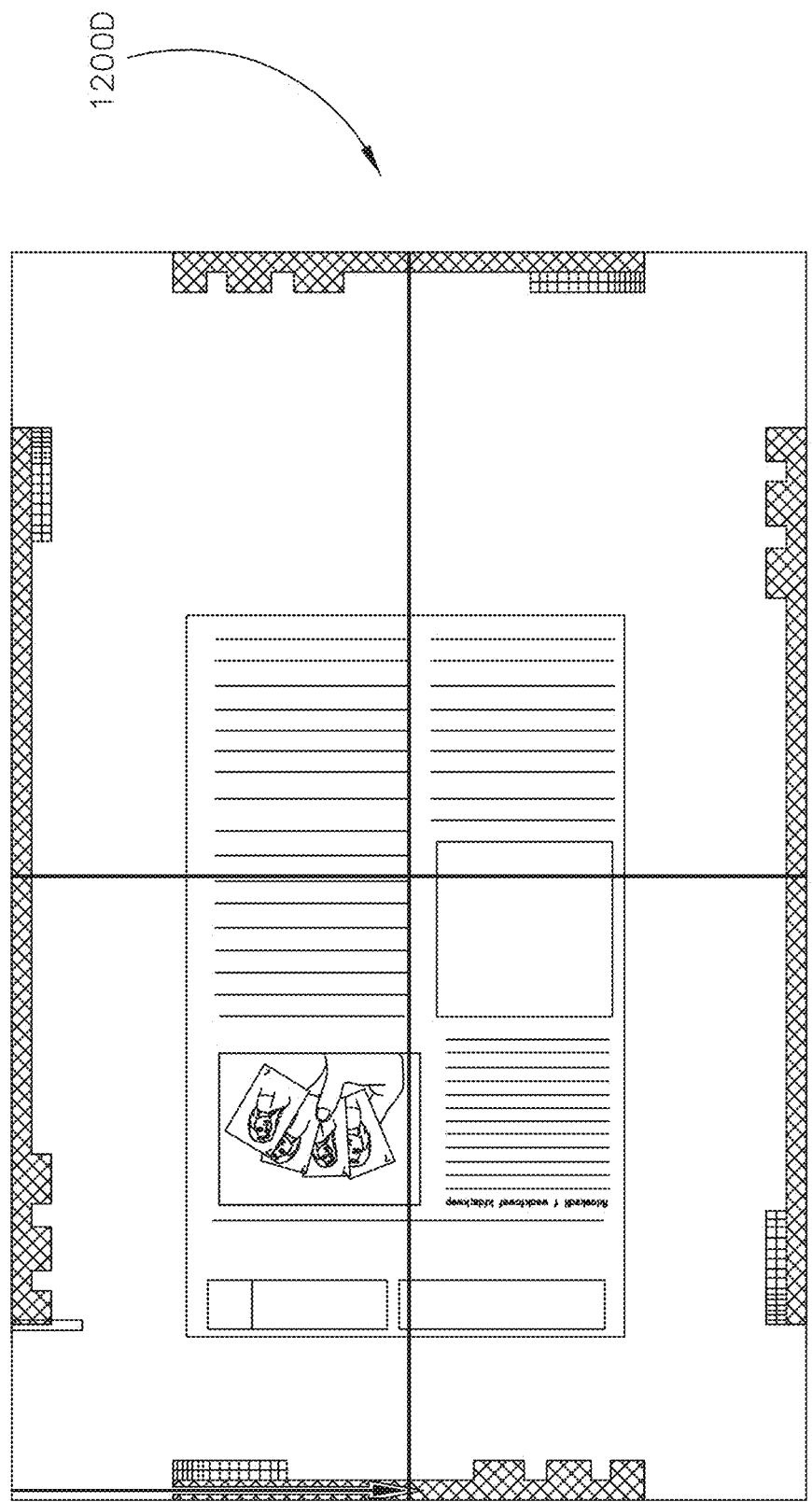

Referring now to FIG. 12D, an illustration 1200D demonstrates that the origin of the y-axis is determined by measuring from the corner pixel of the image to a vertical (y-axis) centerline, which is calculated by dividing pixel dimensions by two.

Figure 12E:
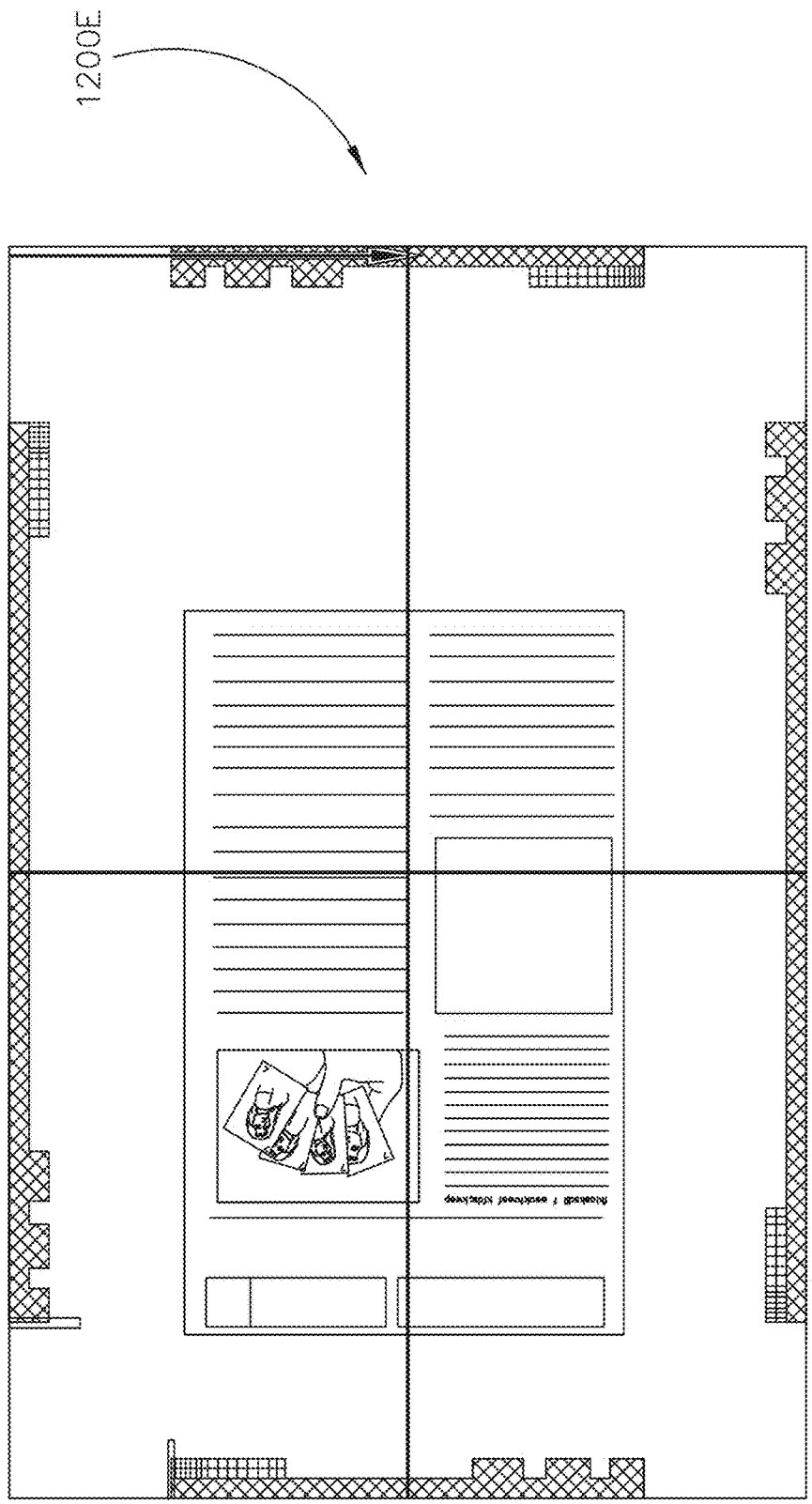
Figure 12F:
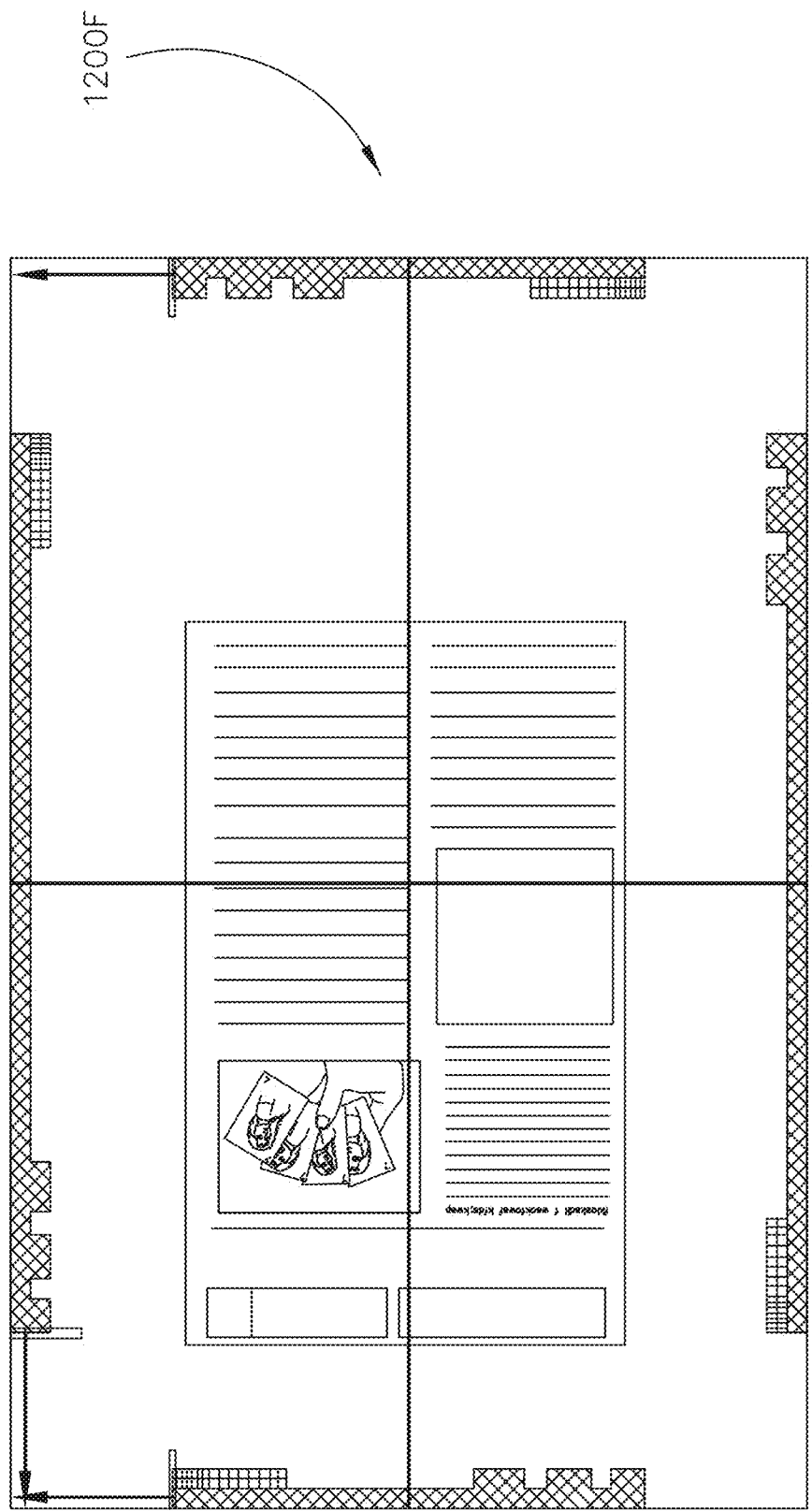

Referring now to FIGS. 12E-F, illustrations 1200E, 1200F demonstrate that skew factors may be determined by measuring and comparing the distance from the ends of the control strips 470 to corner points of the image. For example, this may include measuring a strip of pixels across the top of an image where the control target is known to be located; the number of black pixels and the number of white pixels can be recorded, and the black pixels will be the solid color bar of the control strips 470, and the white pixels may be the background.

Figure 12G:
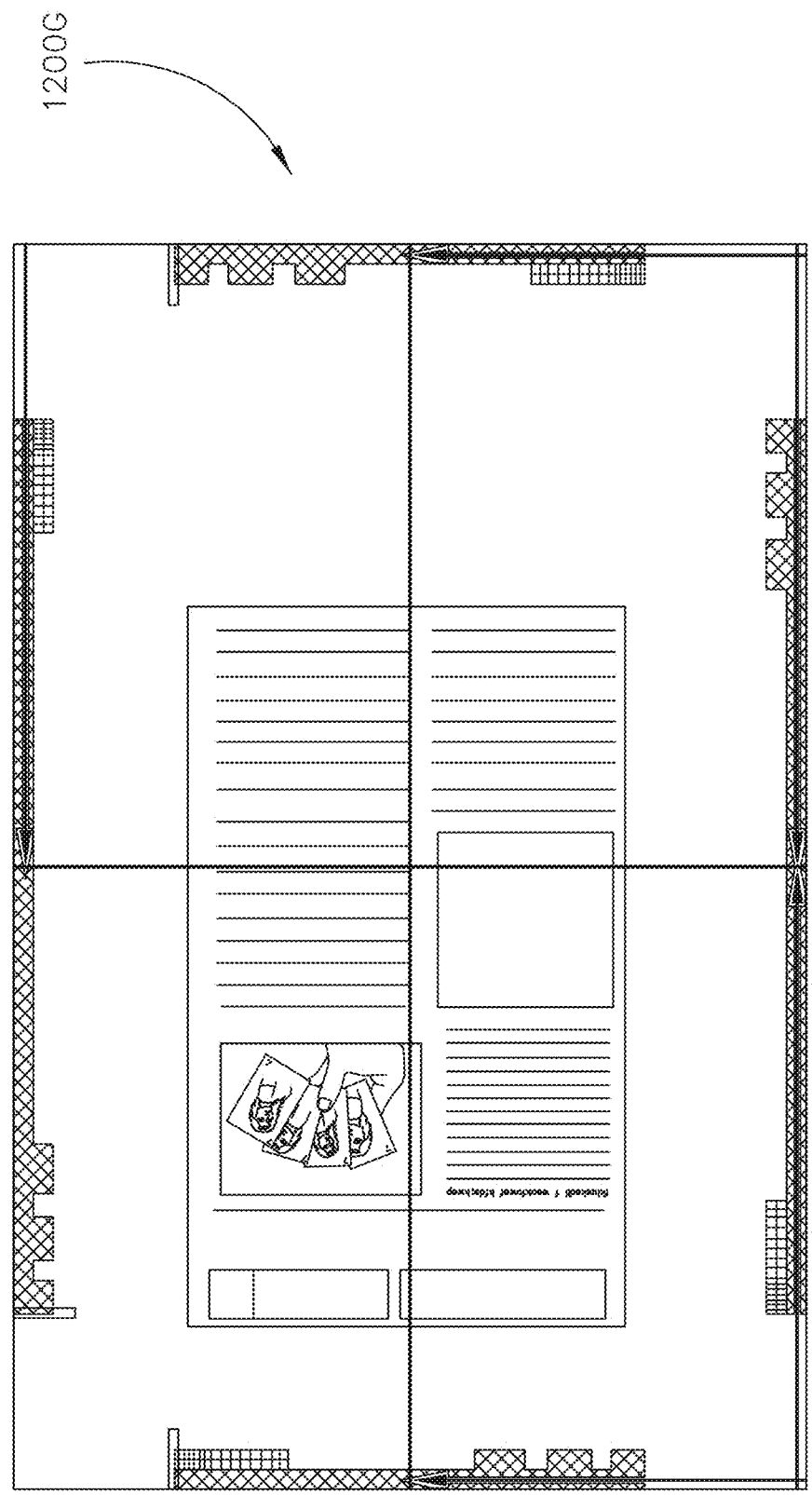
Figure 12H:
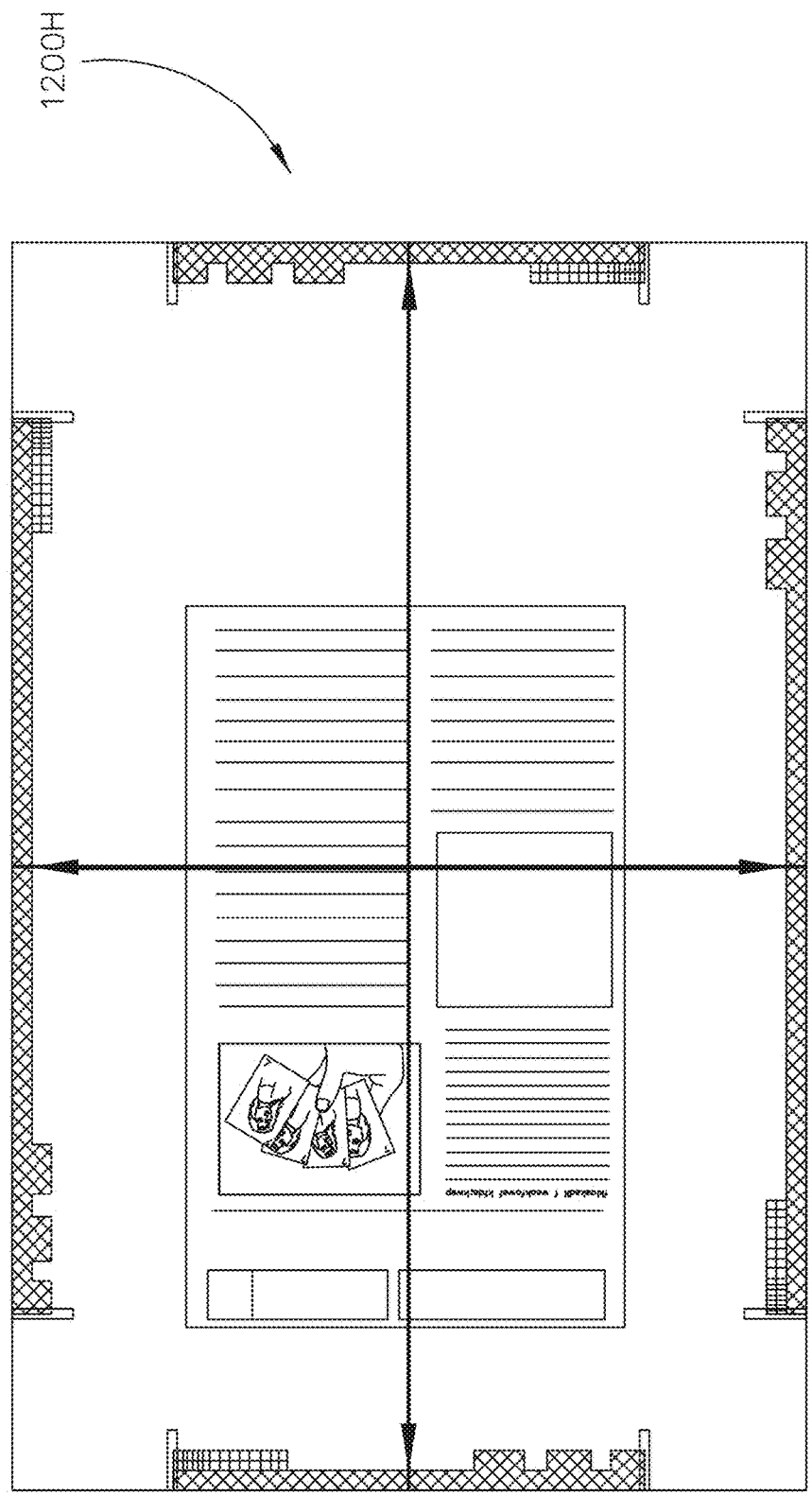
Figure 12I:
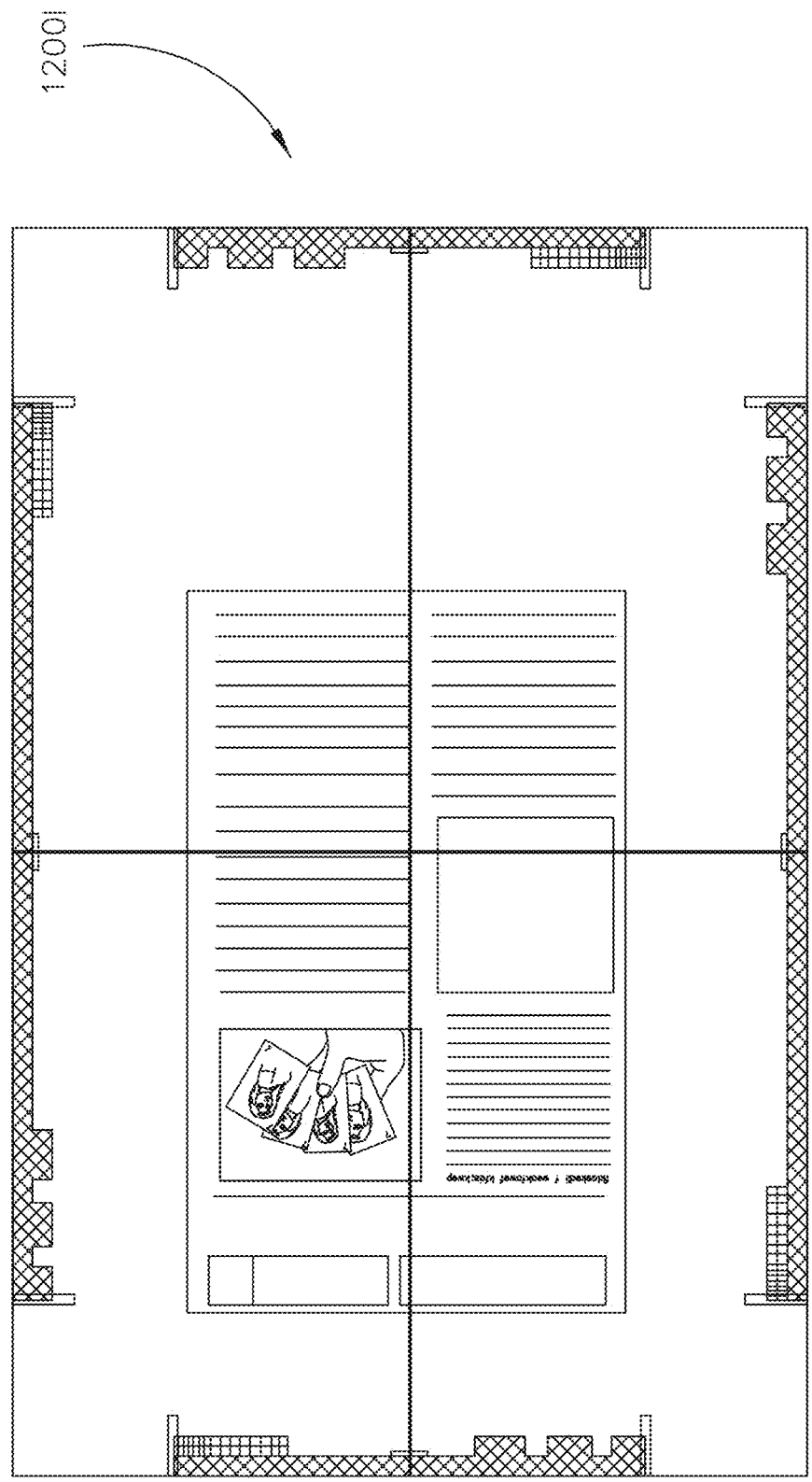

Referring now to FIG. 12G, FIG. 12H, and FIG. 12I, illustrations 1200G, 1200H, 1200I demonstrate the measuring of additional points within the image.

Figure 12J:
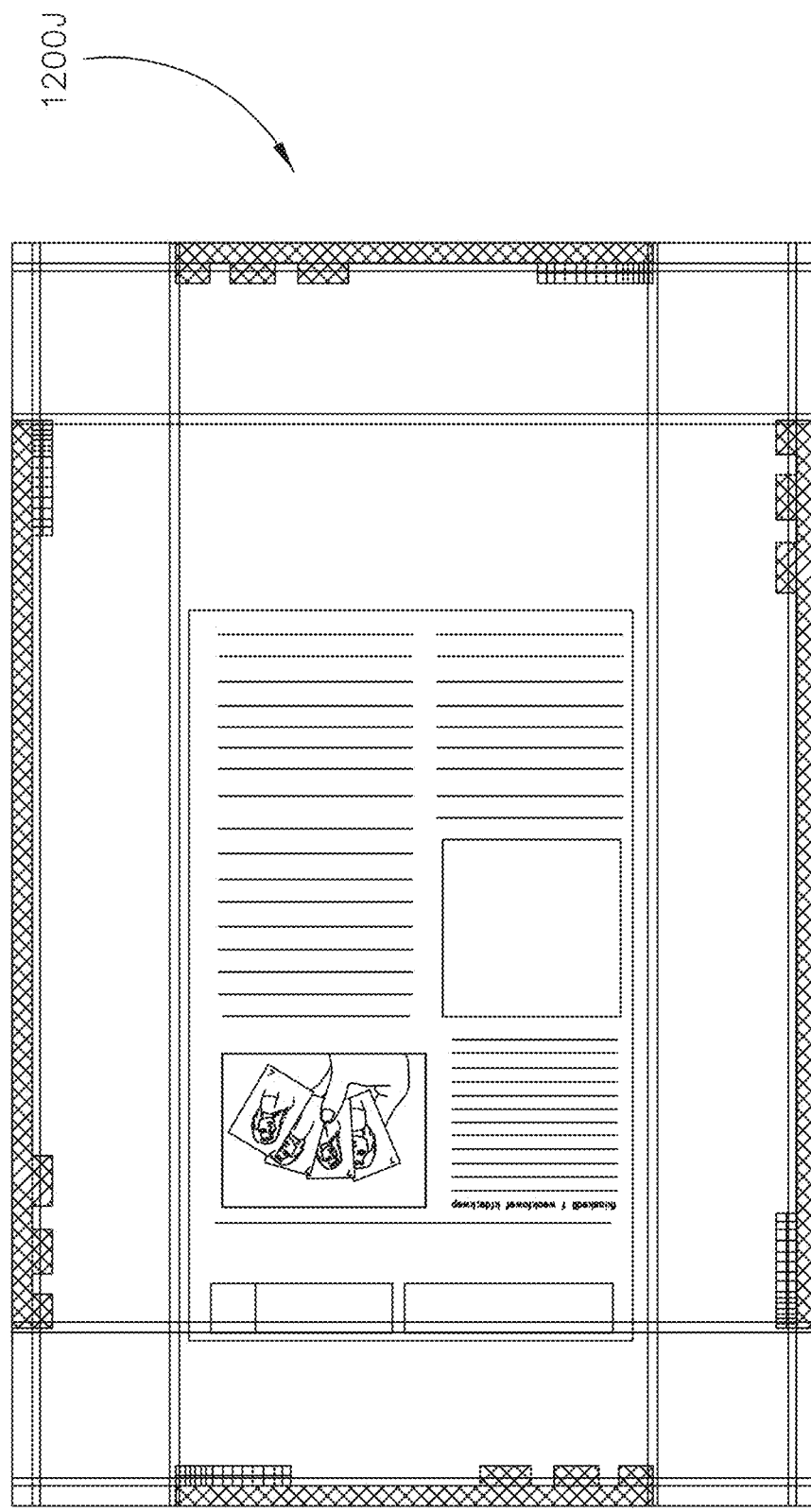
Figure 13C:
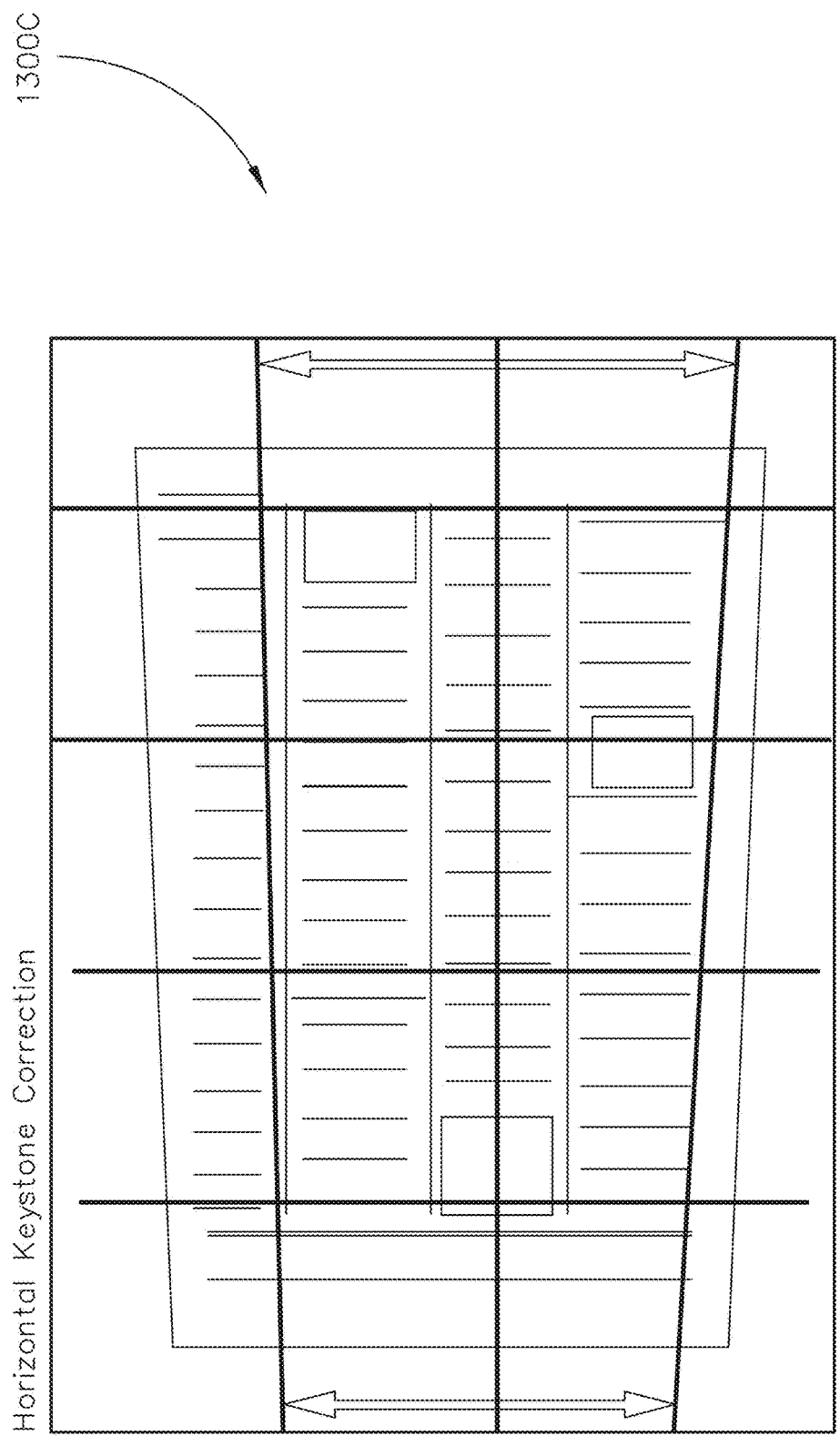
Figure 13D:
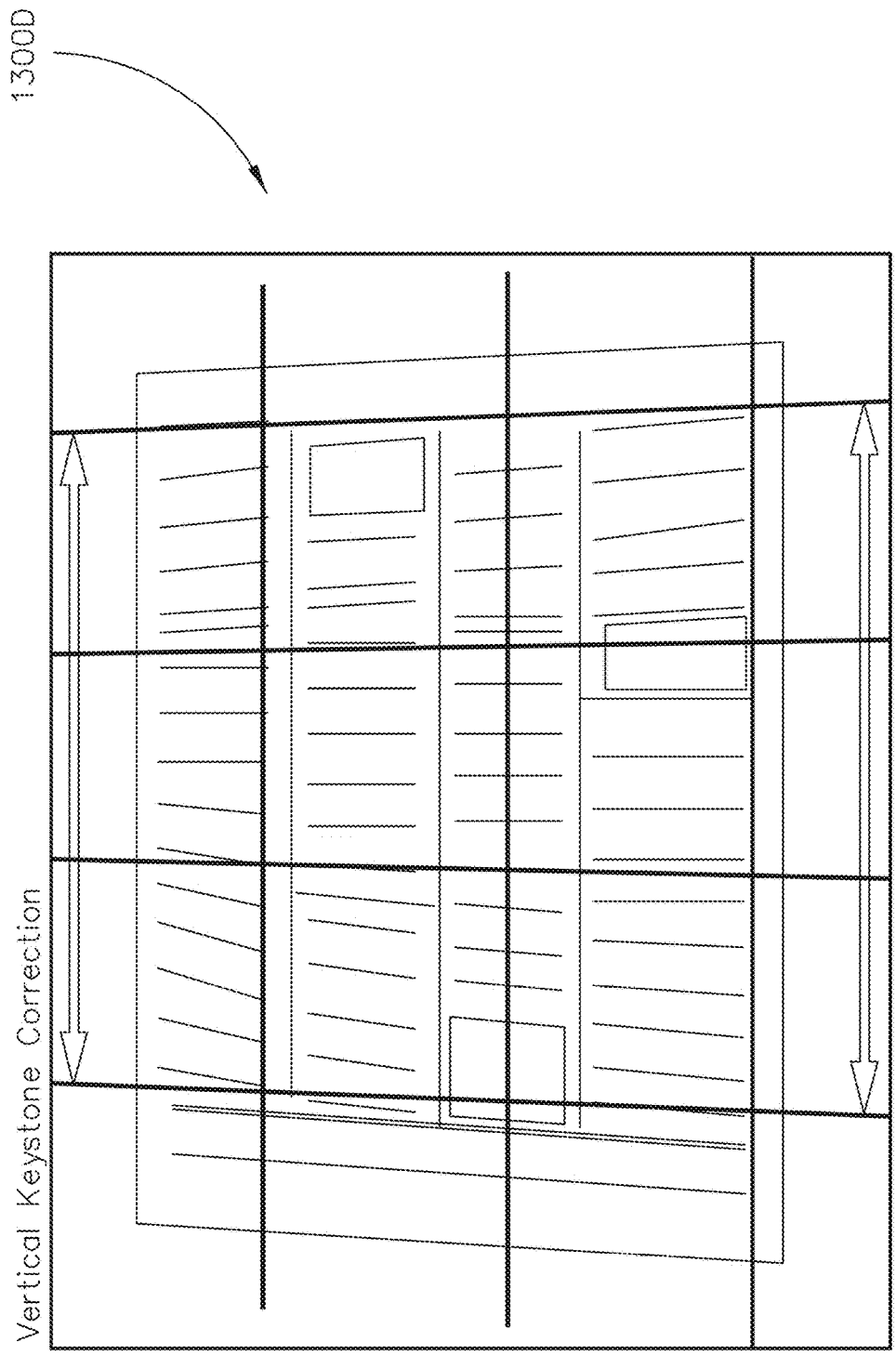
Figure 13E:
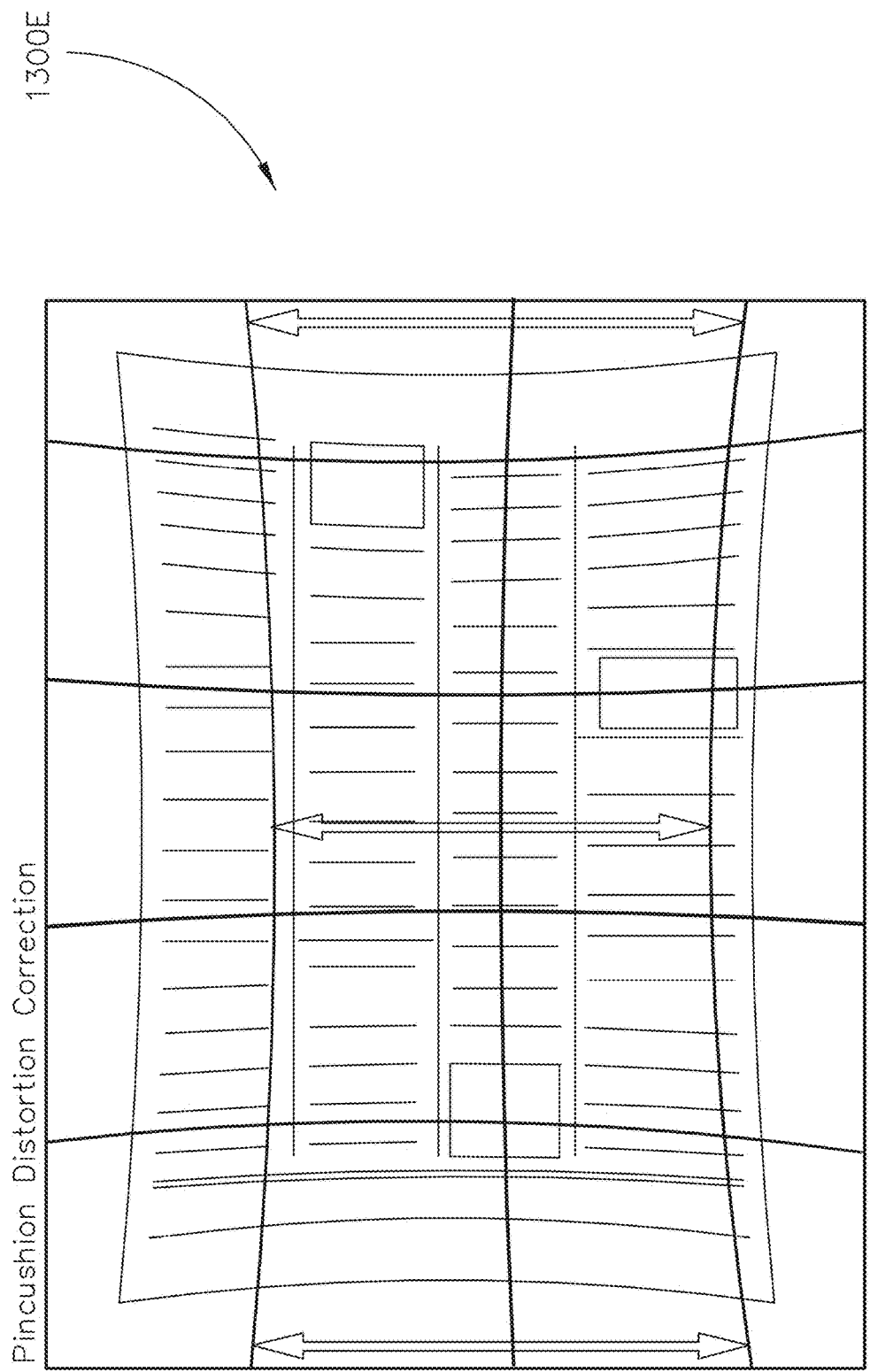
Figure 13F:
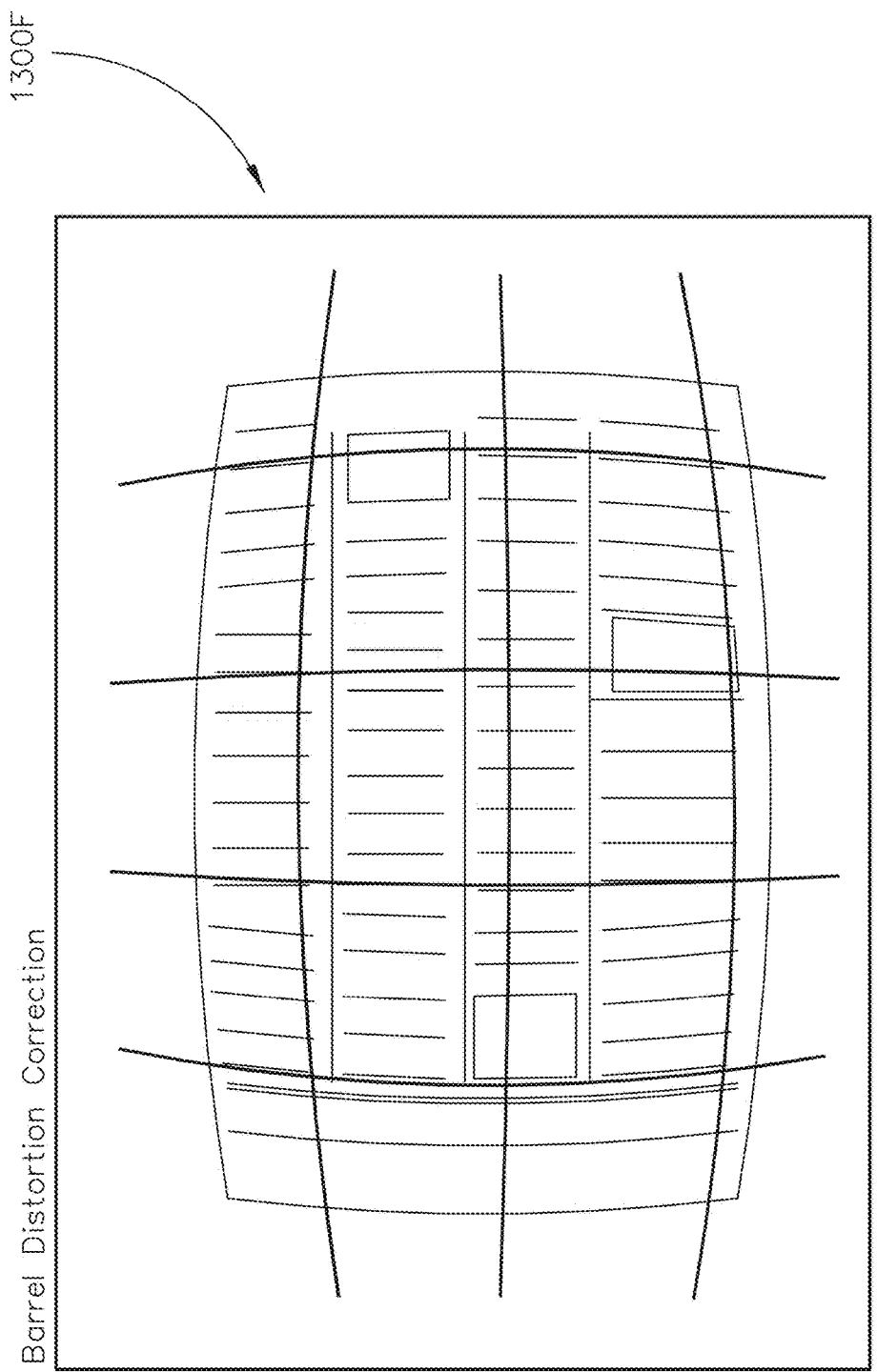

Referring now to FIG. 12J, illustration 1200J demonstrates a grid that may be created from the various measured points (as shown in FIGS. 12A-I).

In some embodiments, performing coarse image measurement processes (e.g., as described with respect to FIGS. 11A-D) and/or performing fine image measurement processes (e.g., as described with respect to FIGS. 12A-J) may include measuring image attributes by performing statistical analysis operations on the image. For example, in some embodiments, performing statistical analysis operations on the image may be performed based on static control targets (e.g., an image of the control strips 470) within the image and known image file attributes (e.g., the pixel dimensions of the image, the pixel value of each pixel, the pixel coordinates of particular pixels, or the like). For example, performing a statistical analysis operation may include creating and evaluating a histogram of the pixel values of an image to determine the distribution of pixel values throughout the image. Each pixel has a particular pixel value (e.g., an integral value, such as between 0 and 255 for an 8-bit grayscale image). The created histogram contains a distribution of pixels by pixel darkness (corresponding to the pixel value). Performing a statistical analysis operation may include evaluating the distribution of pixels by pixel value to determine statistical metrics (e.g., mean, median, mode, standard deviation, variance, or the like) of the distribution; for example, the average and median color of the image can be determined from the statistical metrics. In some embodiments, performing a statistical analysis operation further includes applying a threshold filter to the histogram for generation of a bitonal image. In some embodiments, the threshold filter may be automatically or manually set to a particular value (e.g., predetermined, default, or variable) based on one or statistical metrics obtained from the distribution of pixels; for example, threshold filter may be automatically or manually set to a particular value based on the median and mean pixel values. For example, an exemplary threshold filter (e.g., a threshold light filter) may be configured to set every pixel with a value of 127 or below to zero, and every pixel with a value of 128 and above to 255 to create a bitonal image with pixel values of 0 or 255.

Additionally, performing statistical analysis operations provides information to processes for making adjustments to correct for variables (e.g., lighting, camera position, color casts, lens aberrations, or the like).

Referring now to FIGS. 13A-F, exemplary depictions associated with performing automated image integrity corrections of some embodiments are shown. In some embodiments, performing automated image corrections may include comparing measurements (e.g. fine image measurements) against the predetermined standards based on data from the fine image measurements. If an image is within control limits, the image advances; however, if the image is outside of the control limits but within software correction limits, it will be corrected (see also, step 849 of method 800, determining whether the target attributes are within the specifications). For example, embodiments of the invention are configured to perform x,y origin corrections as shown in illustration 1300A of FIG. 13A. Embodiments of the invention may be configured to perform skew corrections as shown in illustration 1300B of FIG. 13B. Embodiments of the invention may be configured to perform horizontal keystone corrections as shown in illustration 1300C of FIG. 13C. Embodiments of the invention may be configured to perform vertical keystone corrections as shown in illustration 1300D of FIG. 13D. Embodiments of the invention may be configured to perform pincushion distortion corrections as shown in illustration 1300E of FIG. 13E. Additionally, embodiments of the invention may be configured to perform barrel distortion corrections as shown in illustration 1300F of FIG. 13F.

Referring now to FIGS. 14A-E, exemplary depictions associated with performing coarse document isolation operations of some embodiments are shown. In some embodiments, coarse document isolation operations may be performed upon performance of coarse image measurement operations, fine image measurement operations, and automated image corrections. FIGS. 14A-E depict the isolation (e.g. coarse isolation) of the live document 480 from the overall image.

Figure 14A:
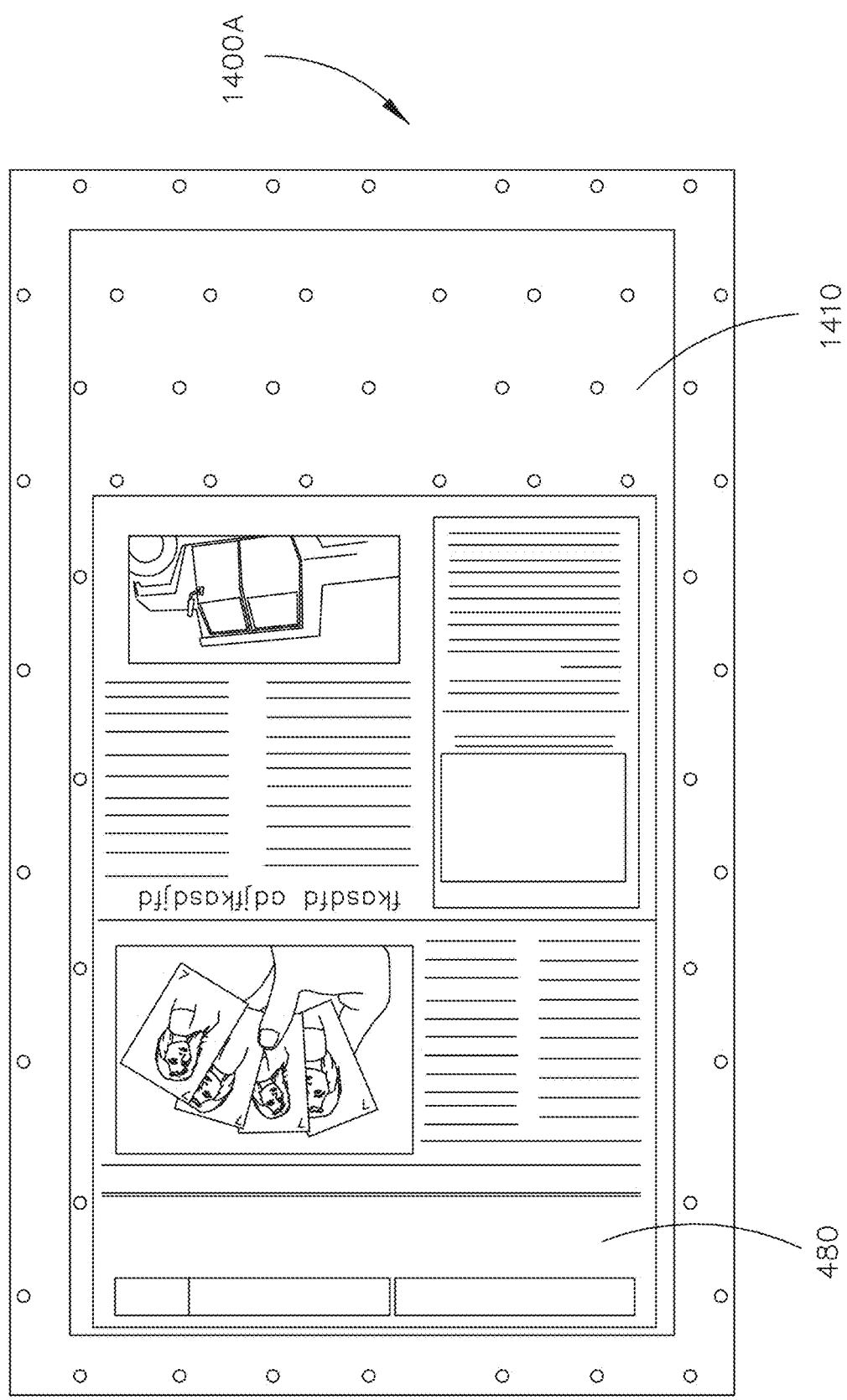
FIGS. 14A-E shows exemplary depictions associated with performing coarse document isolation of some embodiments.

Referring now to FIG. 14A, a cropped image 1400A is depicted which includes a live document 480 portion and a background portion 1410 (e.g., which may be associated with the out of gamut substrate 420). The cropped image 1400A represents the state of the processed image following a static crop (see also step 851 of the method 800) of the image to remove the control targets (e.g., control strips 470) from the image.

Figure 14B:
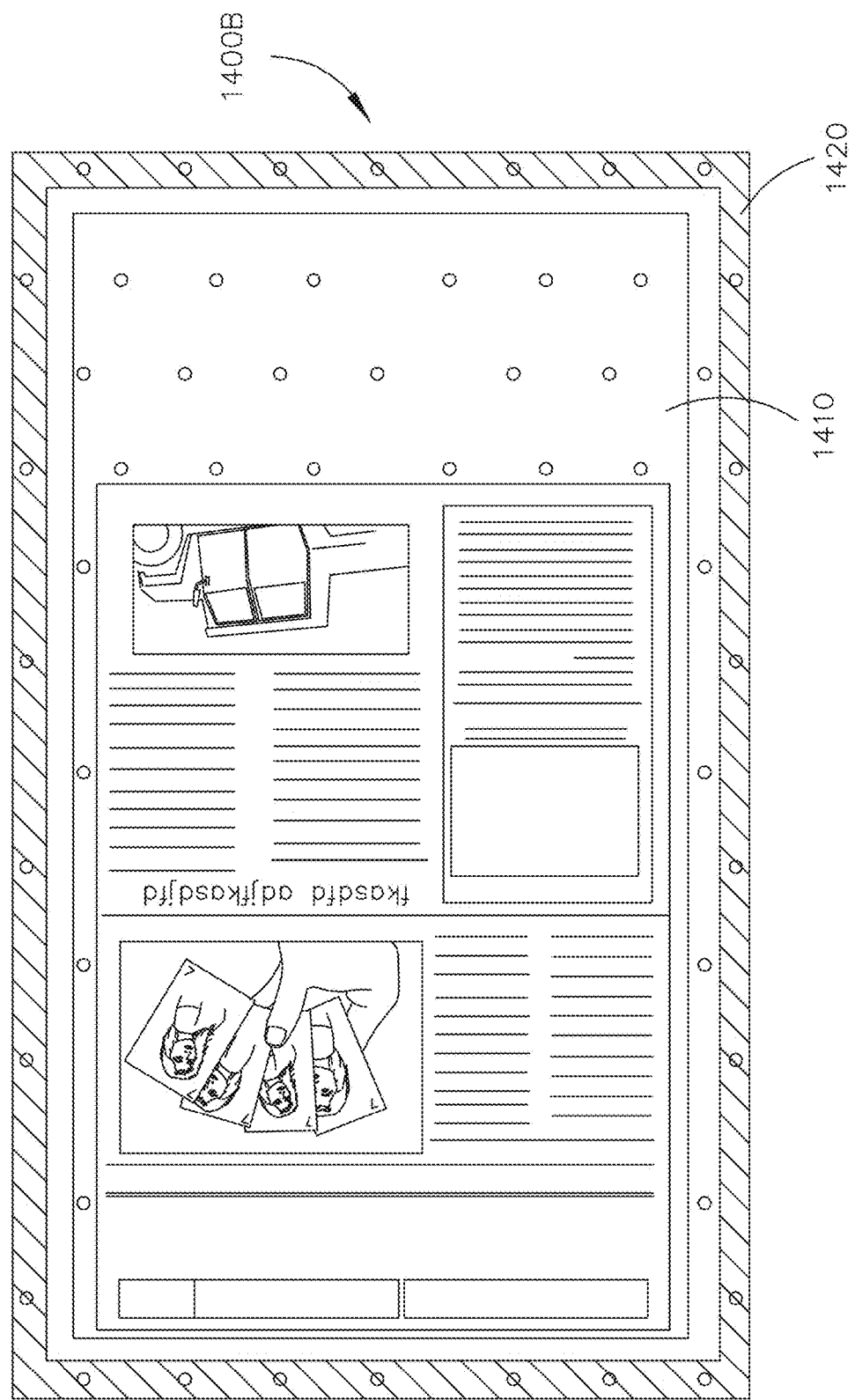

Referring now to FIG. 14B, a bordered image 1400B is depicted. The bordered image may comprise a live document 480 portion, a background portion 1410, and a border portion 1420 (created from a portion of the background portion 1410 around the edge of the cropped image 1400A). In order to precisely separate the out of gamut substrate color of the background portion 1410 from the live document 480 portion, the background color may be sampled (e.g., measured; see also step 853 of the method 800). Inadvertently measuring any part of the live document 480 portion would contaminate the sampling of the background color. To prevent contamination during the sampling of the background color, the process includes sampling the color of a border portion 1420 of the background portion 1410.

Figure 14C:
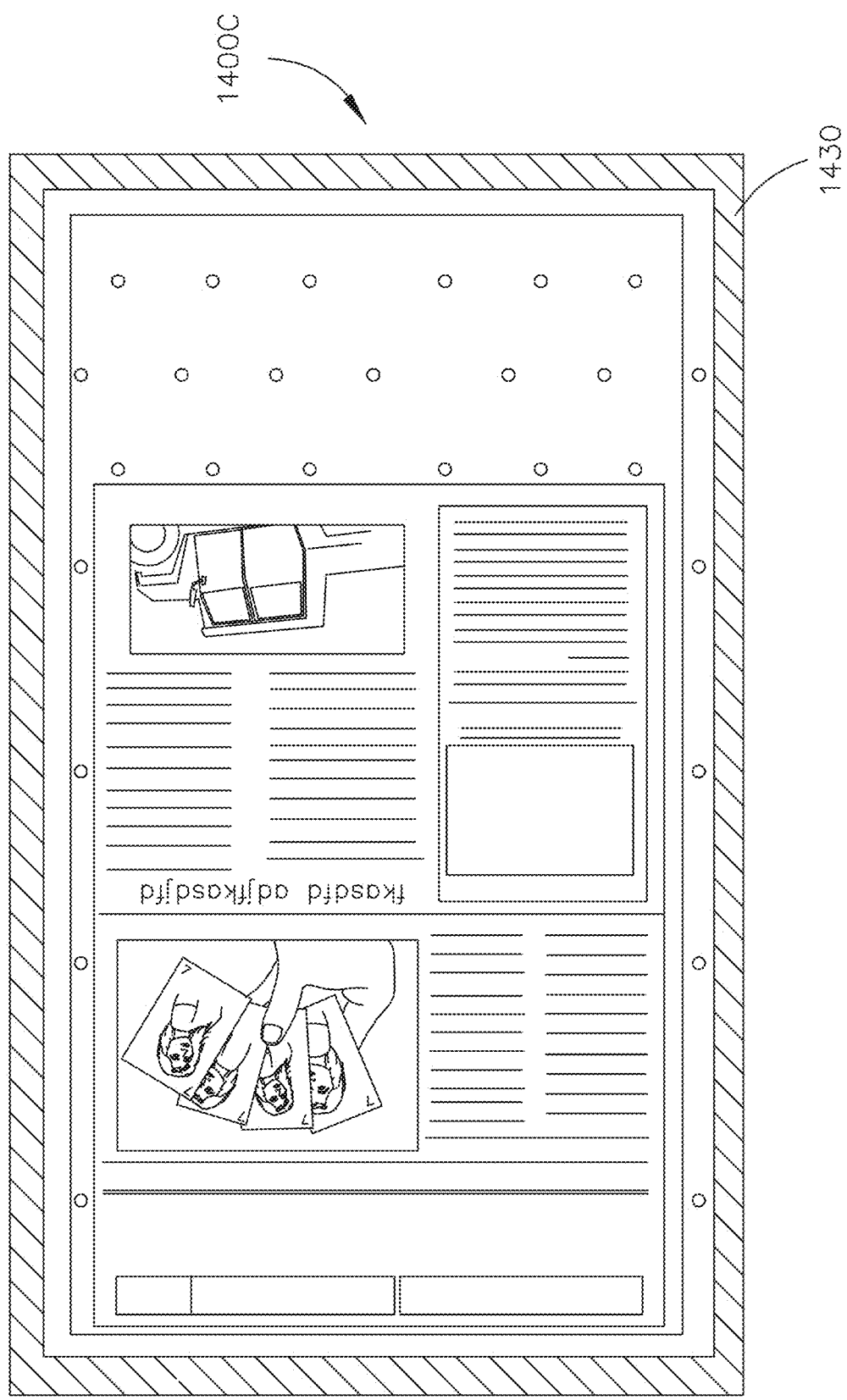
Figure 14D:
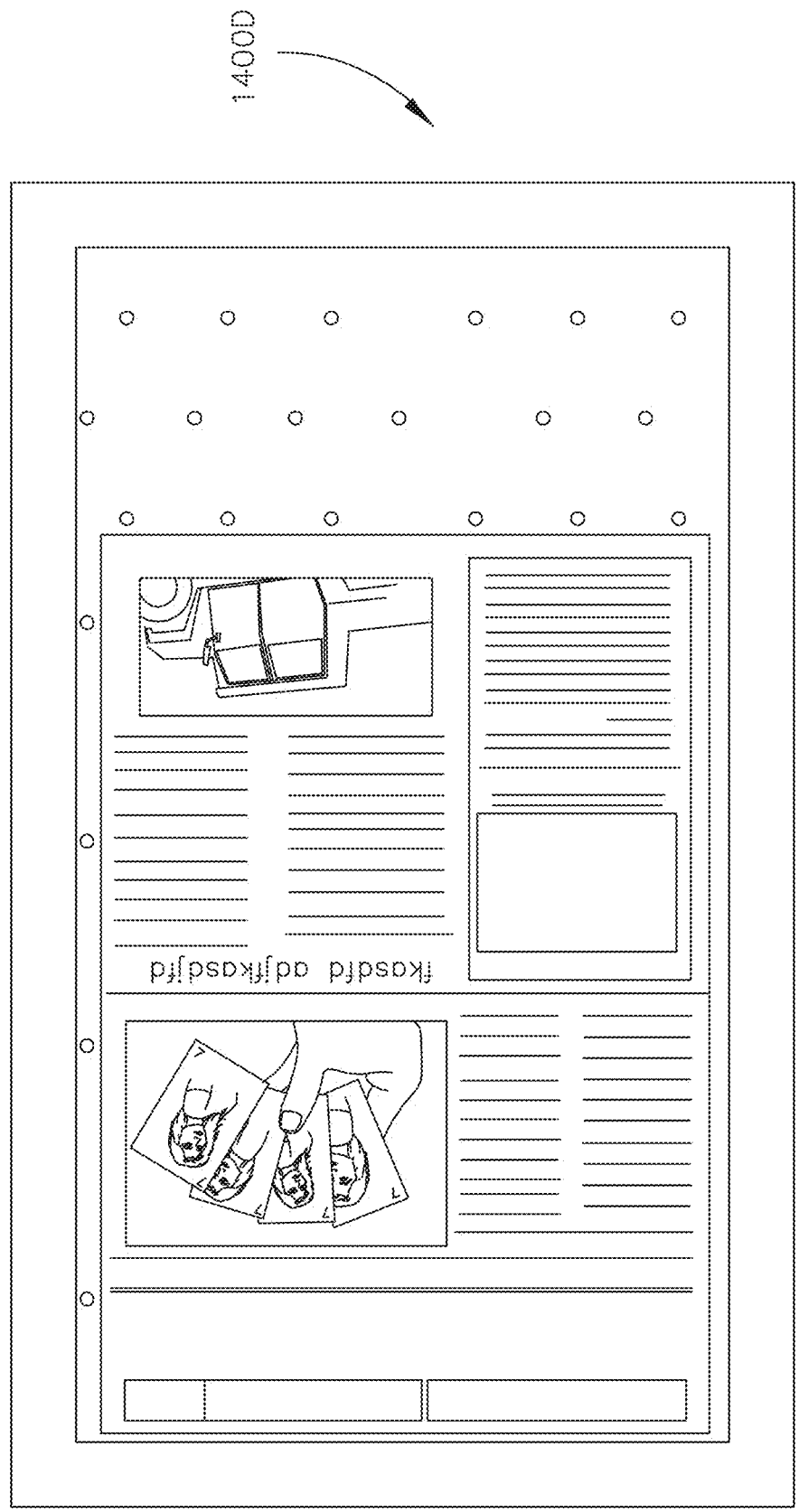
Figure 14E:
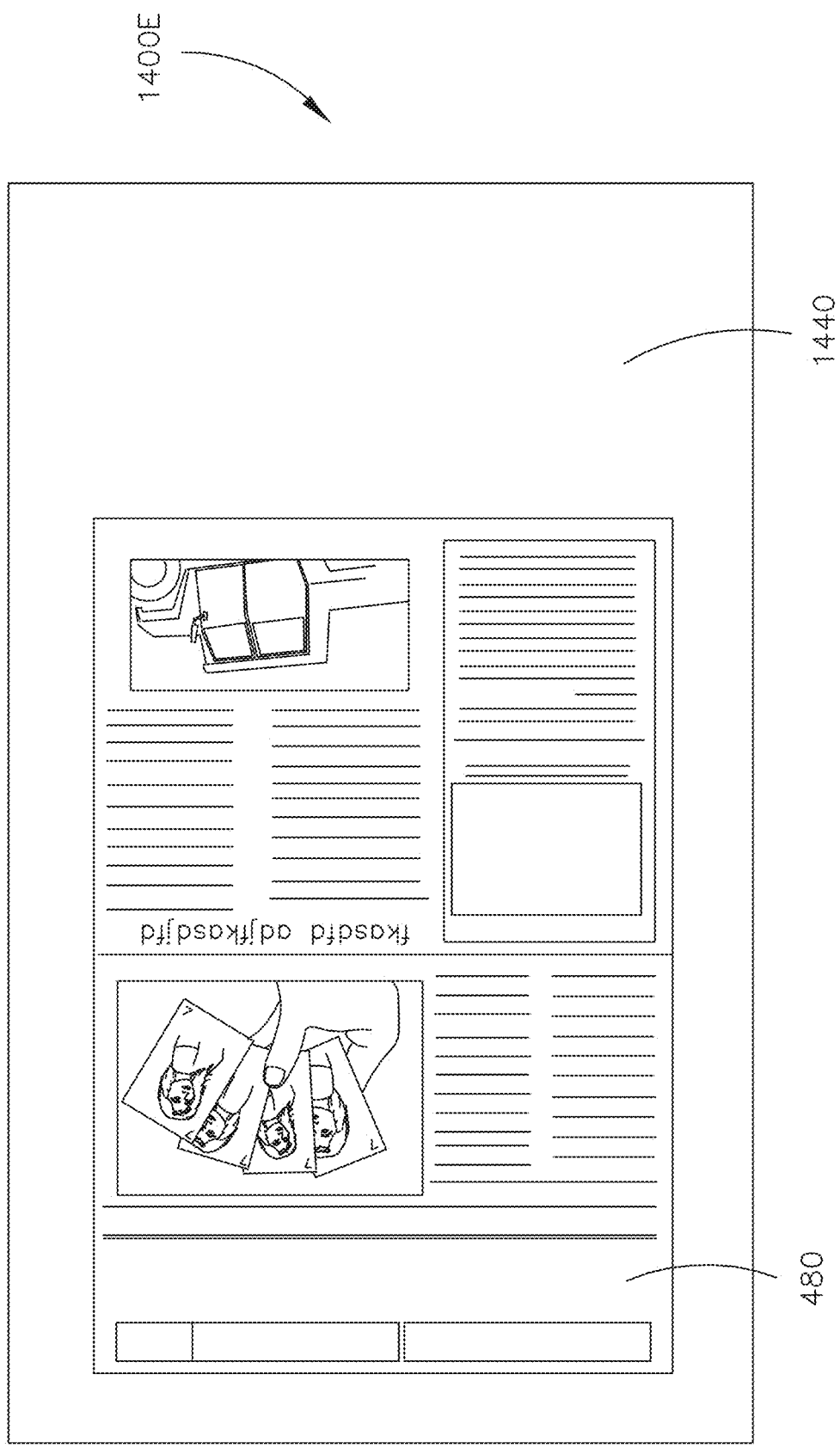

Referring now to FIGS. 14C, 14D, and 14E, a border filled image 1400C, 1400D are depicted. The coarse document isolation process may include an operation to remove the holes from the border portion 1420, 1430 and an operation to fill the border portion 1420 with an average background color measured within the border portion 1420. The filled border portion of the border filled image 1400C, 1400D may be grown to select similarly colored portions of the background portion 1410 which results in the selected background portion 1440, as shown in the image 1400E of FIG. 14E; that is, the average fill of the border portion 1420 is expanded to other similarly colored areas of the background portion 1410 (e.g., selecting contiguous pixels or similar pixels; see also steps 854, 855, 856 of the method 800). In some embodiments, the expansion of the average fill into the background portion 1440 may cut into the edges of the live document portion 480, so a contraction (i.e., by a size less than the size of the expansion) may be performed to reverse the effects (e.g., edge loss of the live document portion 480) of the expansion. As shown in FIG. 14E, an isolated (e.g., coarsely isolated) document 480 of the image 1400E is depicted.

Referring now to FIGS. 15A-G, exemplary depictions associated with performing fine document isolation of some embodiments are shown. In some embodiments, fine document isolation operations may be performed upon performance of coarse document isolation operations. FIGS. 15A-G depict the isolation of a document 1501 of an overall image 1500A.

Figure 15A:
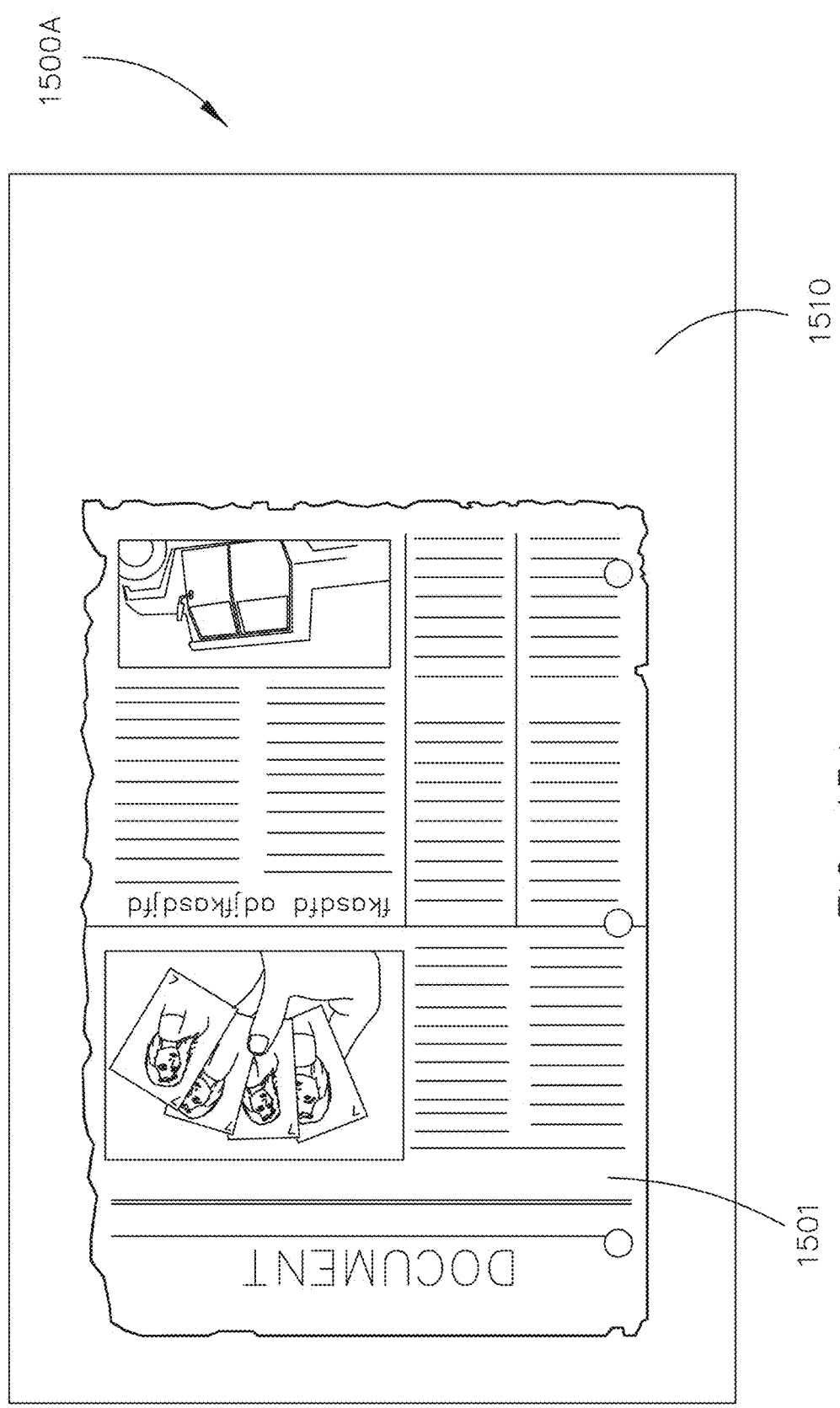
FIGS. 15A-G shows exemplary depictions associated with performing fine document isolation of some embodiments.

Referring now to FIG. 15A, a coarsely isolated image 1500A of a document 1501 and background 1510 is shown. In some embodiments, the document may be an old archive document, which includes damage to the edges, hole-punches, or other conditions. As shown in FIG. 15A, the coarsely isolated image 1500A is represented as being at a state following the performance of coarse document isolation operations, as described with reference to FIGS. 14A-E.

Figure 15B:
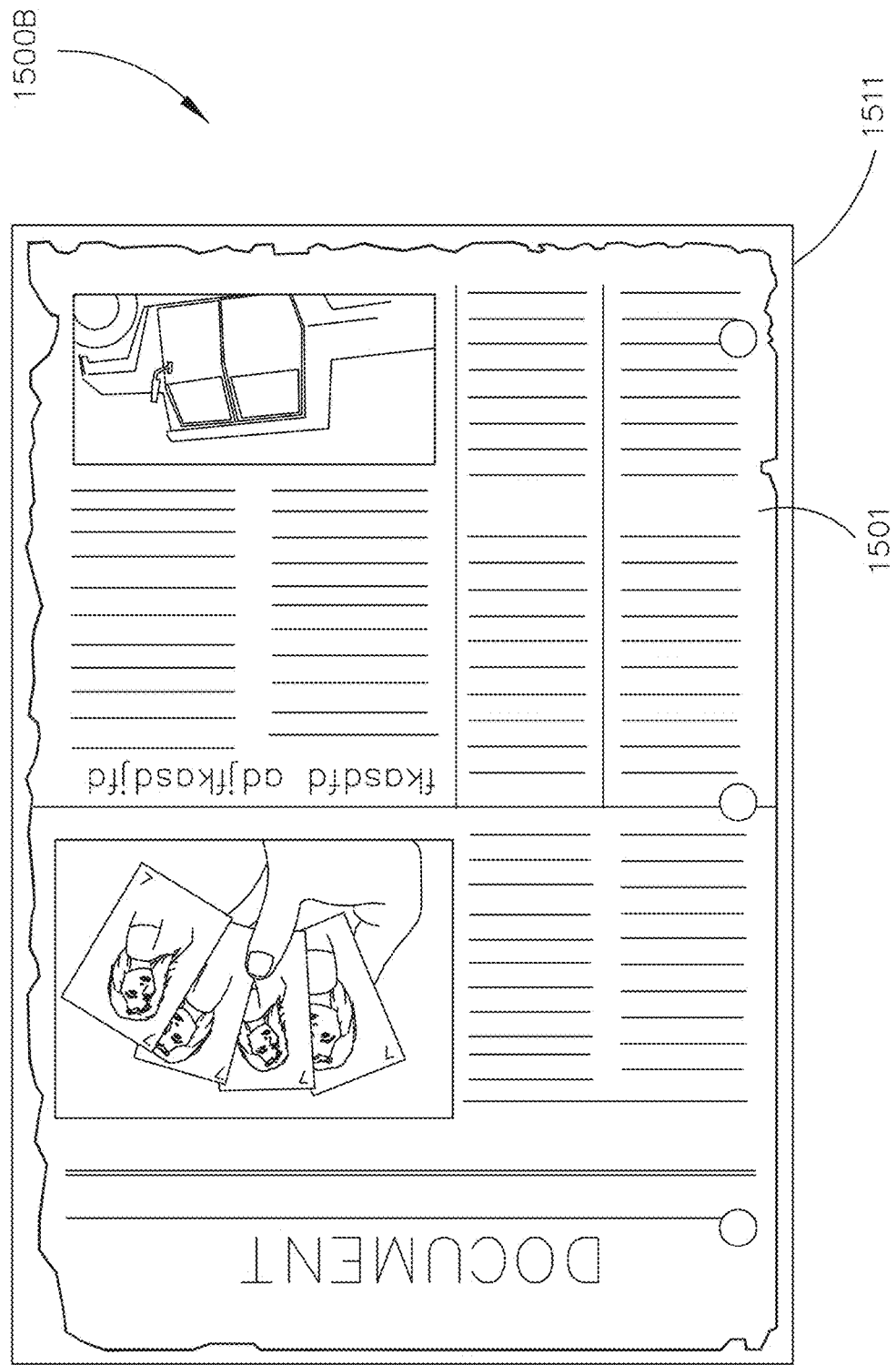

Referring now to FIG. 15B, a trimmed image 1500B is shown. The process includes trimming the coarsely isolated image 1500A on all sides (e.g., all four sides) until a first pixel is reached on each side of the document 1501 without eliminating any pixels of the document 1501. It should be noted that there still may be some background color in the portion 1511 and in the hole-punches of the document 1501.

Figure 15C:
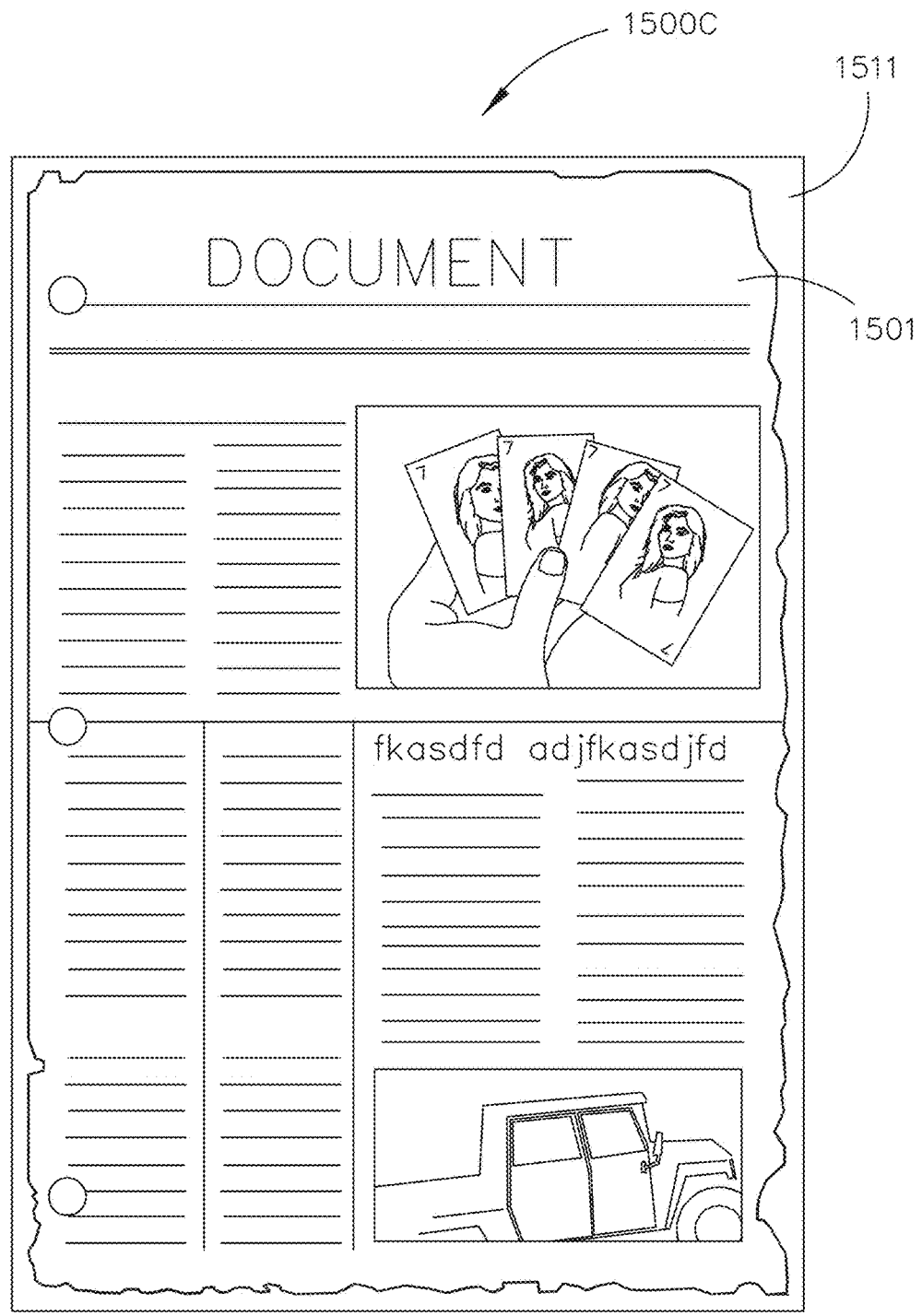

Referring now to FIG. 15C, a rotated image 1500C is shown. The process includes rotating the trimmed image 1500B to a correct orientation (e.g., as shown in FIG. 15C). In some embodiments, the correct orientation may be determined by detecting the activation of 2 LEDs (light emitting diodes) which may be located adjacent to the control strips 470. The LEDs may be toggled on and off and may be detected at the same time the document coordinates are measured.

Figure 15D:
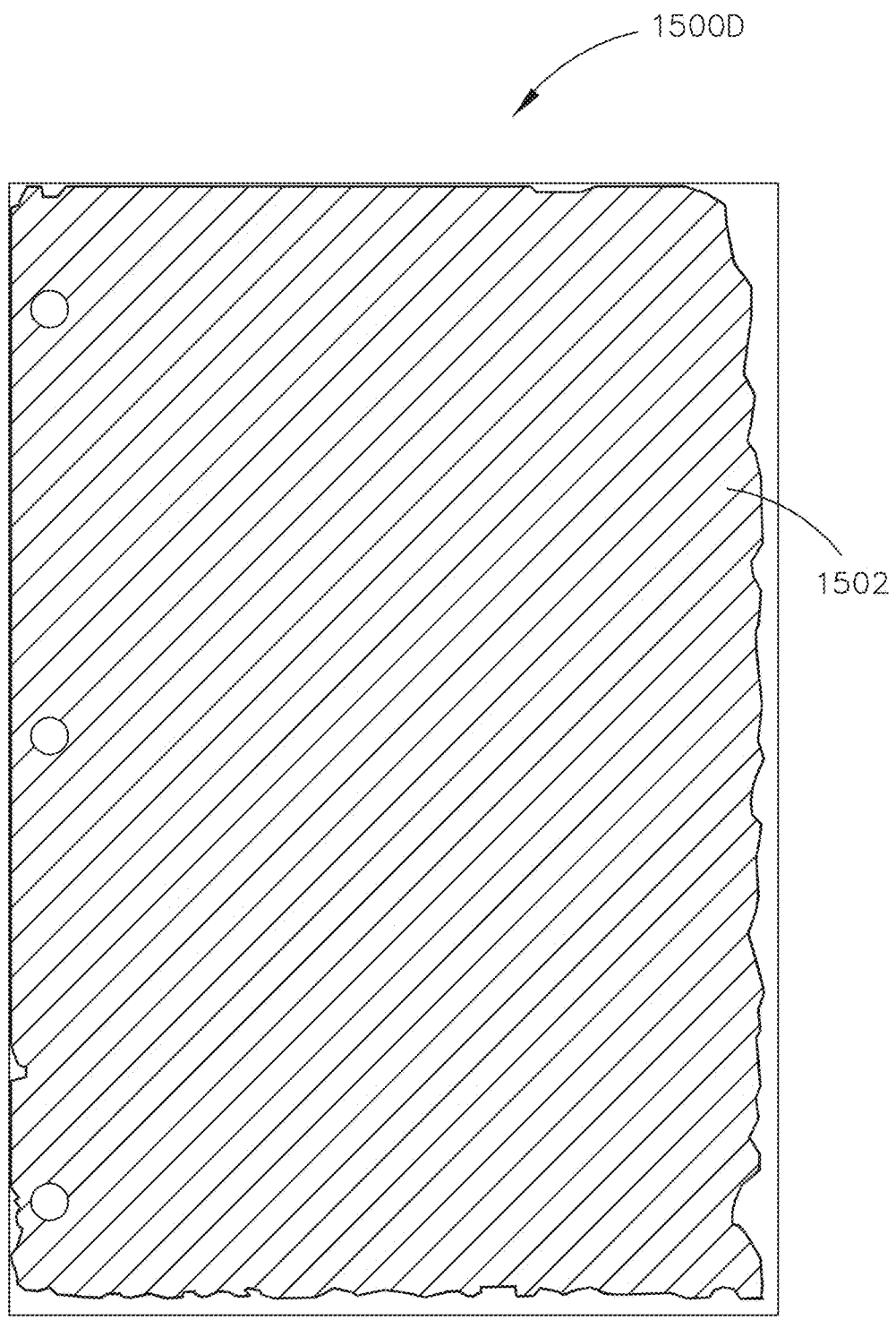

Referring now to FIG. 15D, a masked image 1500D is shown. The masked image may include a mask 1502. The imaging process may include creating the mask 1502 based upon the selections of the coarse document isolation operations and other fine document isolation operations. (The mask 1502 is sometimes referred to as an alpha channel; for example, at this point the image file may contain four channels: a red channel, a blue channel, a green channel, and the alpha channel (mask)). The isolation process is configured to mask out the background areas of the rectangular image and analyze only pixels that are part of the document; this enables the process to map or fit the color space of each and every document to the full color space of its intended rendering device (e.g., a computer display, a printer, or the like). In some embodiments the process can perform accurate tone and color cast corrections based on this masked data, which results in full contrast and color balanced documents.

Figure 15E:
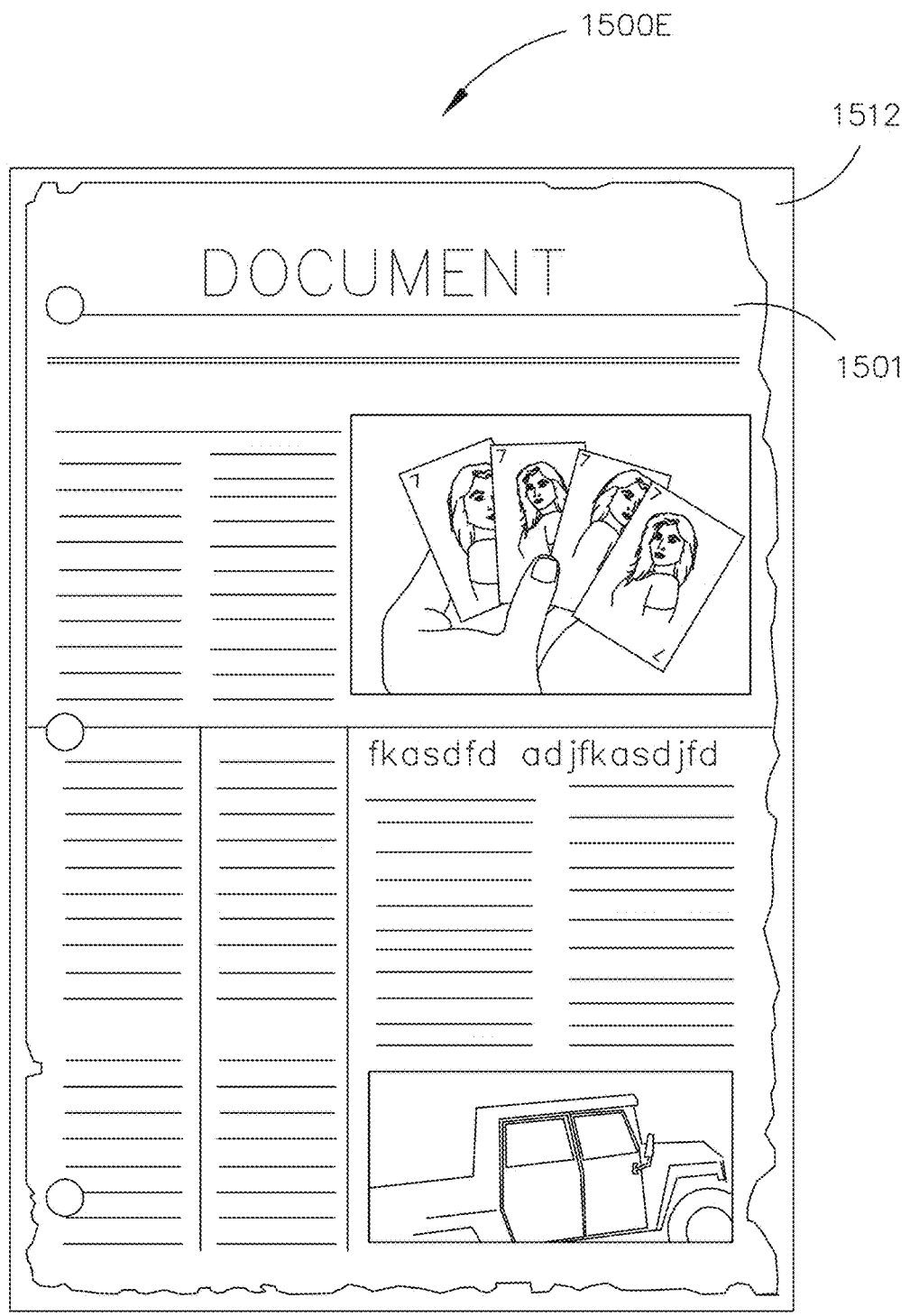

Referring now to FIG. 15E, an image 1500E is shown. The image processing may include removing the background fill color of the background portion 1512 of the image 1500E by utilizing the mask 1502. For example, the image processing may include loading the alpha channel (mask 1502) from the image and creating a polygon selection. The complexity of the polygon may be related to the edges of the document 1501. The polygon selection may either target the document 1501 or non-document area 1512 (which is the remaining background of the image 1500E). For example, removing the background fill color of the background portion 1512 may include replacing the background fill color (e.g., green) with a different color (e.g., light gray). In some embodiments, additional visual effects (e.g., a drop shadow, or the like) may be added to the image for various visual impacts.

Figure 15F:
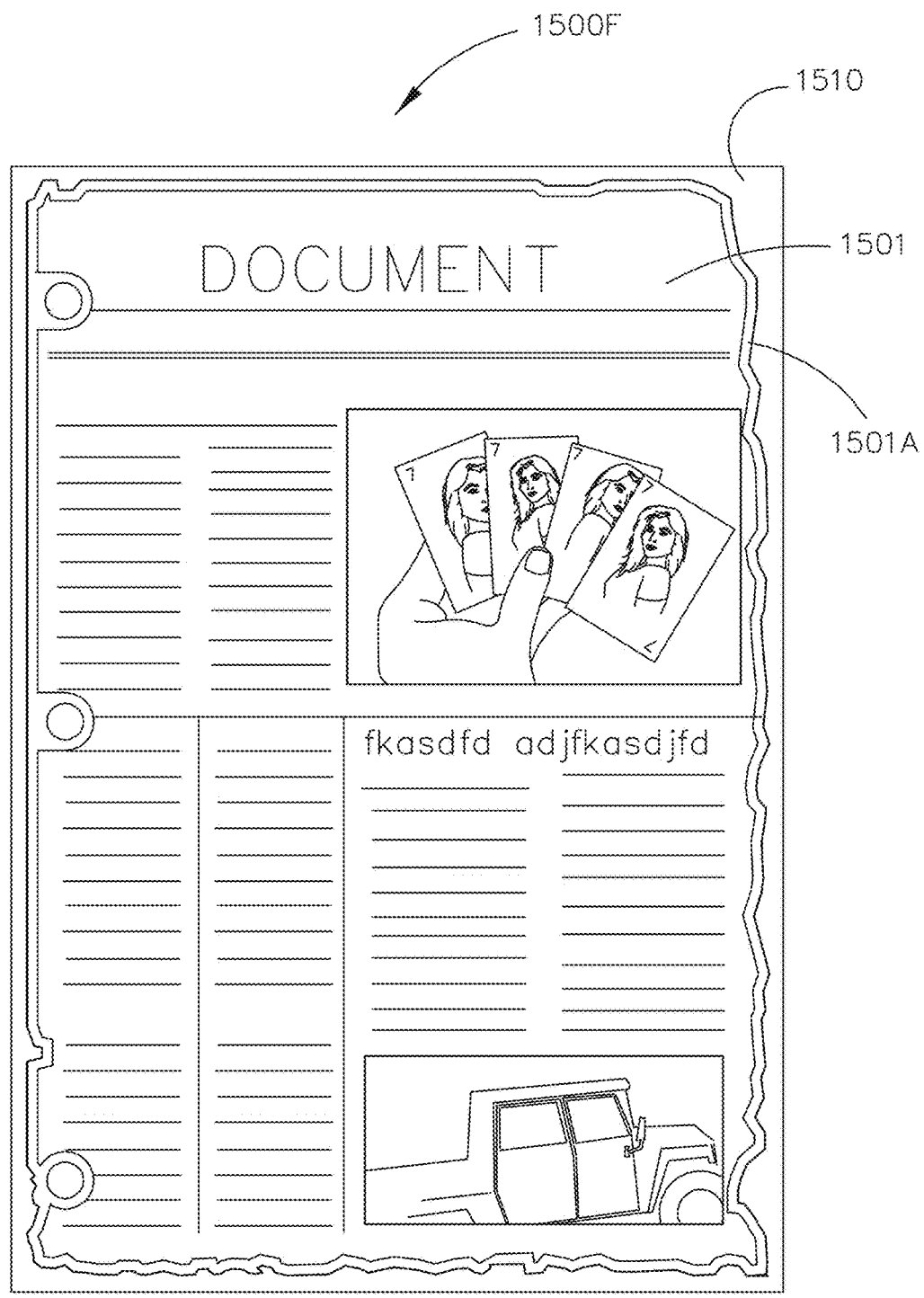
Figure 15G:
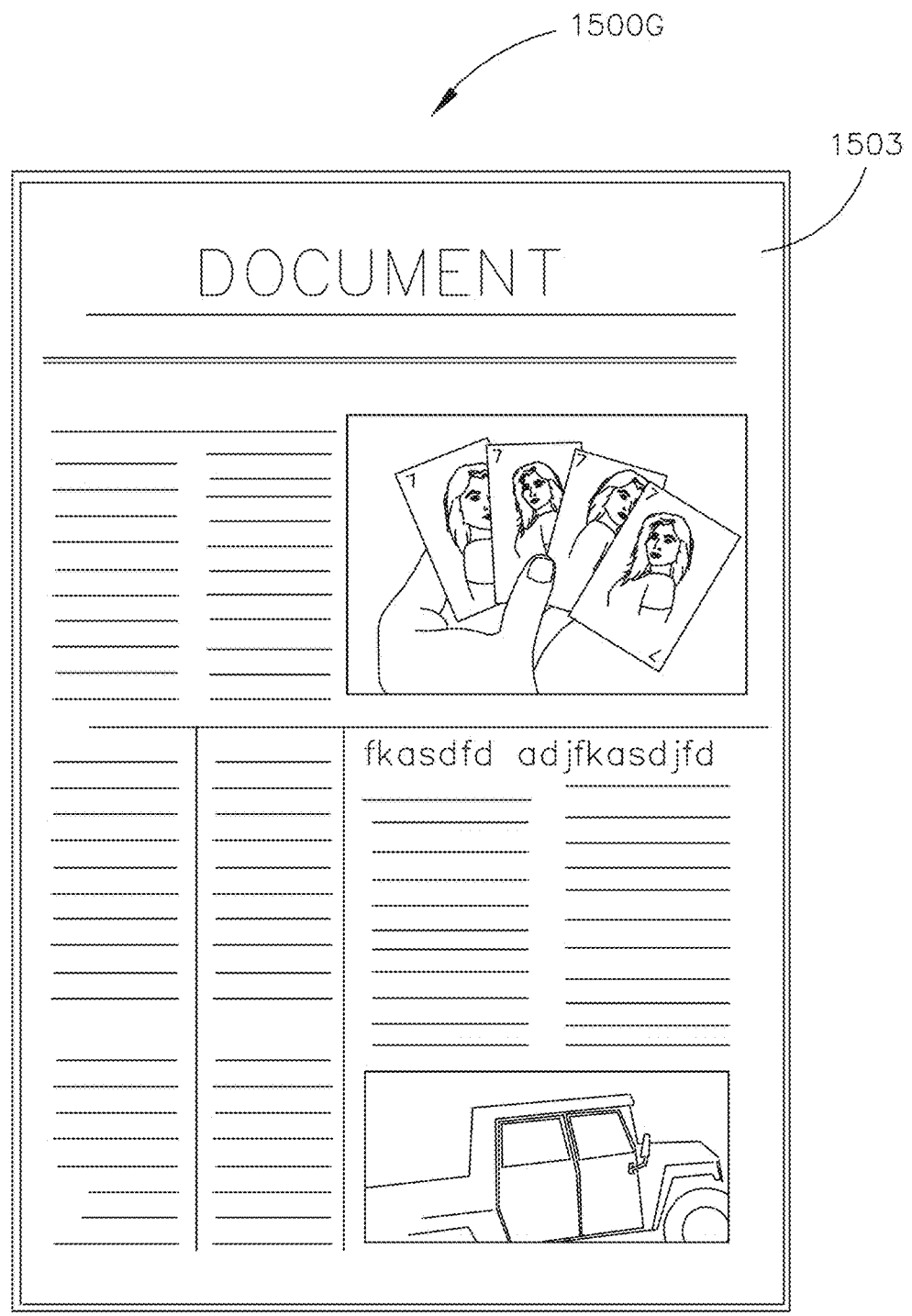

Referring now to FIGS. 15F-G, exemplary images 1500F, 1500G of some embodiments, which are configured to perform edge healing, are depicted. Some embodiments include analyzing background color of the document 1501 along edges 1501A of the mask 1502. In some embodiments, the edges may be a single pixel thick; however, in other embodiments the edges may be multiple pixels thick. In some embodiments, performing the edge healing includes determining an average document background color (e.g., corresponding to non-ink portions of the document 1501) by analyzing a distribution of pixel values. In some embodiments, performing the edge healing then includes filling the non-document area 1510 with the average document background color to create an edge healed document 1503 as shown in the edge healed image 1500G shown in FIG. 15G.

Additionally, some embodiments include removing document staining (e.g., yellow stains on aged documents). For example, an average document background color (e.g., corresponding to non-ink portions of the document 1501) may be determined by analyzing a distribution of pixel values. The average document background color (e.g., corresponding to non-ink portions of the document 1501) may be lightened and then filled into the non-ink portions of the document 1501.

Additionally, some embodiments of the invention include a method for numerically measuring a degree of focus and/or sharpness of an image based on at least one static control target. Because image sharpness and focus are typically subject to a person's subjective perception, it can be difficult for a computer process to measure a degree focus and/or sharpness of an image; however, some embodiments of the invention include a method for numerically measuring a degree of focus and/or sharpness of an image based on static control targets. The method may include determining a location of a light-dark pattern area (e.g., light-dark pattern bar 470C) of at least one control target (e.g., at least one control strip 470) within an image captured by an imaging station, wherein the light-dark pattern area includes a plurality of segments arranged linearly from a first side of the light-dark pattern area to an opposite side of the light-dark pattern area, each of the plurality of segments including a geometrically similar repeating pattern of light pixel areas and dark pixel areas, wherein a size of each light pixel area and each dark pixel area of each particular segment progressively decreases from the first side of the light-dark pattern area to the opposite side of the light-dark pattern area. The method may also include determining pixel values of the pixels of the light-dark pattern area. The method may also include, upon determining the pixel values of the pixels of the light-dark pattern area, determining a ratio of dark to light pixels for each of the plurality of segments of the light-dark pattern area. The method may also include determining which of the plurality of segments of the light-dark pattern area exceed a predetermined dark-to-light pixel ratio threshold. The method may also include determining a degree of focus based on the segments having ratios of dark to light pixels which exceed a predetermined dark-to-light pixel ratio threshold (e.g., determining a degree of focus based on a number of the segments having ratios of dark to light pixels which exceed a predetermined dark-to-light pixel ratio threshold). The method may further include determining whether the measured focus is acceptable based upon a predetermined focus threshold value. The method may also include, upon a determination that the measured focus is unacceptable, adjusting a lens focus of a camera of the imaging station and recapturing the image of the document.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for performing initial image processing of a physical document image, comprising:

receiving a raw image file from an imaging station, the raw image file comprising an image of a physical document and at least one control target;

reading dimensional data of the raw image file;

verifying that the raw image file exceeds a predetermined minimum resolution and aspect ratio;

applying a light filter upon verifying that the raw image file exceeds the predetermined minimum resolution and aspect ratio;

creating an image copy of the raw image file;

placing the image copy on top of the raw image file upon creating the copy of the raw image file;

converting the image copy to a bitonal format;

verifying that the at least one control target is present in the image copy;

measuring control target attributes of the at least one control target, wherein measuring the control target attributes of the at least one control target includes:

numerically measuring a degree of focus of the raw image file based on the at least one control target, wherein numerically measuring the degree of focus of the raw image file based on the at least one control target comprises:

determining a location of a light-dark pattern area of the at least one control target;

determining pixel values of the light-dark pattern area;

determining a ratio of dark to light pixels for each of a plurality of segments of the light-dark pattern area;

determining which of the plurality of segments of the light-dark pattern area exceed a predetermined dark-to-light pixel ratio threshold; and determining the degree of focus based on a number of segments that exceed the predetermined dark-to-light pixel ratio threshold;

determining whether the control target attributes are within predetermined specifications;

discarding the image copy upon a determination that the control target attributes are within the predetermined specifications;

performing a static crop of the raw image file based on the control target attributes by removing the at least one control target from the raw image file to create a cropped image;

creating a cropped image copy of the cropped image;

placing the cropped image copy on top of the cropped image upon creating the copy of the cropped image;

measuring a background color of a background of the cropped image copy, wherein the background is separate from a live document portion of the cropped image copy;

selecting all contiguous background color pixels of the background based upon the measured background color;

determining whether similar background pixels are to be selected;

selecting some or all of the similar background pixels upon a determination to select the similar background pixels;

creating a mask based on the selected contiguous background color pixels and the selected similar background pixels; and creating a temporary quality control thumbnail file, a temporary metadata thumbnail file, and a high resolution archive file based at least upon the created mask.

2. The method of claim 1, wherein the imaging station comprises a book imaging station, a microfiche card imaging station, or an imaging station having a vacuum assembly.

3. The method of claim 1, further comprising:
numerically measuring a degree of focus of the raw image file based on the at least one control target.

4. The method of claim 1, further comprising:
performing a quality control process on the temporary quality control thumbnail file.

5. The method of claim 1, further comprising:
performing a metadata process on the temporary metadata thumbnail file.

6. The method of claim 1, further comprising:
performing an optical character recognition optimization process on the high resolution archive file.

7. The method of claim 1, further comprising:
performing an image optimization process on the high resolution archive file.

8. The method of claim 1, further comprising:
performing a quality control process on the temporary quality control thumbnail file;
performing a metadata process on the temporary metadata thumbnail file;
performing an optical character recognition optimization process on the high resolution archive file; and
performing an image optimization process on the high resolution archive file.

9. The method of claim 8, further comprising:
performing a file reassembly process.

10. A method for performing initial image processing of a physical document image, comprising:
receiving a raw image file from an imaging station, the raw image file comprising an image of a physical document and at least one control target;
creating an image copy of the raw image file;
converting the image copy to a bitonal format;
verifying that the at least one control target is present in the image copy;
measuring control target attributes of the at least one control target, wherein measuring the control target attributes of the at least one control target includes:
numerically measuring a degree of focus of the raw image file based on the at least one control target, wherein numerically measuring the degree of focus of the raw image file based on the at least one control target comprises:
determining a location of a light-dark pattern area of the at least one control target;
determining pixel values of the light-dark pattern area;
determining a ratio of dark to light pixels for each of a plurality of segments of the light-dark pattern area;
determining which of the plurality of segments of the light-dark pattern area exceed a predetermined dark-to-light pixel ratio threshold; and determining the degree of focus based on a number of segments that exceed the predetermined dark-to-light pixel ratio threshold;

performing a static crop of the raw image file based on the control target attributes by removing the at least one control target from the raw image file to create a cropped image;

creating a cropped image copy of the cropped image;

measuring a background color of a background of the cropped image copy upon creating the copy of the cropped image, wherein the background is separate from a live document portion of the cropped image copy;

selecting contiguous background color pixels of the background based upon the measured background color; and creating a mask based at least on the selected contiguous background color pixels.

11. The method of claim 10, further comprising:
creating a temporary quality control thumbnail file, a temporary metadata thumbnail file, and a high resolution archive file based at least on the created mask.

12. The method of claim 11, wherein the imaging station comprises a book imaging station or a microfiche card imaging station.

13. The method of claim 11, further comprising:
performing a quality control process on the temporary quality control thumbnail file.

14. The method of claim 11, further comprising:
performing a metadata process on the temporary metadata thumbnail file.

15. The method of claim 11, further comprising:
performing an optical character recognition optimization process on the high resolution archive file.

16. The method of claim 11, further comprising:
performing an image optimization process on the high resolution archive file.

17. The method of claim 11, further comprising:
performing a quality control process on the temporary quality control thumbnail file;
performing a metadata process on the temporary metadata thumbnail file;
performing an optical character recognition optimization process on the high resolution archive file; and
performing an image optimization process on the high resolution archive file.

18. The method of claim 17, further comprising:
performing a file reassembly process.

19. A method for performing initial image processing and image processing of a physical document image, comprising:
receiving a raw image file from an imaging station, the raw image file comprising an image of a physical document and at least one control target;
creating an image copy of the raw image file;
converting the image copy to a bitonal format;
verifying that the at least one control target is present in the image copy;
measuring control target attributes of the at least one control target, wherein measuring the control target attributes of the at least one control target includes:
numerically measuring a degree of focus of the raw image file based on the at least one control target, wherein numerically measuring the degree of focus of the raw image file based on the at least one control target comprises:

determining a location of a light-dark pattern area of the at least one control target;
determining pixel values of the light-dark pattern area;
determining a ratio of dark to light pixels for each of a plurality of segments of the light-dark pattern area;
determining which of the plurality of segments of the light-dark pattern area exceed a predetermined dark-to-light pixel ratio threshold; and
determining the degree of focus based on a number of segments that exceed the predetermined dark-to-light pixel ratio threshold;
performing a static crop of the raw image file based on the control target attributes by removing the at least one control target from the raw image file to create a cropped image;
creating a cropped image copy of the cropped image;
measuring a background color of a background of the cropped image copy upon creating the copy of the cropped image, wherein the background is separate from a live document portion of the cropped image copy;
selecting contiguous background color pixels of the background based upon the measured background color;
creating a mask based at least on the selected contiguous background color pixels;
creating a temporary quality control thumbnail file, a temporary metadata thumbnail file, and a high resolution archive file based at least on the created mask;
receiving the temporary quality control thumbnail file, the temporary metadata thumbnail file, and the high resolution archive file, wherein each of the temporary quality control thumbnail file, the temporary metadata thumbnail file, and the high resolution archive file is associated with the raw image file from the imaging station;
performing a quality control process on the temporary quality control thumbnail file;
performing a metadata process on the temporary metadata thumbnail file;
performing an optical character recognition optimization process on the high resolution archive file;
performing an image optimization process on the high resolution archive file; and
performing a file reassembly process, wherein performance of the file reassembly process outputs a final optimized portable document format (PDF) file with metadata.

20. The method of claim 19, wherein the imaging station comprises a book imaging station, a microfiche card imaging station, or an imaging station having a vacuum assembly.

21. The method of claim 19, wherein performing a quality control process on the temporary quality control thumbnail file includes:
performing an automated quality control process;
performing a manual quality control process; and
writing quality control results to a database.

22. The method of claim 21, wherein performing an automated quality control process includes:
reading the temporary quality control thumbnail file; and
determining whether the temporary quality control thumbnail file is acceptable based at least on a mask to background ratio.

23. The method of claim 21, wherein performing a manual quality control process includes:

receiving one or more user inputs from a user which indicate at least one of whether a document orientation is correct, whether all document elements are present, whether non-document elements have been removed, or whether a document is legible.

24. The method of claim 19, wherein performing a metadata process on the temporary metadata thumbnail file includes:
gathering data from a file name of the temporary metadata thumbnail file;
gathering data from a file hierarchy of the temporary metadata thumbnail file;
gathering data from a database; and
writing the gathered data as metadata in a database.

25. The method of claim 19, wherein performing an optical character recognition optimization process on the high resolution archive file includes:
converting the high resolution archive file to a high contrast bitonal image file;
converting the high contrast bitonal image file to a higher resolution;
converting the higher resolution high contrast bitonal image file to a temporary portable document format (PDF) file; and
storing the temporary portable document format (PDF) file as a temporary portable document format (PDF) file.

26. The method of claim 19, wherein performing an image optimization process on the high resolution archive file includes:
improving sharpness of text of the high resolution archive file;
improving image smoothness of the high resolution archive file;
reducing a file size of the high resolution archive file; and
creating and storing an optimized PDF image file, a large thumbnail file, and a small thumbnail file.

27. The method of claim 19, further comprising:
performing an edge healing operation.

28. The method of claim 19, further comprising:
performing an image correction operation.

29. The method of claim 10, wherein the measured background color of the cropped image copy corresponds to a color of a substrate of the imaging station.

30. The method of claim 10, wherein the measured background color of the cropped image copy corresponds to a color of an "out of gamut" substrate of the imaging station.

31. The method of claim 10, wherein selecting the contiguous background color pixels based upon the measured background color further comprises selecting all contiguous background color pixels based upon the measured background color.

32. The method of claim 10, the light-dark pattern area including light pixel areas and dark pixel areas, wherein sizes of the light pixel areas and the dark pixel areas progressively decrease from one side of the light-dark pattern area to an opposite side of the light-dark pattern area.

33. The method of claim 32, wherein each of the plurality of segments of the light-dark pattern area include a geometrically similar repeating pattern of the light pixel areas and the dark pixel areas.

34. The method of claim 19, the light-dark pattern area including light pixel areas and dark pixel areas, wherein sizes of the light pixel areas and the dark pixel areas progressively decrease from one side of the light-dark pattern area to an opposite side of the light-dark pattern area.

35. The method of claim 34, wherein each of the plurality of segments of the light-dark pattern area include a geometrically similar repeating pattern of the light pixel areas and the dark pixel areas.

36. The method of claim 19, wherein performing an automated quality control process includes:
   reading the temporary quality control thumbnail file; and
   determining whether the temporary quality control thumbnail file is acceptable based at least on a mask to background ratio;
   wherein performing a manual quality control process includes:
   receiving one or more user inputs from a user which indicate at least one of whether a document orientation is correct, whether all document elements are present, whether non-document elements have been removed, or whether a document is legible.

37. The method of claim 21, wherein performing a manual quality control process includes:
   receiving one or more user inputs from a user which indicate whether a document orientation is correct, whether all document elements are present, whether non-document elements have been removed, and whether a document is legible.

* * * * *